United States Patent
Ito et al.

(10) Patent No.: US 8,070,953 B2
(45) Date of Patent: Dec. 6, 2011

(54) METHOD FOR DESALINATING SEA WATER

(75) Inventors: Yutaka Ito, Kobe (JP); Katsuhide Motojima, Tokyo (JP); Kazuya Uematsu, Tokyo (JP); Masanobu Noshita, Kobe (JP); Kazutaka Takata, Kobe (JP); Mitsushige Shimada, Kobe (JP); Megumi Manabe, Kobe (JP)

(73) Assignee: Kobelco Eco-Solutions Co., Ltd., Hyogo (JP)

( * ) Notice: Subject to any disclaimer, the term of this patent is extended or adjusted under 35 U.S.C. 154(b) by 0 days.

(21) Appl. No.: 12/990,099

(22) PCT Filed: Nov. 26, 2009

(86) PCT No.: PCT/JP2009/069932
§ 371 (c)(1),
(2), (4) Date: Nov. 10, 2010

(87) PCT Pub. No.: WO2010/061879
PCT Pub. Date: Jun. 3, 2010

(65) Prior Publication Data
US 2011/0042306 A1    Feb. 24, 2011

(30) Foreign Application Priority Data

| Nov. 28, 2008 | (JP) | 2008-304623 |
| Feb. 13, 2009 | (JP) | 2009-031819 |
| Feb. 13, 2009 | (JP) | 2009-031861 |
| Feb. 14, 2009 | (JP) | 2009-032073 |
| Feb. 14, 2009 | (JP) | 2009-032075 |

(51) Int. Cl.
*B01D 61/00* (2006.01)

(52) U.S. Cl. ........ 210/649; 210/650; 210/651; 210/652; 210/631; 210/681; 210/192

(58) Field of Classification Search .......... 210/649–652, 210/631, 681, 192
See application file for complete search history.

(56) References Cited

U.S. PATENT DOCUMENTS

| 2010/0314313 A1* | 12/2010 | MacLaggan ............ 210/615 |
| 2011/0049048 A1* | 3/2011 | Benner et al. ............ 210/636 |
| 2011/0049054 A1* | 3/2011 | Merryman ............... 210/652 |

FOREIGN PATENT DOCUMENTS

| CN | 1513770 C | 7/2004 |
| EP | 1161981 B1 | 12/2001 |
| JP | 63197596 A | 8/1988 |
| JP | 214794 A | 1/1990 |
| JP | 9174094 A | 7/1997 |
| JP | 11253761 A | 9/1999 |
| JP | 200481903 A | 3/2004 |
| JP | 2005279540 A | 10/2005 |
| JP | 2005342664 A | 12/2005 |

(Continued)

*Primary Examiner* — Chester Barry
(74) *Attorney, Agent, or Firm* — The Web Law Firm

(57) ABSTRACT

An object is to provide a fresh water generating method that is capable of efficiently producing purified water, such as fresh water, from unpurified water, such as sea water. Provided is a fresh water generating method for generating fresh water by way of reverse osmosis membrane filtration, which includes mixing sea water with low salt concentration water having a salt concentration lower than sea water to produce mixed water, and subjecting the mixed water prepared by the mixing to reverse osmosis membrane filtration, thereby generating fresh water.

4 Claims, 23 Drawing Sheets

FOREIGN PATENT DOCUMENTS

| | | |
|---|---|---|
| JP | 200855317 A | 3/2008 |
| JP | 2009106832 A | 5/2009 |
| TW | 200838601 A | 10/2008 |
| TW | M351870 | 3/2009 |
| WO | 2006057249 A1 | 6/2006 |

* cited by examiner

VOLUME OF DILUENT WATER TO SEA WATER 100
(MIXING VOLUME RATIO)

VOLUME OF DILUENT WATER TO SEA WATER 100
(MIXING VOLUME RATIO)

METHOD FOR DESALINATING SEA WATER

BACKGROUND OF THE INVENTION

1. Field of the Invention

The present invention relates to a method and apparatus for generating fresh water by way of reverse osmosis membrane filtration, and relates to a method and apparatus for desalinating sea water by way of filtration using, for example, a reverse osmosis filtration apparatus.

2. Description of the Related Art

In recent years, there has been a problem that rain falls locally or in a short period of time due to global warming or the like and hence water resources are unevenly distributed geographically or temporally, or a water holding capacity of a mountainous area is lowered due to decline in forest industry or deforestation, which leads to difficulty in stably securing water resources.

In order to stably secure water resources, there has been proposed desalinating sea water by filtration process using a reverse osmosis membrane, for example, in seafront areas (e.g., Japanese Patent Application Laid-open No. 2008-55317).

SUMMARY OF THE INVENTION

However, a conventional technique for desalinating sea water poses a problem in that filtration of sea water by a reverse osmosis membrane requires sea water to be pressurized and pressure-fed to a reverse osmosis membrane unit by a pump or the like, and therefore the higher the salt concentration (salinity) of sea water, the larger the energy required.

In consideration of the above problem, it is an object of the present invention to provide a method and apparatus for generating fresh water, and a method and apparatus for desalinating sea water that are capable of efficiently producing purified water, such as fresh water, from unpurified water, such as sea water.

According to one aspect of the present invention, there is provided a fresh water generating method for generating fresh water by way of reverse osmosis membrane filtration, which includes mixing sea water with low salt concentration water having a salt concentration lower than sea water to produce mixed water, and subjecting the mixed water prepared by the mixing to reverse osmosis membrane filtration, thereby generating fresh water.

According to another aspect of the present invention, there is provided a fresh water generating apparatus for generating fresh water by way of reverse osmosis membrane filtration, which is configured such that sea water is mixed with low salt concentration water having a salt concentration lower than sea water to produce mixed water, and the mixed water produced by the mixing is subjected to reverse osmosis membrane filtration, thereby generating fresh water.

According to another aspect of the present invention, there is provided a sea water desalinating method for desalinating sea water by way of filtration using a reverse osmosis membrane device, which method comprises carrying out a mixing step of mixing, as diluent water, biologically treated water produced by biologically treating organic wastewater into sea water to produce mixed water, and a mixed water processing step of feeding the mixed water produced by the mixing step to the reverse osmosis membrane device, at which the mixed water is filtered, thereby desalinating the sea water.

According to the sea water desalinating method, the mixed water produced by mixing, as diluent water, biologically treated water having a salt concentration lower than sea water into sea water is fed to the reverse osmosis membrane device, at which the mixed water is filtered. Whereby, the pressure for pressure-feeding the mixed water to the reverse osmosis membrane device can be lowered than a pressure for pressure-feeding sea water. Thus, an amount of energy required for pressure-feeding per unit quantity of produced fresh water can be saved. Also, permeate flux of a membrane of a reverse osmosis membrane device can be increased, and hence the filtration flow rate can be increased. Furthermore, the load to the membrane (chemical load due to salt in salt water, and physical load due to pressure) can be lowered and hence the operation life of the membrane can be extended. Still furthermore, the biologically treated water can be effectively utilized.

In the sea water desalinating method using the biologically treated water, it is preferable to carry out a wastewater treatment step of producing biologically treated water by biologically treating organic wastewater, producing permeate by filtering the biologically treated water by using a clarifier that has at least one of a microfiltration membrane, a ultrafiltration membrane and a sand filtration means, and producing permeate that is purified water and concentrated water by filtering the permeate using a reverse osmosis membrane device, wherein the biologically treated water used as the diluent water in the mixing step is the concentrated water.

According to the above sea water desalinating method, purified water can be recovered in the wastewater treatment step to enable producing an advantageous effect of more efficiently recovering purified water.

In the sea water desalinating method including the wastewater treatment step, it is preferable to carry out filtration with the clarifier installed as a submerged membrane below the liquid level of a biological treatment tank for the biological treatment, in the wastewater treatment step.

According to the sea water desalinating method, in a case of using activated sludge in biological treatment, only the filtrate containing little activated sludge can be produced from biologically treated water containing activated sludge through the submerged membrane, which is advantageous in that the concentration of biological species in the biological treatment tank can be easily increased and hence the volume of the biological treatment tank can be reduced. Furthermore, in comparison with the arrangement where the clarifier is installed outside of the biological treatment tank, there are advantageous effects in that the system or device used in the sea water desalination method can be further reduced in size and a passage for returning sludge concentrated at the clarifier to the biological treatment tank can be omitted.

Still furthermore, in the sea water desalinating method using the biologically treated water, it is preferable to filter the mixed water using a clarifier that has at least one of a microfiltration membrane, a ultrafiltration membrane and a sand filtration means, prior to the filtration using the reverse osmosis membrane device, in the mixed water treatment step.

According to the above sea water desalination method, organic solid matter can be suppressed from adhering to the membrane surface of the reverse osmosis membrane device, which produces an advantageous effect of producing fresh water with higher efficiency. There is also an advantageous effect in that fresh water with higher degree of purity can be produced.

In the sea water desalinating method which includes filtration of mixed water using the clarifier prior to filtration using the reverse osmosis membrane device in the mixed water treatment step, it is preferable to biologically treat the mixed water prior to the filtration of the mixed water using the clarifier in the mixed water treatment step.

According to the above sea water desalinating method, the concentration of dissoluble organic matter in the mixed water is lowered, which makes it possible to produce advantageous effects of suppressing proliferation of microorganisms generated between the clarifier and the reverse osmosis membrane device and suppressing organic solid matter, such as microorganisms, from adhering to the membrane surface of the reverse osmosis membrane device used in the mixed water treatment step, and hence more efficiently producing fresh water. As an additional advantageous effect, fresh water with higher degree of purity can be produced.

In the sea water desalinating method using the biologically treated water, it is preferable to have the mixing volume ratio of diluent water to sea water being 0.1 or more when sea water=1, in the mixing step.

According to the sea water desalinating method, there are advantageous effects in that the amount of energy required for desalinating sea water per unit quantity of the produced fresh water can be securely lowered and corrosion of various devices or instruments used in the mixing step or the mixed water treatment step can be suppressed. Also, as an additional advantageous effect, biological treatment can be carried out with good results when the biological treatment is carried out in the mixed water treatment step.

Furthermore, in the sea water desalinating method using the biologically treated water, it is preferable to filter sea water by using a clarifier and mix the sea water subjected to filtration with diluent water in the mixing step.

According to the sea water desalinating method, there is an advantageous effect in that fresh water with higher degree of purity can be produced. When biologically treated water as diluent water is filtered, the concentration of solid matter in sea water to be mixed with diluent water is suppressed, which produces an advantageous effect in that fresh water can be more efficiently produced.

According to still another aspect of the present invention, there is provided a sea water desalinating apparatus for desalinating sea water by way of filtration using a reverse osmosis membrane device, which includes a mixed water treatment part that mixes, as diluent water, biologically treated water, which is produced by biologically treating organic wastewater, into sea water to produce mixed water, and feeds the mixed water produced by the mixing to the reverse osmosis membrane device, at which the mixed water is filtered.

According to yet another aspect of the present invention, there is provided a sea water desalinating method for desalinating sea water by way of filtration using a reverse osmosis membrane device, which method comprises carrying out a mixing step of mixing sedimentation treated water that is supernatant water produced by sedimentation and separation of inorganic wastewater into sea water to produce mixed water, and a mixed water treatment step of feeding the mixed water produced by the mixing step to the reverse osmosis membrane device, at which the mixed water is filtered, thereby desalinating sea water.

According to the sea water desalinating method, the sedimentation treated water having a salt concentration lower than sea water is, as diluent water, mixed into sea water to produce mixed water, which is fed to the reverse osmosis membrane device and filtered. Whereby, the pressure for pressure-feeding the mixed water to the reverse osmosis membrane device can be lowered as compared with the pressure for pressure-feeding sea water, and therefore the amount of energy required for pressure-feeding per unit quantity of the produced fresh water can be lowered. Since the salt concentration of the fed water that is mixed water to be fed to the reverse osmosis membrane device is lowered, the recovery rate of the treated water can be increased and the amount of energy required for pressure-feeding per unit quantity of the produced fresh water can be lowered. Also, the permeate flux of a membrane of a reverse osmosis membrane device can be increased, and hence the filtration flow rate can be increased. Furthermore, the load to the membrane (chemical load due to salt in salt water, and physical load due to pressure) can be also lowered and hence the operation life of the membrane can be extended. Still furthermore, the sedimentation treated water can be effectively utilized.

In the sea water desalinating method using the sedimentation treated water, it is preferable to carry out a wastewater treatment step of subjecting inorganic wastewater to precipitation and separation to produce sedimentation treated water, filtering the sedimentation treated water by using a clarifier that has at least one of a sand filtration means, a microfiltration membrane and a ultrafiltration membrane to produce permeate, and filtering the permeate using a reverse osmosis membrane device to produce permeate that is purified water and concentrated water, wherein the sedimentation treated water used as the diluent water in the mixing step is the concentrated water.

According to the above sea water desalinating method, purified water can be recovered in the wastewater treatment step to enable producing an advantageous effect of more efficiently recovering purified water.

Furthermore, in the sea water desalinating method using the sedimentation treated water, it is preferable to filter the mixed water by using a clarifier that includes at least one of a sand filtration means, a microfiltration membrane and a ultrafiltration membrane, prior to the filtration using the reverse osmosis membrane device, in the mixed water treatment step.

According to the above sea water desalination method, inorganic solid matter can be suppressed from adhering to the membrane surface of the reverse osmosis membrane device used in the mixed water treatment step, which produces an advantageous effect of more efficiently producing fresh water. As an additional advantageous effect, fresh water with higher degree of purity can be produced.

In the sea water desalinating method using the sedimentation treated water, it is preferable to have the mixing volume ratio of diluent water to sea water being 0.1 or more when sea water=1.

According to the sea water desalinating method, there are advantageous effects in that, with respect to the energy required for desalinating sea water, the amount of energy per unit quantity of the produced fresh water can be securely lowered and corrosion of various devices or instruments used in the mixing step or the mixed water treatment step can be suppressed.

Furthermore, in the sea water desalinating method using the sedimentation treated water, it is preferable to filter sea water using a clarifier and mix the filtered sea water with diluent water in the mixing step.

According to the above sea water desalinating method, there is an advantageous effect in that fresh water with higher degree of purity can be produced. When sedimentation treated water as diluent water is filtered, the concentration of solid matter in the diluent water is lowered and the concentration of solid matter in sea water to be mixed with the diluent water can be suppressed, which produces an advantageous effect in that fresh water can be more efficiently produced.

According to another aspect of the present invention, there is provided a sea water desalinating apparatus for desalinating sea water by way of filtration using a reverse osmosis membrane device, which includes a mixed water treatment part that mixes, as diluent water, sedimentation treated water that is supernatant water produced by sedimentation and separation of inorganic wastewater, into sea water to produce mixed water, and feeds the mixed water produced by the mixing to the reverse osmosis membrane device, at which the mixed water is filtered.

According to still another aspect of the present invention, there is provided a sea water desalinating method for desalinating sea water by way of filtration using a reverse osmosis membrane device, which method includes a mixing step of mixing, as diluent, inorganic wastewater into sea water to produce mixed water, and a mixed water treatment step of feeding the mixed water produced by the mixing step to the reverse osmosis membrane device, at which the mixed water is filtered, thereby desalinating the sea water.

According to the sea water desalinating method, the mixed water produced by mixing, as diluent water, inorganic wastewater having a salt concentration lower than sea water is fed to the reverse osmosis membrane device, at which the mixed water is filtered. Whereby, a pressure for pressure-feeding the mixed water to the reverse osmosis membrane device can be kept lower than the pressure for pressure-feeding sea water. Thus, an amount of energy required for pressure-feeding per unit quantity of produced fresh water can be kept low. Also, the salt concentration of the fed water that is mixed water to be fed to the reverse osmosis membrane device is lowered such that the recovery rate of treated water can be increased and the amount of energy required for pressure-feeding per unit quantity of the produced fresh water can be kept low. Furthermore, the permeate flux of a membrane of a reverse osmosis membrane device can be increased, and hence the filtration flow rate can be increased. Furthermore, the load to the membrane (chemical load due to salt in salt water, and physical load due to pressure) can be lowered and hence the operation life of the membrane can be extended.

According to yet another aspect of the present invention, there is provided a sea water desalinating apparatus for desalinating sea water by way of filtration using a reverse osmosis membrane device, which includes a mixed water treatment part that mixes, as diluent water, inorganic wastewater into sea water to produce mixed water, and feeds the mixed water produced by the mixing to a reverse osmosis membrane device, at which the mixed water is filtered.

According to another aspect of the present invention, there is provided a fresh water generating apparatus that includes a first treatment part that separates low salt concentration wastewater having a salt concentration lower than sea water into permeate and concentrated water by way of reverse osmosis membrane filtration, and a second treatment part that mixes the concentrated water produced at the first treatment part to produce mixed water and separates the mixed water into permeate and concentrated water by way of reverse osmosis membrane filtration, thereby producing fresh water separated as the permeate respectively at the first and second treatment parts, wherein the first treatment part includes a first salt concentration measurement means for measuring the salt concentration of the low salt concentration wastewater, such that the amount of permeate produced at the first treatment part and the amount of permeate produced at the second treatment part are controlled based on the measured value by the first salt concentration measurement means.

In the above fresh water generating apparatus, low salt concentration wastewater is utilized as fresh water resource at the first treatment part, and therefore the energy for generating fresh water can be saved by an amount corresponding to this utilization as compared with the case in which only see water is utilized as a resource of fresh water.

Since sea water can be diluted at the second treatment part, the salt concentration can be lowered. Also, in this point of view, fresh water can be generated with small energy consumption.

Since even sea water is utilized as a resource of fresh water, resources of fresh water can be stably secured, and in a case in which the salt concentration of the low salt concentration wastewater has been changed, the generating amounts at the first treatment part and the second treatment part are controlled such that the total generating amount can be stabilized.

In the fresh water generating apparatus including the salt concentration measurement means, it is preferable that control is made such that the generating amount at the first treatment part is increased while the generating amount at the second treatment part is decreased, when the measured value is not more than, or less than a predetermined reference value.

With the above arrangement, when the measured value of the salt concentration is not more than, or less than a predetermined reference value, a greater amount of fresh water can be produced with the same energy by increasing the recovery rate, as compared with a case in which the measured value is within the reference range.

Thus, the generating amount (amount of fresh water) at the second treatment part, which requires high energy, can be decreased by an amount corresponding to increase in generating amount at the first treatment part. Thus, fresh water can be efficiently generated with the same energy.

According to still another aspect of the present invention, there is provided a fresh water generating apparatus that includes a first treatment part that separates low salt concentration wastewater having a salt concentration lower than sea water into permeate and concentrated water by way of reverse osmosis membrane filtration, and a second treatment part that mixes, as diluent water, the concentrated water produced at the first treatment part into sea water to produce mixed water and separates the mixed water into permeate and concentrated water by way of reverse osmosis membrane filtration, thereby producing permeate as fresh water separated respectively at the first and second treatment parts, wherein the first treatment part includes a flow rate measurement means for measuring the inflow rate of the low salt concentration wastewater flown into the first treatment part, such that the filtration rate at the first treatment part and the filtration rate at the second treatment part are controlled based on the measured value by the flow rate measurement means.

In the fresh water generating apparatus, low salt concentration wastewater is utilized as fresh water resource at the first treatment part, and therefore the energy for generating fresh water can be saved by an amount corresponding to this utilization as compared with the case in which only see water is utilized as a resource of fresh water.

Since sea water can be diluted at the second treatment part, the salt concentration can be lowered. Also, in this point of view, fresh water can be generated with small energy consumption.

Furthermore, even when the amount of intake of the low salt concentration wastewater is decreased, the control can be made such that the filtration rate at the first treatment part is decreased while the filtration rate at the second treatment part at which sea water is utilized as a resource of fresh water. Contrarily, even when the amount of intake of the low salt concentration wastewater is increased, the control can be made such that the filtration rate at the first treatment part is increased while the filtration rate at the second treatment part is decreased. Thus, the amount of fresh water generated can be stabilized without the necessity to provide a huge space for installation of an excessively large storage tank.

Also, it is possible to prevent, for example, the case in which low salt concentration wastewater must be disposed of. Thus, low salt concentration wastewater, from which fresh water can be generated at low cost, can be satisfactorily utilized, and fresh water can be efficiently produced.

In the fresh water generating apparatus including the flow rate measurement means, it is preferable that the first treatment part and the second treatment part each include plural reverse osmosis membrane units for carrying out reverse osmosis membrane filtration, and the number of the reverse osmosis membrane units for carrying out reverse osmosis membrane filtration at the first treatment part and the second treatment part can be controlled based on the measured value by the flow rate measurement means.

In the fresh water generating apparatus, in which the number of the reverse osmosis membrane units to carry out reverse osmosis membrane filtration at each of the treatment parts is controlled, the filtration rate of each of the treatment parts can be easily controlled.

Furthermore, in the above structure, the control is preferably made such that, when the measured value is increased, the number of the reverse osmosis membrane units to carry out reverse osmosis membrane filtration at the first treatment part is increase while the number of the reverse osmosis membrane units to carry out reverse osmosis membrane filtration at the second treatment part is decreased.

With the thus structured fresh water generating apparatus, even when the low salt concentration wastewater flown into the apparatus is increased, the increased low salt concentration wastewater can be satisfactorily utilized as a resource of fresh water by increasing the number of the reverse osmosis membrane units of the first treatment part, while the amount of sea water to be treated, which treatment is costly, can be decreased by decreasing the number of the reverse osmosis membrane units of the second treatment part. Thus, a predetermined amount of fresh water can be efficiently produced.

According to another aspect of the present invention, there is provided a fresh water generating apparatus that includes a first treatment part that separates low salt concentration wastewater having a salt concentration lower than sea water into permeate and concentrated water by way of reverse osmosis membrane filtration, and a second treatment part that mixes, as diluent water, the concentrated water produced at the first treatment part into sea water to produce mixed water and separate the mixed water into permeate and concentrated water by way of reverse osmosis membrane filtration, wherein a part of low salt concentration wastewater of the first treatment part is bypassed to be fed as diluent water into sea water at the second treatment part, thereby producing permeate as fresh water separated respectively at the first and second treatment parts, wherein the first treatment part includes a flow rate measurement means for measuring the flow rate of low salt concentration wastewater flown into the first treatment part, such that the amount of the low salt concentration wastewater to be bypassed can be controlled based on the measured value by the flow rate measurement means.

In the fresh water generating apparatus, when the amount of low concentration wastewater flown is large, a part thereof is bypassed so as to be able to be utilized to dilute sea water, and thereby the salt concentration of sea water at the second treatment part can be lowered. As a result, the power cost required for reverse osmosis membrane filtration at the second treatment part can be reduced.

Furthermore, according to still another aspect of the present invention, there is provided a fresh water generating method that includes carrying out a first treatment step of separating low salt concentration wastewater having a salt concentration lower than sea water into permeate and concentrated water by way of reverse osmosis membrane filtration, and a second treatment step of mixing, as diluent water, the concentrated water produced in the first treatment step into sea water to produce mixed water and separate the mixed water into permeate and concentrated water by way of reverse osmosis membrane filtration, thereby producing permeate as fresh water separated respectively in the first and second treatment steps, wherein the amount of low salt concentration wastewater to be treated is measured, such that the filtration rate of the first treatment step and the filtration rate of the second treatment step are controlled based on the measured value.

Alternatively, there is provided a fresh water generating method that includes carrying out a first treatment step of separating low salt concentration wastewater having a salt concentration lower than sea water into permeate and concentrated water by way of reverse osmosis membrane filtration, and a second treatment step of mixing, as diluent water, the concentrated water produced at the first treatment part into sea water to produce mixed water and separate the mixed water into permeate and concentrated water by way of reverse osmosis membrane filtration, thereby producing permeate as fresh water separated respectively in the first and second treatment steps, wherein the amount of low salt concentration wastewater to be treated is measured, and control is made such that a part of the low salt concentration wastewater is mixed into sea water to dilute the sea water in the second treatment step.

According to the present invention, purified water, such as fresh water can be efficiently produced from non-purified water, such as sea water.

DESCRIPTION OF THE PREFERRED EMBODIMENTS

Now, the description will be made for an embodiment of the present invention with reference to the drawings attached hereto.

First Embodiment

Now, the description will be made for a sea water desalinating apparatus as a fresh water generating apparatus of a first embodiment, and a sea water desalinating method as a fresh water generating method.

Meanwhile, in a conventional sea water desalinating method, sea water must be pressurized and pressure-fed to a reverse osmosis membrane device by a pump or the like in order to subject the sea water to filtration by the reverse osmosis membrane device, which presents a problem in that the higher the salt concentration of sea water, the larger the energy required.

In addition to the above issue regarding sea water, wastewater containing organic matter represented by, for example, sewage water (hereinafter referred also to as "organic wastewater") is generally subjected to biological treatment. Biologically treated water produced by biologically treating this organic wastewater is released to sea or river in the current circumstances, and hence little organic wastewater is efficiently utilized.

In consideration of the above problem, an object of the first embodiment is to provide a sea water desalinating method and a sea water desalinating apparatus that are capable of efficiently producing purified water, such as fresh water, while utilizing biologically treated water produced by biologically treating organic wastewater.

First, the description will be made for a sea water desalinating apparatus of the first embodiment.

Figure 1:
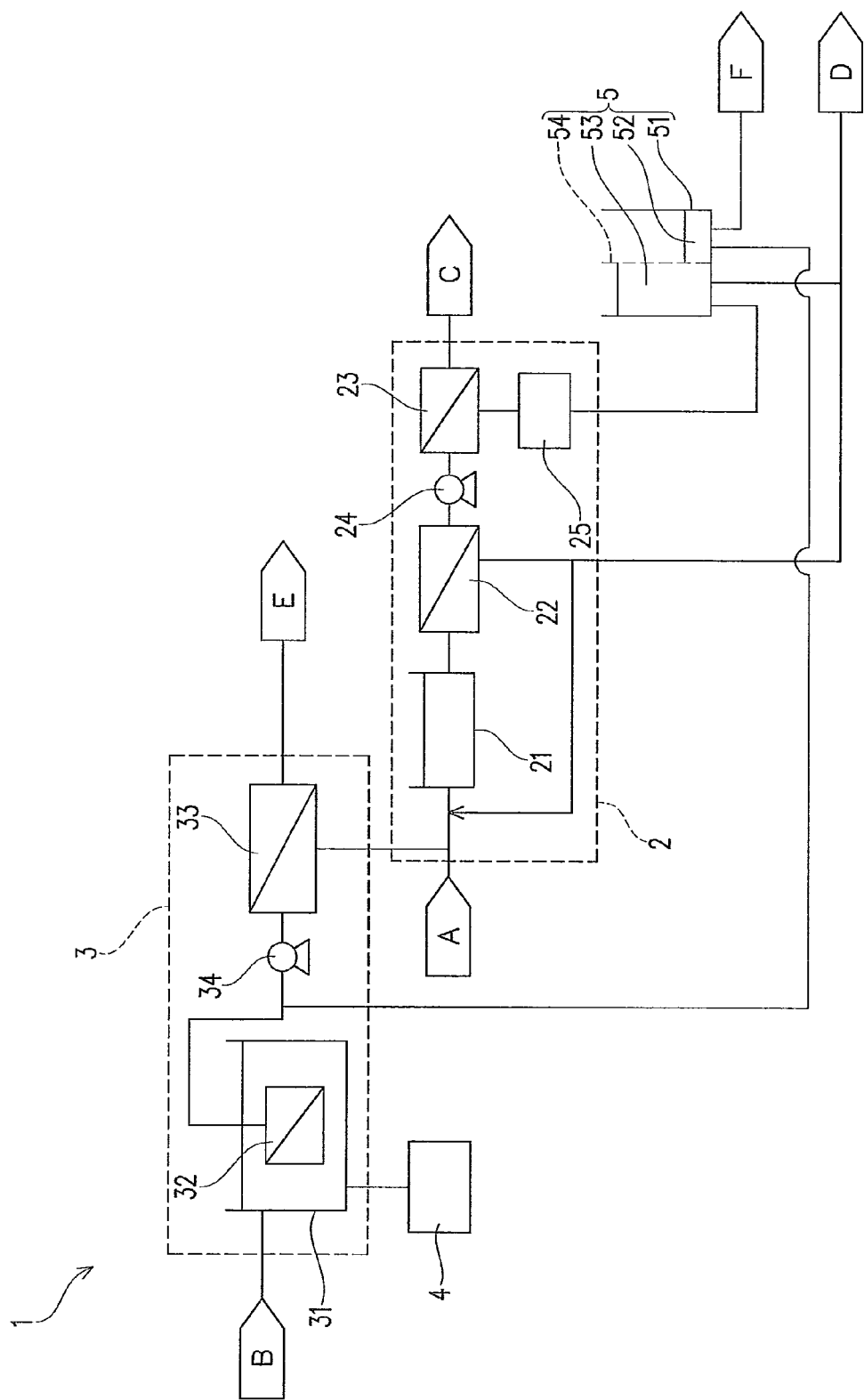
FIG. 1 is a schematic block diagram of a sea water desalinating apparatus according to one embodiment of the present invention.

FIG. 1 is a schematic block diagram of the sea water desalinating apparatus of the first embodiment.

A sea water desalinating apparatus 1 of the first embodiment, as shown in FIG. 1, includes a biological treatment part 3 for biologically treating organic wastewater B by biological species, a mixed water treatment part 2 for mixing, as diluent water, the biologically treated water produced at the biological treatment part 3 into sea water A, feeding the mixed water produced by the mixing to a first osmosis membrane device 23, at which the mixed water is filtered, thereby producing fresh water C that is permeate and concentrated water D, and a methane fermentation part 4 for producing methane by fermenting the biological species proliferated by biological treatment at the biological treatment part 3.

The sea water desalinating apparatus 1 of the first embodiment is configured so as to transfer the sea water A to the mixed water treatment part 2, the organic wastewater B to the biological treatment part 3, and the biologically treated water to the mixed water treatment part 2, the proliferated biological species to the methane fermentation part 4, and the concentrated water D to a concentrated water storage tank (not shown), respectively.

The sea water desalinating apparatus 1 of the first embodiment is configured to recover the fresh water C that is permeate.

The biological treatment is a treatment to decompose organic matter contained in water by biological species, such as bacteria, protozoa and metazoan. A specific example of the biological treatment includes aeration using activated sludge.

The sea water A is water containing salt, and for example, water having a salt concentration of 1.0 to 8.0% by mass, and more specifically, water having a salt concentration of 2.5 to 6.0% by mass.

The sea water A is not herein necessarily limited to water in the sea, and is intended to include water in land area, such as water of lake (salt lake, brackish lake), water of swamps, and water of pond, as long as they are water having a salt concentration of 1.0% by mass or more.

The organic wastewater B is wastewater containing organic matter, and for example, wastewater having a BOD (Biochemical Oxygen Demand), as an index of organic matter concentration, of 2000 mg/L or lower, and more specifically wastewater having a BOD of about 200 mg/L. The organic wastewater B is water having a salt concentration lower than the sea water A. The organic wastewater B is, for example, wastewater having a salt concentration ratio relative to the sea water A of 1:not more than 0.1, and more specifically 1:not more than 0.01.

Examples of the organic wastewater B include sewage water (e.g., domestic wastewater or rainwater flowing into sewage pipes), and industrial wastewater (wastewater discharged from, such as a food factory, a chemical factory, a factory in electronics industry, and a pulp plant).

The mixed water treatment part 2 is configured to mix, as diluent water, biologically treated water produced at the biological treatment part 3 into the sea water A.

The mixed water treatment part 2 includes a first biological treatment tank 21 for biologically treating the mixed water produced by the mixing, a first clarifier 22 that has at least one of a microfiltration membrane (MF membrane) and an ultrafiltration membrane (UF membrane) and clarifies the mixed water, which has been subjected to the biological treatment at the biological treatment tank 21, by way of filtration to thereby produce first permeate and first concentrated water, and a first reverse osmosis membrane device 23 that filters the mixed water that is the first permeate to thereby produce the fresh water C that is second permeate and second concentrated water.

The mixed water treatment part 2 is configured such that biologically treated water produced at the biological treatment part 3 is mixed, as diluent water, into the sea water A to produce mixed water; the mixed water produced by the mixing is transferred to the first biological treatment tank 21 to be biologically treated by the first biological treatment tank 21; the mixed water subjected to the biological treatment is transferred to the first clarifier 22 to be filtered by the first clarifier 22, thereby producing first permeate and first concentrated water; and the first concentrated water is transferred to a concentrated water storage tank (not shown) while the mixed water that is the first permeate is transferred to the first reverse osmosis membrane device 23 to be filtered by the first reverse osmosis membrane device 23, thereby producing the fresh water C that is second permeate and second concentrated water.

By the clarifying is herein meant rougher filtration than reverse osmosis membrane filtration, that is, a treatment carried out prior to the filtration by a reverse osmosis membrane device and made to remove impurities (e.g., solid matter or the like) coarser than those filtered by a reverse osmosis membrane.

The sea water desalinating apparatus 1 of the first embodiment is configured to recover the fresh water C that is the second permeate.

The first reverse osmosis membrane device 23 is of the type that a reverse osmosis membrane (RO membrane) is contained in a pressure vessel.

The mixed water treatment part 2 includes a first pump 24 for pressurizing the first permeate and pressure-feeding the same to the first reverse osmosis membrane device 23, such that the second concentration water is pressure-fed from the first reverse osmosis membrane device 23 by pressure-feeding the first permeate to the first reverse osmosis membrane device 23 via the first pump 24.

The mixed water treatment part 2 includes a first scale-prevention-solution feeding means (not shown) for feeding a scale prevention solution, which contains a scale prevention agent (an agent capable of suppressing the formation of scale on the RO membrane), to the RO membrane of the first reverse osmosis membrane device 23.

Examples of the scale prevention agent include a carboxylic acid polymer, a carboxylic acid polymer blended product and a phosphonate.

The mixed water treatment part 2 further includes a first membrane-cleaning-solution feeding means (not shown) for feeding a membrane cleaning solution, which contains a membrane solution agent (an agent capable of dissolving original substances of crud capable of adhering to a membrane), to the RO membrane of the first reverse osmosis membrane device 23.

No limitation is intended to the material of the membrane cleaning agent, and examples of the membrane cleaning agent include various chemicals, such as an acid, an alkali, an oxidizing agent, a chelating agent and a surface active agent. Examples of the acid include an organic acid (e.g., citric acid, oxalic acid, etc.), an inorganic acid (e.g., hydrochloric acid, sulphuric acid, nitric acid, etc.). An example of the alkali includes sodium hydroxide. Examples of the oxidizing agent include hydrogen peroxide and sodium hypochlorite.

As the membrane cleaning solution, a mixed liquid with two or more kinds of membrane cleaning agents mixed together (e.g., mixture of sodium hydroxide and a surface active agent) may be used.

The mixed water treatment part 2 includes a water turbine 25 that is powered by pressure of the second concentrated water which has been pressure-fed from the first reverse osmosis membrane device 23, and the mixed water treatment part 2 is configured to be capable of being powered upon driving of the water turbine 25 by the pressure of the second concentrated water, which is effected by transferring the second concentrated water pressure-fed from the first reverse osmosis membrane device 23 to the water turbine 25.

The sea water desalinating apparatus 1 of the first embodiment is configured to transfer the second concentrated water, which has been used for driving the water turbine 25, to a concentrated water storage tank (not shown).

The first clarifier 22 is of the type to be installed outside of the first biological treatment tank 21.

The mixed water treatment part 2 includes a second membrane-cleaning-solution feeding means (not shown) for feeding the aforesaid membrane cleaning solution to a membrane of the first clarifier 22.

The biological treatment part 3 includes a second biological treatment tank 31 for biologically treating organic wastewater to produce biologically treated water, a second clarifier 32 that has at least one of a microfiltration membrane (MF membrane) and an ultrafiltration membrane (UF membrane) and is configured to filter the biologically treated water produced at the second biological treatment tank 31 to produce third permeate and third concentrated water, and a second reverse osmosis membrane device 33 for filtering biologically treated water that is third permeate to produce purified water E that is fourth permeate, and biologically treated water that is fourth concentrated water.

The second clarifier 32 is installed as a submerged membrane below the liquid level of the second biological treatment tank 31.

The biological treatment part 3 includes a fourth membrane-cleaning-solution feeding means (not shown) for feeding the aforesaid membrane cleaning solution to a membrane of the second biological treatment tank 31.

The sea water desalinating apparatus 1 of the first embodiment is configured to transfer the organic wastewater B to the second biological treatment tank 31.

The biological treatment part 3 is configured to biologically treat the transferred organic wastewater B at the second biological treatment tank 31 to produce biologically treated water, filter the biologically treated water by using the second clarifier 32 to produce the third permeate and the third concentrated water, transfer the third permeate to the second reverse osmosis membrane device 33, and filter the third permeate by using the second reverse osmosis membrane device 33 to produce the purified water E that is the fourth permeate, and biologically treated water that is the fourth concentrated water.

The sea water desalinating apparatus 1 of the first embodiment is configured to transfer the third concentrated water to the methane fermentation part 4, and transfer, as diluent water, the biologically treated water that is the fourth concentrated water to the mixed water treatment part 2, and recover the fourth permeate as the purified water E.

The second reverse osmosis membrane unit 33 is of the type that a reverse osmosis membrane is contained in a pressure vessel.

By the RO membrane of the second reverse osmosis membrane unit 33 of the first embodiment is intended to include a nano-filtration membrane (NF membrane).

The biological treatment part 3 is configured to feed the third permeate to the second reverse osmosis membrane device 33 after pressurizing the same via a second pump 34.

The biological treatment part 3 includes a second scale-prevention-solution means (not shown) for feeding the aforesaid scale prevention solution to the RO membrane of the second reverse osmosis membrane device 33.

The biological treatment part 3 includes a third membrane-cleaning-solution feeding means (not shown) for feeding the membrane cleaning solution to the RO membrane of the second reverse osmosis membrane device 33.

The sea water desalinating apparatus 1 of the first embodiment is configured to transfer a membrane cleaning solution (referred also to as "used membrane cleaning solution") used for cleaning the membrane to at least one of the first biological treatment tank 21 and the second biological treatment tank 31, when the membrane cleaning agent is an acid, an alkali, a chelating agent, a surface active agent or the like. According to the needs and circumstances, the sea water desalinating apparatus 1 of the first embodiment includes a membrane-cleaning-agent neutralization means (not shown) for neutralizing the used membrane cleaning solution before transferring the used membrane cleaning solution to the biological treatment tank(s). The membrane-cleaning-agent neutralization means is configured to neutralize the used membrane cleaning solution by adding and mixing an acid or an alkali to the used membrane cleaning solution. The membrane-cleaning-agent neutralization means is configured to allow the pH of the neutralized membrane cleaning solution to be preferably in a range of 5 to 9 and more preferably in a range of 6 to 8.

Furthermore, when the membrane-cleaning-agent is an oxidizing agent, the sea water desalinating apparatus 1 of the first embodiment is configured to mix together and dehydrate the used membrane cleaning solution and the third concentrated water, transfer solid matter generated by the dehydration, as third concentrated water, to the methane fermentation part 4, and transfer, as biologically treated water, aqueous solution (supernatant water) generated by the dehydration to the second biological treatment tank 31, according to the needs and circumstances.

The methane fermentation part 4 is configured to produce methane by fermenting biological species contained in the third concentrated water, which is water with biological species concentrated therein, which biological species having been proliferated by the biological treatment at the biological treatment part 3, by anaerobic microorganisms, such as acid generating bacteria and methane generating bacteria.

The sea water desalinating apparatus 1 of the first embodiment includes a steam power production part (not shown) that performs steam power production by combustion of methane produced at the methane fermentation part 4.

The sea water desalinating apparatus 1 of the first embodiment is configured to increase the temperature of biologically treated water within the biological treatment tank by waste heat, such as steam generated at the steam power production part. Furthermore, the sea water desalinating apparatus 1 of the first embodiment is configured to increase the temperature of objective water to be transferred to the membrane system for membrane treatment by the aforesaid waste heat.

The sea water desalinating apparatus 1 of the first embodiment includes a concentration difference power production part 5 that generates power by utilizing the difference between the salt concentration of the second concentrated water and the salt concentration of the third permeate.

The concentration difference power production part 5 includes a tank 51, a semi-permeable membrane 54 for dividing the inside of the tank 51 into two sections.

The concentration difference power production part 5 further includes a third permeate accommodation part 52 for accommodation of the third permeate and a second concentrated water accommodation part 53 for accommodation of the second concentrated water.

The third permeate accommodation part 52 and the second concentrated water accommodation part 53 are formed by dividing the inside of the tank 51 into the two sections by the semi-permeable membrane 54.

The sea water desalinating apparatus 1 of the first embodiment is configured to transfer a part of the third permeate to the third permeate accommodation part 52 and transfer the second concentrated water to the second concentrated water accommodation part 53 before transferring to a concentrated water storage tank (not shown).

The concentration difference power production part 5 is configured to generate power by utilizing the height difference in liquid level caused by the increase in the liquid level of the third permeate accommodation part 52, which height difference is in turn caused by the transfer of only the water content of the second concentrated water via the semi-permeable membrane 54 to the third permeate accommodation part 52, which transfer is in turn caused by the difference in salt concentration between the second concentrated water and the third permeate.

The sea water desalinating apparatus 1 of the first embodiment is configured to transfer, as the concentrated water D, the second concentrated water used at the concentration difference power production part 5 and the water content of the third permeate to a concentrated water storage tank (not shown), and recover, as industrial water F, the third permeate used at the concentration difference power production part 5 and remained in the third permeate accommodation part 52.

The concentration difference power production part 5 may be configured to generate power by using the purified water E or the fresh water C in place of the third permeate. That is, the concentration difference power production part 5 may include a purified water accommodation part for accommodation of the purified water E or a fresh water accommodation part for accommodation of the fresh water C. In this case, the sea water desalinating apparatus 1 of the first embodiment is configured to transfer the purified water E or the fresh water C to the concentration difference power production part 5.

Now, the description will be made for a sea water desalinating method of the first embodiment.

The sea water desalinating method of the first embodiment includes carrying out a mixing step of mixing, as diluent water, biologically treated water produced by biologically treating organic wastewater into sea water, and a mixed water treatment step of feeding the mixed water produced by the mixing step to a reverse osmosis membrane device, at which the mixed water is filtered.

Specifically, the sea water desalinating method of the first embodiment is a method of desalinating sea water A by carrying out a wastewater treatment step of biologically treating organic wastewater B within the inside of the second biological treatment tank 31 to produce biologically treated water, filtering the biologically treated water by using the second clarifier 32 to produce third permeate and third concentrated water, and filtering biologically treated water that is the third permeate by using the second reverse osmosis membrane device 33 to produce fourth permeate and biologically treated water that is fourth concentrated water, a mixing step of mixing, as the aforesaid diluent water, biologically treated water that is the fourth concentrated water into the sea water A to produce mixed water, and a mixed water treatment step of biologically treating the mixed water produced by the mixing step within the first biological treatment tank 21 to produce biologically treated water, then filtering the biologically treated water by using the first clarifier 22 to provide first permeate and first concentrated water, and filtering the mixed water that is the first permeate by using the first reverse osmosis membrane device 23 to provide second permeate and second concentrated water.

In the mixing step, the mixing volume ratio of the sea water A to the diluent water is preferably 1 to 0.1 or more, and more preferably 1 to 1 or more, in order to make the dilution effect significant.

The sea water desalinating method of the first embodiment is advantageous in the fact that, by having the mixing volume ratio of the sea water A to the diluent water being 1 to 0.1 or more, the salt concentration can be lowered and the amount of energy required for desalinating the sea water A per unit quantity of the produced fresh water can be securely saved, and corrosion of various devices or instruments used in the mixing step or the mixed water treatment step. Furthermore, there is another advantageous effect in that biological treatment in the mixed water treatment step can be carried out with good results.

In the sea water desalinating method of the first embodiment, the salt concentration of the mixed water is preferably 3.0% by mass or lower, and more preferably 1.8% by mass or lower. Furthermore, in the sea water desalinating method of the first embodiment, the salt concentration of the diluent water is preferably one third or less of the salt concentration of the sea water A to be diluted with diluent water, and more preferably one tenth or less of the salt concentration of the sea water A to be diluted with diluent water. The sea water desalinating method of the first embodiment is also advantageous in that, by having the salt concentration of diluent water being one third or less of the salt concentration of the sea water A to be diluted with diluent water, the fresh water C with higher degree of purity can be produced.

The sea water desalinating apparatus of the first embodiment and the sea water desalinating method of the first embodiment configured as mentioned above produce the following advantageous effects.

According to the sea water desalinating method of the first embodiment, which includes carrying out the mixing step of mixing, as diluent water, biologically treated water having a salt concentration lower than the sea water A into the sea water A, and the mixed water treatment step of feeding the mixed water produced by carrying out the mixing step to the first reverse osmosis membrane device 23, at which the mixed water is filtered, thereby desalinating the sea water A, the pressure for pressure-feeding the mixed water to the first reverse osmosis membrane unit 23 can be kept lower than the pressure for pressure-feeding the sea water A. Whereby, the amount of energy required for pressure-feeding per unit quantity of produced fresh water C can be saved. Also, the permeate flux of a membrane of the first reverse osmosis membrane device 23 can be increased, and hence the filtration flow rate can be increased. Furthermore, the load to the membrane of the first reverse osmosis membrane device 23 (chemical load due to salt in the sea water A, and physical load due to pressure) can be lowered and hence the operation life of the membrane can be extended. Still furthermore, the biologically treated water can be effectively utilized.

According to the sea water desalinating method of the first embodiment, the filtration of the mixed water is made using the first clarifier 22 prior to the filtration using the first reverse osmosis membrane device 23 in the mixed water treatment step. Whereby, it is possible to suppress organic solid substance or salt from adhering onto the membrane surface of the first reverse osmosis membrane device 23, and hence produce an advantageous effect in that fresh water C can be more efficiently produced. There is also an advantageous effect in that the fresh water C with higher degree of purity can be produced.

According to the sea water desalinating method of the first embodiment, the biological treatment of the mixed water is made prior to the filtration of the mixed water using the first clarifier 22 in the mixed water treatment step. Whereby, the concentration of dissoluble organic substance in the mixed water is reduced, which makes it possible to produce advantageous effects of suppressing proliferation of microorganisms generated between the first clarifier 22 and the first reverse osmosis membrane device 23 and suppressing organic solid matter, such as microorganisms, from adhering to the membrane surface of the first reverse osmosis membrane device 23, and hence more efficiently producing the fresh water C. As an additional advantageous effect, the fresh water C with higher degree of purity can be produced.

According to the sea water desalinating method of the first embodiment, purified water E can be recovered in a wastewater treatment step by carrying out the wastewater treatment step of biologically treating organic wastewater within the second biological treatment tank 31 to produce biologically treated water, then filtering the biologically treated water using the second clarifier 32 to produce the third permeate and the third concentrated water, and then filtering the third permeate using the second reverse osmosis membrane device 33 to produce the fourth permeate and the fourth concentrated water. Thus, there is an advantageous effect in that purified water can be more efficiently recovered.

According to the sea water desalinating apparatus 1 of the first embodiment, the second clarifier 32 is installed as a submerged membrane below the liquid level of the second biological treatment tank 31. Whereby, when activated sludge is used for biological treatment, it is possible to produce, through the submerged membrane, only the filtrate containing little activated sludge from biologically treated water containing activated sludge. Therefore, there are advantageous effects in that the concentration of biological species in the second biological treatment tank 31 can be increased and the volume of the second biological treatment tank 31 can be reduced. As additional advantageous effects, the sea water desalinating apparatus 1 can be further reduced in size as compared with the arrangement in which the second clarifier 32 is installed outside of the biological treatment tank, and furthermore it is possible to omit a passage for returning sludge concentrated in the second clarifier 32 to the second biological treatment tank 31.

By having the sea water desalinating apparatus 1 of the first embodiment configured to feed the first permeate to the first reverse osmosis membrane device 23 after pressurizing the first permeate via the first pump 24 to produce the second concentrated water, and to be powered by driving the water turbine 25 by the pressure of the second concentrated water, there is an advantageous effect in that an energy can be produced. Furthermore, when the produced energy is utilized in a step of producing purified water from sea water or sewage water, there is an advantageous effect in that purified water can be more efficiently recovered.

By having the sea water desalinating apparatus 1 of the first embodiment configured to include the methane fermentation part 4 capable of producing methane by fermenting biological species proliferated by biological treatment at the biological treatment part 3, there is an advantageous effect in that an energy can be produced. Furthermore, when the produced energy is utilized in a step of producing purified water from sea water or sewage water, there is an advantageous effect in that purified water can be more efficiently recovered. As an additional advantageous effect, excessive biological species can be disposed while being effectively utilized.

By having the sea water desalinating apparatus 1 of the first embodiment configured to include the steam power production part such that the temperature of the biologically treated water is increased in the biological treatment tank by waste heat, such as steam generated at the steam power production part, it is possible to increase the temperature of biologically treated water within the biological treatment tank to a high temperature at which biological species are high in activity, when the temperature is low and biological species are low in activity within activated sludge, especially during the winter season. Thus, there are advantageous effects in that purified water can be more efficiently recovered while at the same time effectively utilizing the produced energy.

By having the sea water desalinating apparatus 1 of the first embodiment configured to include the steam power production part such that the temperature of to-be-treated water transferred to the membrane system for membrane treatment is increased by waste heat, such as steam generated at the steam power production part, the viscosity of the to-be-treated water is lowered and hence the permeate flux of the to-be-treated water is easily increased. Thus, there is an advantageous effect in that purified water can be more efficiently recovered.

By having the sea water desalinating apparatus 1 of the first embodiment configured to include the concentration difference power production part 5 that produces power by utilizing the difference between the salt concentration of the second concentrated water, which is higher in salt concentration than the mixed water, and the salt concentration of the third permeate, there is an advantageous effect in that energy can be produced. When this produced energy is utilized in a step of producing purified water from sea water or sewage water, there is an advantageous effect in that purified water can be more efficiently recovered.

Furthermore, by having the sea water desalinating apparatus 1 of the first embodiment configured to include the first scale-prevention-solution feeding means and the second scale-prevention-solution feeding means, there is an advantageous effect in that scale, which may be able to be generated on the reverse osmosis membrane of the first reverse osmosis membrane device 23 and the reverse osmosis membrane of the second reverse osmosis membrane device 33, can be suppressed. Thus, there is an advantageous effect in that purified water can be more efficiently recovered.

By having the sea water desalinating apparatus 1 of the first embodiment configured to transfer the used membrane cleaning solution to the biological treatment tank when the membrane cleaning solution is an acid, an alkali, a chelating agent or a surface active agent, there is an advantageous effect in that organic matter contained in the used membrane cleaning solution can be decomposed within the biological treatment tank, and therefore the organic matter of the used membrane cleaning solution is not needed to be separately decomposed.

By having the sea water desalinating apparatus 1 of the first embodiment configured, when the membrane-cleaning-agent is an oxidizing agent, to mix together and dehydrate the used membrane cleaning solution and the third concentrated water, transfer, as the third concentrated water, solid matter generated by the dehydration to the methane fermentation part 4, and transfer, as the biologically treated water, aqueous solution (supernatant water) generated by the dehydration to the second biological treatment tank 31, there is an advantageous effect in that it is possible to decompose organic matter contained in the used membrane cleaning solution in the biological treatment tank while inhibiting death of biological species by an oxidizing agent, and hence omit the necessity to separately decompose organic matter of the used membrane cleaning solution.

While the sea water desalinating apparatus of the first embodiment and the sea water desalinating method of the first embodiment present the above advantageous effects, the sea water desalinating apparatus of the present invention and the sea water desalinating method of the present invention are not necessarily limited to the above arrangements, and may be modified according to the needs and circumstances.

Figure 2:
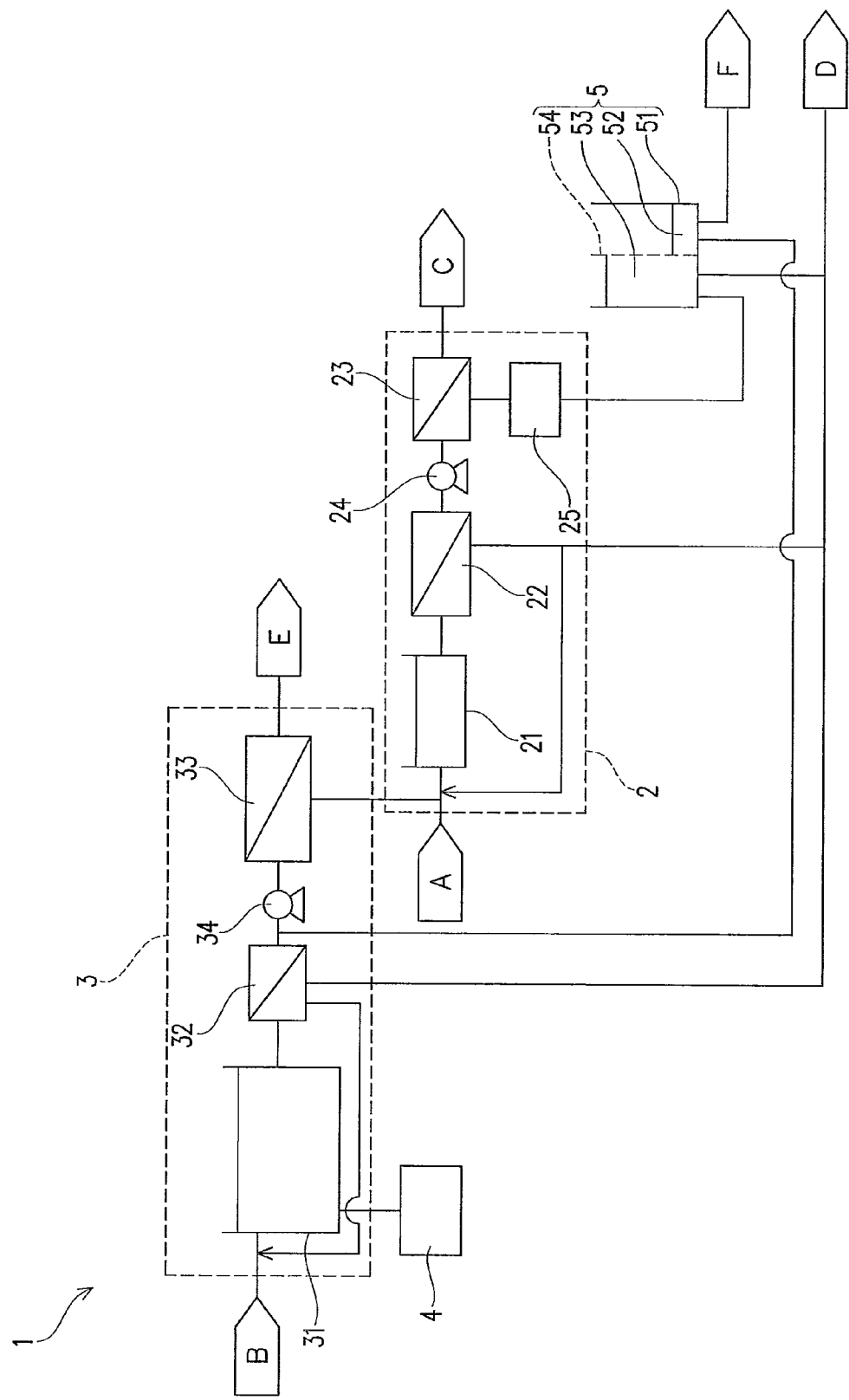
FIG. 2 is a schematic block diagram of a sea water desalinating apparatus according to another embodiment of the present invention.

For example, in the sea water desalinating apparatus 1 of the first embodiment, the second clarifier 32 is installed as a submerged membrane below the liquid level of the second biological treatment tank 31. However, as shown in FIG. 2, the second clarifier 32 may be of the type that is installed outside of the second biological treatment tank 31. In this case, the sea water desalinating apparatus 1 of the present invention is configured to transfer biologically treated water that has been biologically treated at the second biological treatment tank 31 to the second clarifier 32.

In the sea water desalinating apparatus 1 of the first embodiment, the first clarifier 22 is of the type that is installed outside of the first biological treatment tank 21. However, the first clarifier 22 may be of the type that is installed as a submerged membrane below the liquid level of the first biological treatment tank 21.

The sea water desalinating apparatus 1 of the first embodiment includes the first scale-prevention-solution feeding means and the second scale-prevention-solution feeding means. However, the sea water desalinating apparatus 1 may include only the second scale-prevention-solution feeding means while not including the first scale-prevention-solution feeding means, in which a scale prevention solution fed to the second reverse osmosis membrane device 33 by the second scale-prevention-solution feeding means is discharged, as the fourth concentrated water, from the second reverse osmosis membrane device 33, and the scale prevention solution is fed to the first reverse osmosis membrane device 23.

According to the thus configured sea water desalinating apparatus 1 of the first embodiment, the scale prevention solution is difficult to permeate through a reverse osmosis membrane, and thus a scale prevention solution used at the second reverse osmosis membrane device 33 can be utilized at the first reverse osmosis membrane device 23, as well, and power required for feeding the scale prevention solution can be saved, which produces an advantageous effect in that purified water can be more efficiently recovered.

In this case, the sea water desalinating apparatus 1 of the present invention may be configured such that a scale prevention solution discharged, as the fourth concentrated water, from the second reverse osmosis membrane device 33 is fed to the first reverse osmosis membrane device 23 via the first biological treatment tank 21, the first clarifier 22 and the like, or may be configured such that the scale prevention solution is fed directly to the first reverse osmosis membrane device 23 without passing the first biological treatment tank 21, the first clarifier 22 and the like. Especially, according to the sea water desalinating apparatus 1 of the present invention, in which the scale prevention solution is fed directly to the first reverse osmosis membrane device 23 without passing the first biological treatment tank 21, the first clarifier 22 and the like, there is an advantageous effect in that the scale prevention solution is suppressed from being diluted at the first biological treatment tank 21, the first clarifier 22 and the like, thereby the scale prevention solution is efficiently fed to the first reverse osmosis membrane device 23, and thus purified water can be more efficiently recovered.

According to the sea water desalinating method of the first embodiment, in the mixed water treatment step, the biological treatment of the mixed water using the first biological treatment tank 21 is carried out and the filtration of the mixed water subjected to the biological treatment using the first clarifier 22 is carried out, prior to the filtration using the first reverse osmosis membrane device 23. However, the sea water desalinating method of the present invention may be configured such that the biological treatment of the mixed water by the first biological treatment tank 21 and the filtration of the mixed water by the first clarifier 22 are not carried out.

Figure 3:
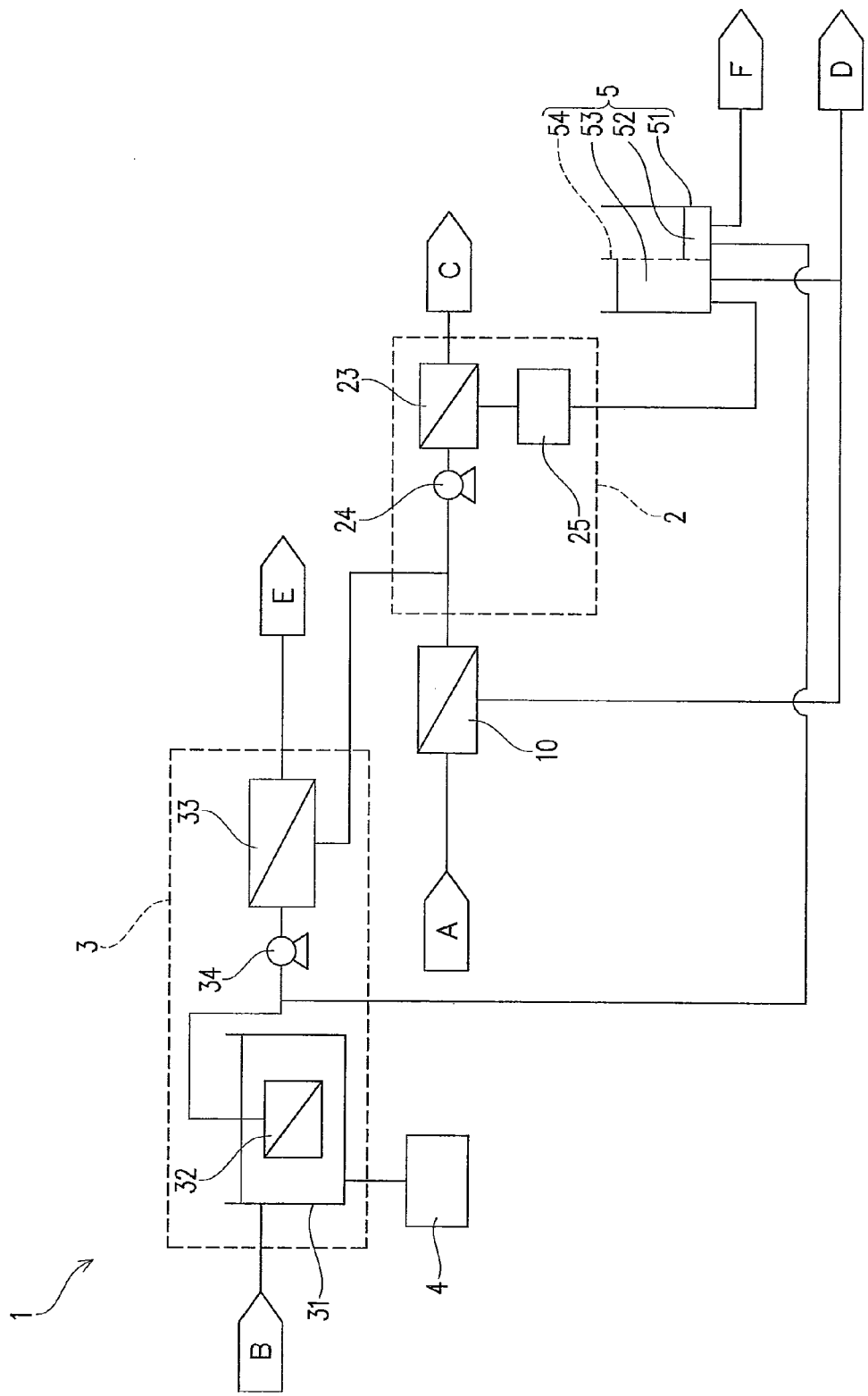
FIG. 3 is a schematic block diagram of a sea water desalinating apparatus according to still another embodiment of the present invention.
Figure 4:
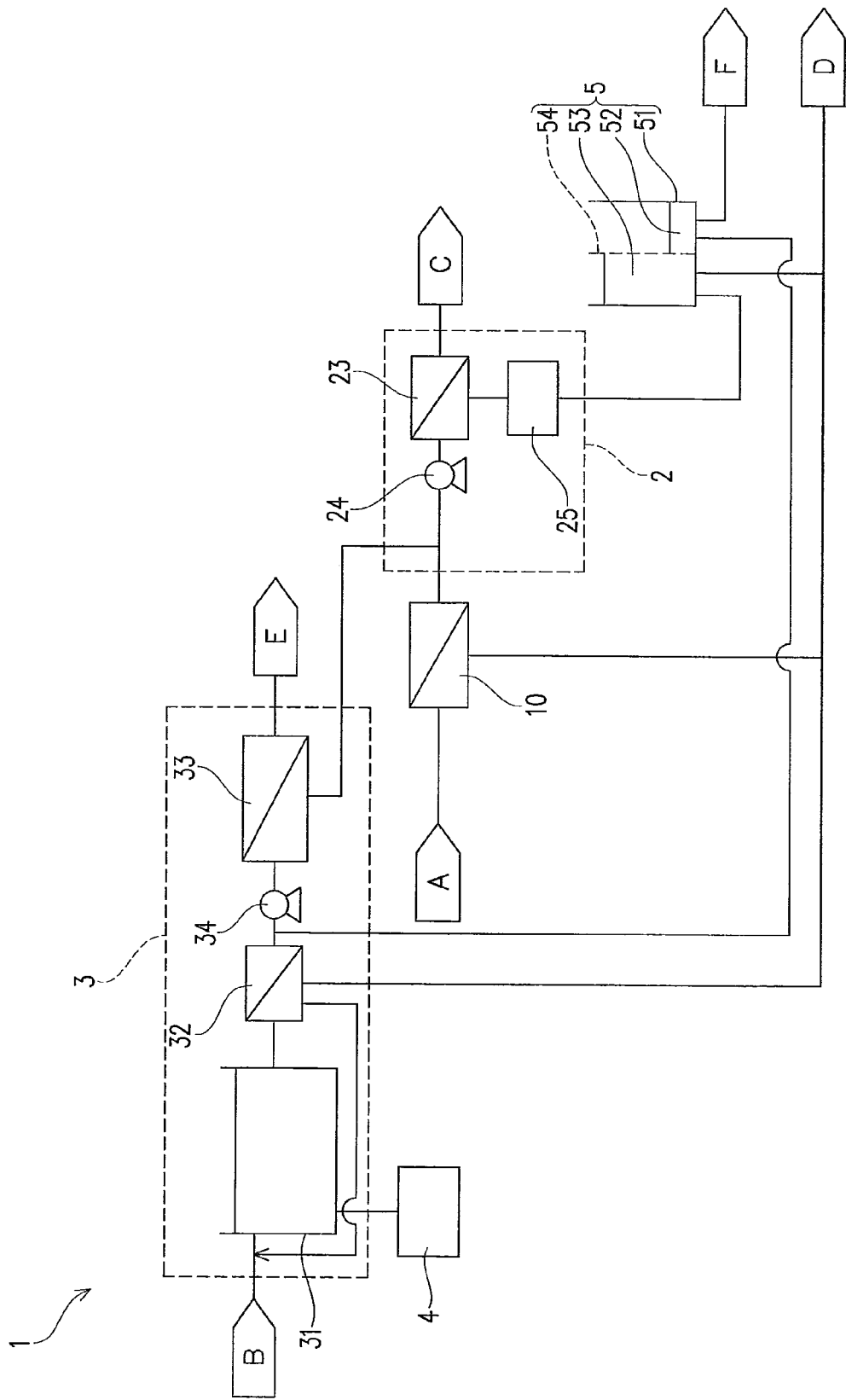
FIG. 4 is a schematic block diagram of a sea water desalinating apparatus according to yet another embodiment of the present invention.

In the above form of the sea water desalinating method of the present invention, as shown in FIGS. 3 and 4, it is preferable to employ an arrangement, in which, prior to the mixing of biologically treated water that is the fourth concentrated water, as diluent water, into the sea water A, the sea water A is filtered using a third clarifier 10 that has at least one of a microfiltration membrane (MF membrane) and an ultrafiltration membrane (UF membrane) to produce fifth permeate and fifth concentrated water, and the sea water A that is the fifth permeate is mixed with the diluent water to produce mixed water.

According to the sea water desalinating method, there is an advantageous effect in that fresh water C with higher degree of purity can be produced. There is another advantageous effect in that, when biologically treated water as diluent water has been filtered, the concentration of solid matter in the diluent water is lowered and the concentration of solid matter in the sea water A to be mixed with the diluent water is kept low, and thereby the fresh water C can be more efficiently produced.

In the sea water desalinating method of the present invention, the fifth concentrated water can be treated as concentrated water similar to the first concentrated water.

In the sea water desalinating method of the first embodiment, the third permeate produced at the second clarifier 32 is filtered using the second reverse osmosis membrane device 33 in the wastewater treatment step. However, it is possible to employ an arrangement in which filtration of the third permeate by the second reverse osmosis membrane device 33 is not carried out.

Figure 5:
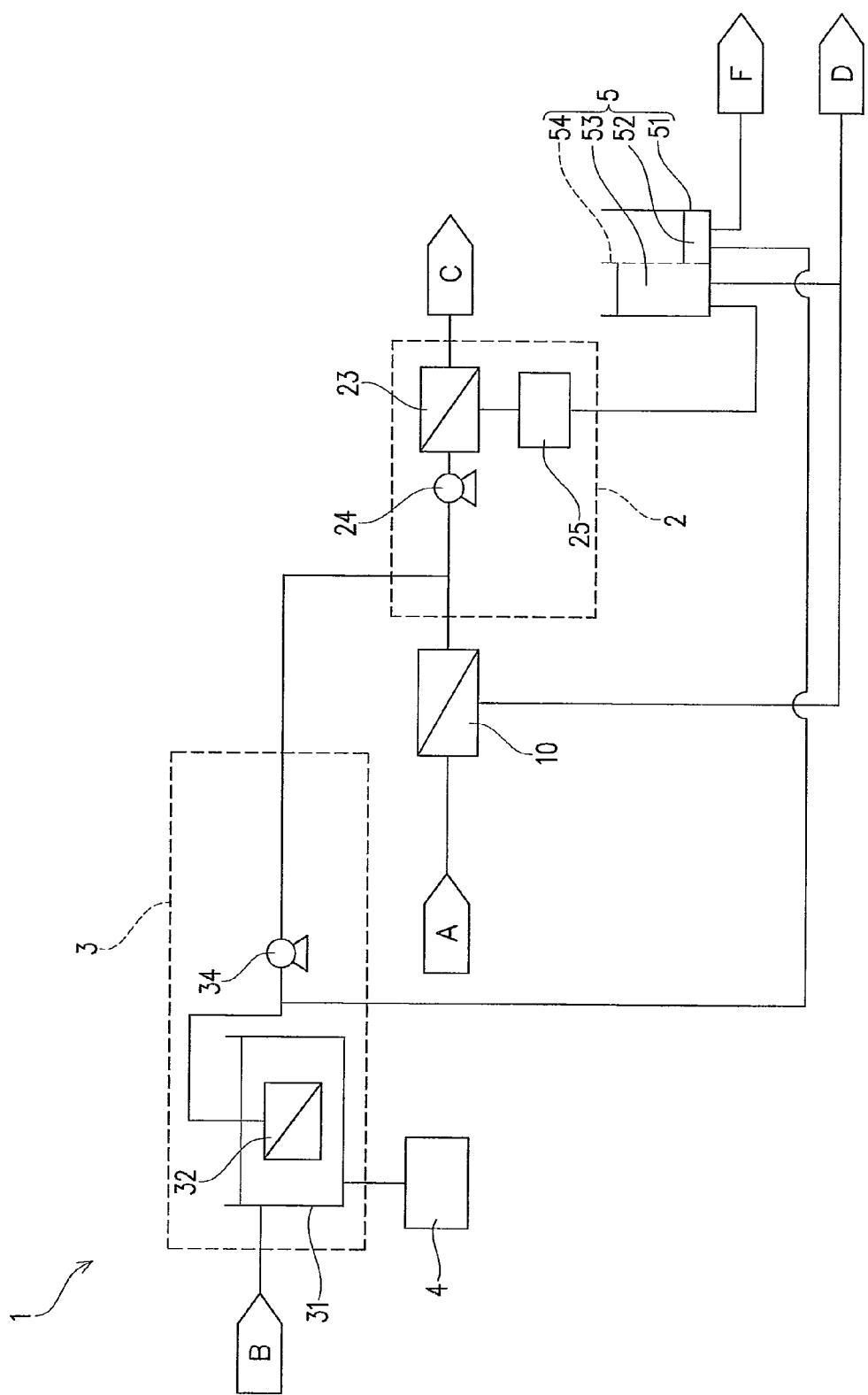
FIG. 5 is a schematic block diagram of a sea water desalinating apparatus according to another embodiment of the present invention.
Figure 6:
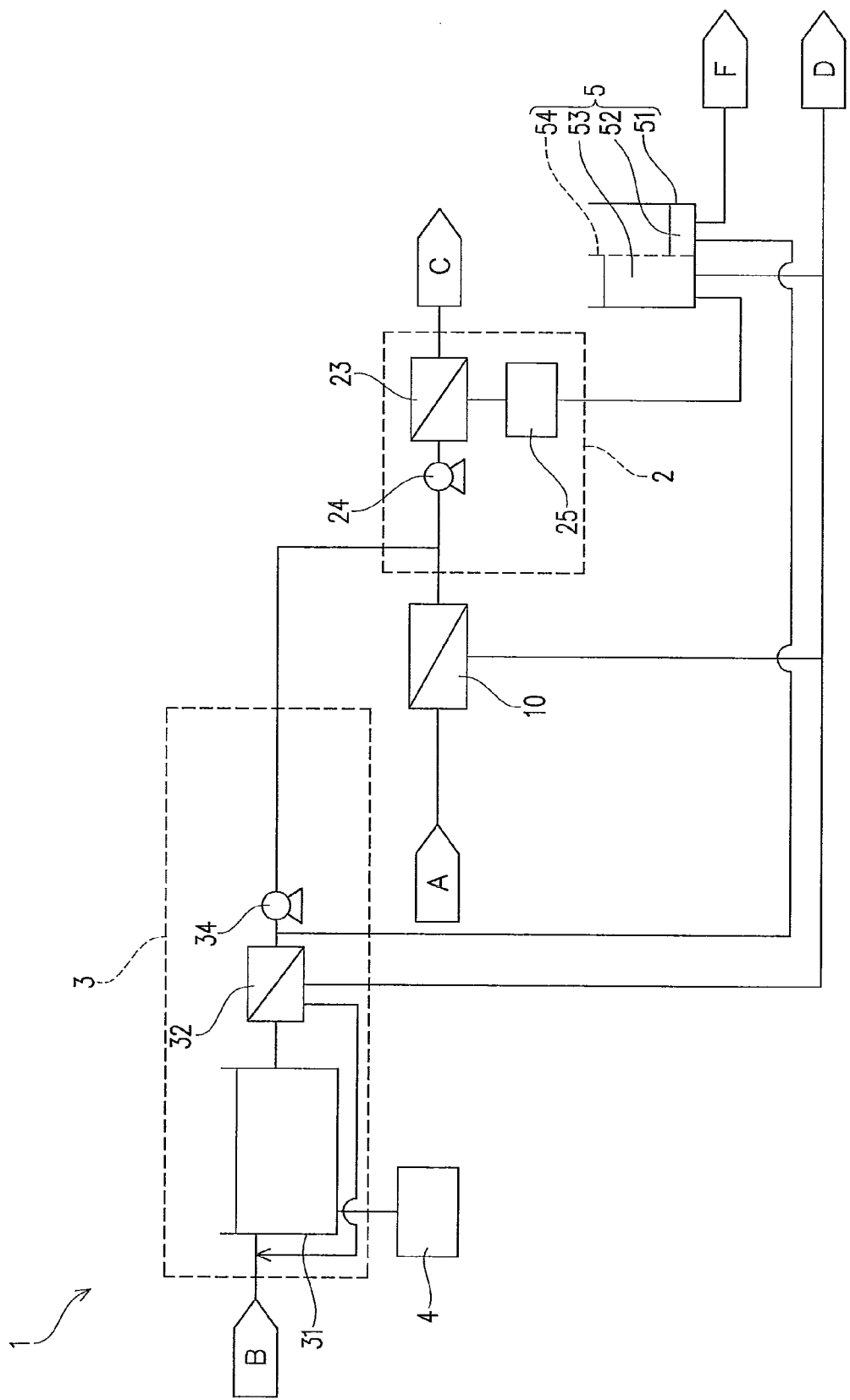
FIG. 6 is a schematic block diagram of a sea water desalinating apparatus according to still another embodiment of the present invention.

In the above form of the sea water desalinating method of the present invention, as shown in FIGS. 5 and 6, it is preferable to employ an arrangement in which, prior to the mixing of biologically treated water that is the third permeate, as diluent water, into the sea water A, the sea water A is filtered using the third clarifier 10 that has at least one of a microfiltration membrane (MF membrane) and an ultrafiltration membrane (UF membrane), and the sea water A filtered using the third clarifier 10 is mixed with, as diluent water, biologically treated water that is the third permeate to produce mixed water.

In the sea water desalinating method of the first embodiment, biological species proliferated at the biological treatment part 3 are fermented by the methane fermentation part 4 to produce methane, while it is possible to subject the biological species to another treatment, such as dehydration, in the sea water desalinating method of the present invention.

In the first embodiment, the first clarifier 22 is configured to filter mixed water transferred to the first clarifier 22 by at least one of a microfiltration membrane (MF membrane) and an ultrafiltration membrane (UF membrane), while it may be configured to filter the mixed water by sand filtration means having a sand filter. The first embodiment is configured in this matter to produce an advantageous effect in that impurities of a large amount of water can be removed with low power.

In the arrangement in which sand filtration is carried out, the first clarifier 22 may be configured to carry out sand filtration by one stage, or by two or more stages.

By the stage of sand filtration is meant the number of sand filters connected in tandem.

In the arrangement in which sand filtration is carried out, the first clarifier 22 may be configured to further filter mixed water, which has been subjected to sand filtration, by at least one of a microfiltration membrane (MF membrane) and an ultrafiltration membrane (UF membrane).

In the arrangement in which the first clarifier 22 is to carry out sand filtration, the first clarifier 22 is provided with a cleaning means (not shown) for cleaning a sand filter layer.

In the first embodiment, the second clarifier 32 is configured to filter biologically treated water, which has been transferred to the second clarifier 32, by at least one of a microfiltration membrane (MF membrane) and an ultrafiltration membrane (UF membrane), while the second clarifier 32 may be configured such that biologically treated water is subjected to solid-liquid separation in a sedimentation tank and the biologically treated water subjected to solid-liquid separation is filtered by a sand filtration means.

In the arrangement in which sand filtration is carried out, the second clarifier 32 may be configured to carry out sand filtration by one stage, or by two or more stages.

In the arrangement in which sand filtration is carried out, the second clarifier 32 may be configured such that the biologically treated water subjected to sand filtration is further filtered by at least one of a microfiltration membrane (MF membrane) and an ultrafiltration membrane (UF membrane).

In the first embodiment, the second clarifier 32 may be configured such that biologically treated water is subjected to solid-liquid separation in a sedimentation tank, and the biologically treated water subjected to solid-liquid separation is filtered by at least one of a microfiltration membrane (MF membrane) and an ultrafiltration membrane (UF membrane).

In the arrangement in which the second clarifier 32 is to carry out sand filtration, the second clarifier 32 is provided with a cleaning means (not shown) for cleaning a sand filter layer.

When the first embodiment includes the third clarifier 10, in the first embodiment, the third clarifier 10 is configured to have the sea water A, which is transferred to the third clarifier 10, filtered by at least one of a microfiltration membrane (MF membrane) and an ultrafiltration membrane (UF membrane), while the third clarifier 10 may be configured to have the sea water A filtered by a sand filtration means.

In the arrangement in which sand filtration is carried out, the third clarifier 10 may be configured to carry out the sand filtration by one stage, or by two or more stages.

In the arrangement in which sand filtration is carried out, the third clarifier 10 may be configured such that sea water, which has been filtered by the sand filtration means, is further filtered by least one of a microfiltration membrane (MF membrane) and an ultrafiltration membrane (UF membrane).

In the arrangement in which the third clarifier 10 is to carry out sand filtration, it is provided with a cleaning means (not shown) for cleaning a sand filter layer.

In the first embodiment, it is possible to employ an arrangement in which power generation is made by utilizing natural energies (e.g., wave power, tidal power, wind power, solar power and geothermal sources), and the power thus produced from natural energies is utilized as a driving power for a pump or the like of the sea water desalinating apparatus 1 of the first embodiment. The first embodiment is advantageous in that it is possible to suppress generation of gasses, such as carbon dioxide, which may be able to cause influences on the environment, hold in running out of fossil fuels, or prevent risks, such as nuclear accidents, by utilizing power produced from natural energies.

The sea water desalinating apparatus 1 of the first embodiment is provided with the water turbine 25 in the mixed water treatment part 2, while a pressure converter (a pressure recovery device) for converting the pressure of the second concentrated water, which has been pressure-fed from the first reverse osmosis membrane device 23, to the pressure for transferring mixed water directly (without intervention of electricity) to the first reverse osmosis membrane device 23, may be provided in place of the water turbine 25.

When the pressure converter is provided, the sea water desalinating apparatus 1 of the first embodiment is configured such that the second concentrated water, which has been pressure-fed from the first reverse osmosis membrane device 23, is transferred to the pressure converter, and the second concentrated water used at the pressure converter is transferred to a concentrated water storage tank. The sea water desalinating apparatus 1 of the first embodiment is configured such that mixed water is transferred to the pressure converter before it passes through the first pump 24, and mixed water pressurized at the pressure converter is transferred to the first reverse osmosis membrane device 23 via the first pump 24.

The sea water desalinating apparatus 1 of the first embodiment thus configured is advantageous in that the power of the first pump 24 can be saved.

The sea water desalinating apparatus 1 of the first embodiment is configured such that the third concentrated water is transferred to the methane fermentation part 4, while the sea water desalinating apparatus 1 may be provided with a solubilization means that decomposes, dissolves and solubilizes biological species (when biological species are contained in activated sludge, activated sludge is also meant as biological species) contained in the third concentrated water by, for example, chemicals (an alkali, an acid, an oxidizing agent or the like), ultrasonic waves, heat, and microorganisms having a capability of solubilizing activated sludge.

In the case of providing the solubilization means, the sea water desalinating apparatus 1 of the first embodiment is configured such that the third concentrated water is transferred to the solubilization means, and the third concentrated water that is a solubilized liquid is transferred to the methane fermentation part 4. In the case in which solubilization is made by chemicals, the sea water desalinating apparatus 1 of the first embodiment is configured such that a solubilized liquid is adjusted in pH to close to neutral (e.g., pH 6-8) according to the needs and circumstances, and the third concentrated water that is the solubilized liquid with its pH adjusted is transferred to the methane fermentation part 4.

The first embodiment thus configured is advantageous in that biological species are decomposed by the solubilization means and therefore the biological species can be easily decomposed by anaerobic microorganisms (methane generating bacteria, etc.).

As chemicals used by the solubilization means, chemicals (an alkali, an acid, an oxidizing agent) used for cleaning a membrane of a reverse osmosis membrane or the like are preferable. In the first embodiment, when the chemicals used as the solubilization means are chemicals used for the cleaning, there is an advantageous effect in that the necessity to separately subject the used chemicals to a treatment making them non-hazardous can be reduced.

The sea water desalinating apparatus 1 of the first embodiment may include a hydro extractor that separates methane fermentation digestion liquid, which has been produced by the methane fermentation of biological species of the third concentrated water at the methane fermentation part 4, into dehydration cake and supernatant water, and an incineration equipment for incineration of the dehydration cake.

In the case of providing the hydro extractor and the incineration equipment, the sea water desalinating apparatus 1 of the first embodiment is configured such that the methane fermentation digestion liquid is transferred to the hydro extractor, the dehydration cake is transferred to the incineration equipment, and the supernatant water is transferred, as biologically treated water, to the second biological treatment tank 31. The sea water desalinating apparatus 1 of the first embodiment is preferably configured to include the solubilization means so as to enable the third concentrated water that is the solubilized liquid to be transferred to the methane fermentation part 4. The sea water desalinating apparatus 1 of the first embodiment thus configured enables biological species to be decomposed by the solubilization means to be thereby easily decomposable by anaerobic microorganisms (methane generating bacteria, etc.), and thereby improves the decomposition efficiency of biological species by anaerobic microorganisms. Therefore, in the sea water desalinating apparatus 1 of the first embodiment, the amount of solid content in the methane fermentation digestion liquid is kept low, and hence the amount of dehydration cake to be incinerated at the incineration equipment is kept low, which produces an advantageous effect in that incineration costs at the incineration equipment can be kept low.

In the case of providing the solubilization means, the sea water desalinating apparatus 1 of the first embodiment may be configured such that solubilized liquid is transferred, as biologically treated water, to the second biological treatment tank 31.

Figure 7:
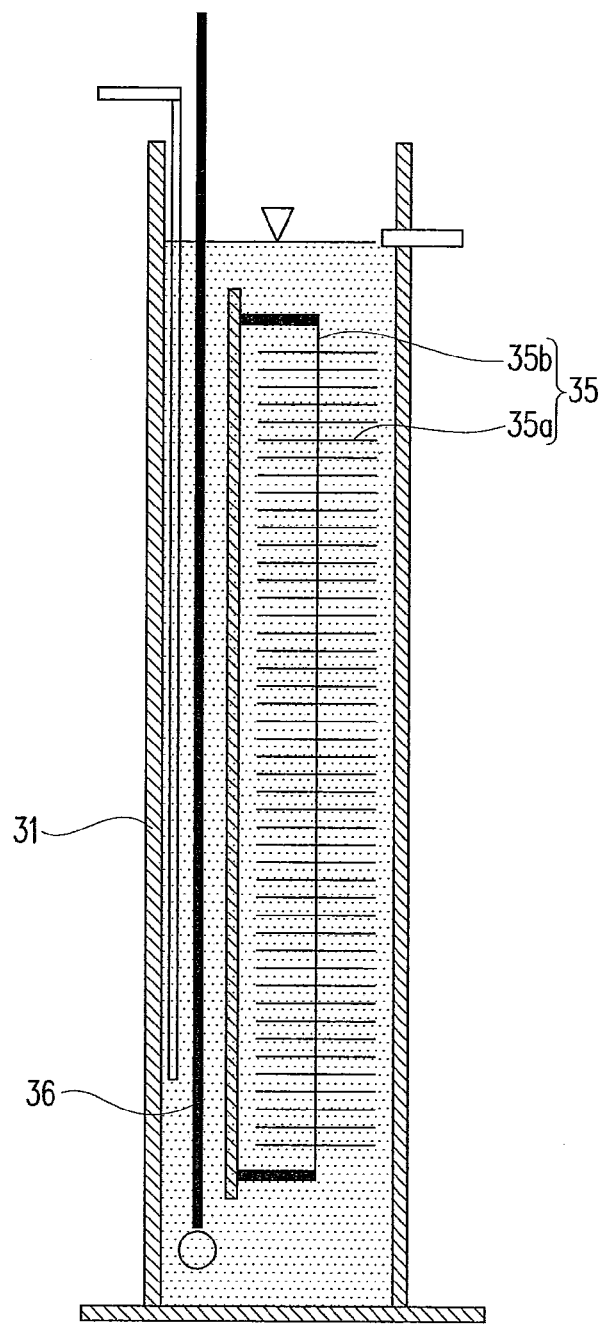
FIG. 7 is a schematic diagram of a second biological treatment tank and the inside of the tank.

In the case in which the sea water desalinating apparatus 1 of the first embodiment is configured to carry out biological treatment using activated sludge within the second biological treatment tank 31, as shown in FIG. 7, a carrier 35 that coagulates activated sludge may be disposed within the second biological treatment tank 31.

In the case in which the carrier 35 is disposed within the second biological treatment tank 31, the sea water desalinating apparatus 1 of the first embodiment is configured such that coagulated activated sludge that is activated sludge coagulated by the carrier 35 and separated from the carrier 35 is formed, and furthermore the coagulated activated sludge and organic wastewater are mixed together to produce biologically treated water. The sea water desalinating apparatus 1 of the first embodiment includes an aeration means 36 that aerates the water inside of the second biological treatment tank 31.

By providing the sea water desalinating apparatus 1 of the first embodiment with the carrier 35, activated sludge is coagulated and its sedimentation rate increases. Accordingly, the sedimentation separation characteristics of activated sludge are enhanced so that there is an advantageous effect in that the membrane separation characteristics of biologically treated water can be improved.

The carrier 35 includes trapping members 35*a* to which the activated sludge adheres, and a supporting member 35*b* for supporting the trapping members 35*a*. The carrier 35 is configured such that the trapping members 35*a* sway with flows generated by aeration of the aeration means 36.

The supporting member 35*b* has a filament shape. The supporting member 35*b* is disposed so as to have the axis of the filament oriented substantially perpendicular to the surface of the water within the second biological treatment tank 31. The supporting member 35*b* is secured within the second biological treatment tank 31.

No limitation is intended to the material of the supporting member 35b, as long as it supports the trapping members 35a, but examples of the material of the supporting member 35b include polyester, acrylic resin, polyethylene, carbon fiber and the like.

The trapping members 35a each have a filament shape.

No limitation is intended to the material of the trapping members 35a, as long as the activated sludge can easily adhere thereto, but examples of the material of the trapping members 35a include acrylic resin, polyester, polyethylene, carbon fiber, and the like.

The sea water desalinating apparatus 1 of the first embodiment may be configured to include an ozone-adding device (not shown) for adding ozone to biologically treated water that is fourth concentrated water produced by the filtration using the second reverse osmosis membrane device 33, such that the biologically treated water, as diluent water, to which ozonation has been carried out, is mixed into the sea water A.

The sea water desalinating apparatus 1 of the first embodiment thus configured enables the concentration of organic matter contained in the diluent water to be lowered, and hence the concentration of organic matter contained in mixed water produced by mixing the diluent water into the sea water A to be lowered. Thus, the sea water desalinating apparatus 1 of the first embodiment can suppress organic solid matter from adhering onto the membrane surface of the first reverse osmosis membrane device 23, and thereby can efficiently increase the permeate flux of a membrane of the first reverse osmosis membrane device 23, which results in producing an advantageous effect in that the fresh water C can be more efficiently produced.

The sea water desalinating apparatus 1 of the first embodiment thus configured enables reduction of odor components contained in diluent water by ozone, and sterilization of microorganisms contained in diluent water, which produces an advantageous effect in that fresh water C with higher degree of purity can be produced.

According to the first embodiment, it is possible to efficiently produce purified water, such as fresh water, while utilizing biologically treated water produced by biologically treating organic wastewater.

Second Embodiment

Now, the description will be made for a sea water desalinating apparatus as a fresh water generating apparatus, and a sea water desalinating method as a fresh water generating method, of a second embodiment.

Meanwhile, in a conventional sea water desalinating method, sea water must be pressurized by a pump or the like and pressure fed to a reverse osmosis membrane device in order to carry out filtration of sea water by the reverse osmosis membrane device, which poses a problem in that the higher the salt concentration of sea water, the larger the energy required.

On the other hand, in addition to the above issue regarding sea water, wastewater containing inorganic matter, such as metal, represented by, for example, wastewater from a factory for manufacturing metal, such as steel (hereinafter referred also to as "inorganic wastewater") is generally subjected to pretreatment, such as pH adjustment to be solidified, and then subjected to sedimentation separation. Sedimentation treated water that is supernatant water produced by sedimentation and separation of this inorganic wastewater is currently released to the oceans or rivers, which poses a problem in that a large amount of water not efficiently utilized exists.

In consideration of the above problem, an object of the second embodiment is to provide a sea water desalinating method and a sea water desalinating apparatus that are capable of efficiently producing purified water, such as fresh water, while utilizing inorganic wastewater.

First, the description will be made for a sea water desalinating apparatus of the second embodiment.

Figure 8:
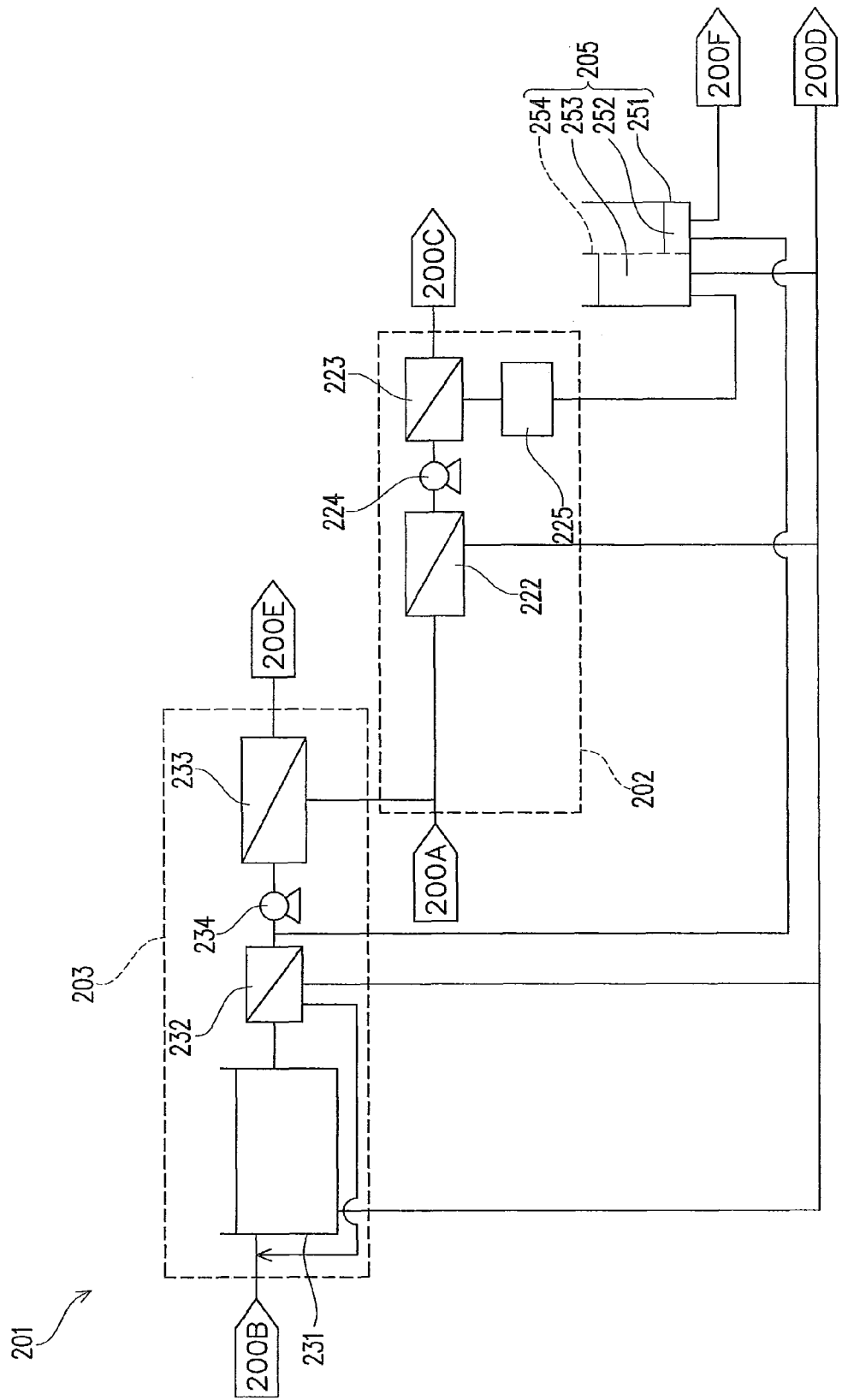
FIG. 8 is a schematic block diagram of a sea water desalinating apparatus according to another embodiment of the present invention.

FIG. 8 is a schematic block diagram of the sea water desalinating apparatus of the second embodiment. As shown in FIG. 8, a sea water desalinating apparatus 201 of the second embodiment includes a sedimentation treatment part 203 that subjects inorganic wastewater 200B to sedimentation and separation (hereinafter referred also to as "sedimentation treatment") to produce sedimentation treated water that is supernatant water and concentrated water 200D containing a large amount of solid matter, and a mixed water treatment part 202 that mixes, as diluent water, sedimentation treated water that is supernatant water produced at the sedimentation treatment part 203 into sea water 200A and feeds the mixed water produced by the mixing to a reverse osmosis membrane device 223 to filter the same, thereby producing fresh water 200C that is permeate and concentrated water 200D.

The sea water desalinating apparatus 201 of the second embodiment is configured such that the sea water 200A is transferred to the mixed water treatment part 202, the inorganic wastewater 200B to the sedimentation treatment part 203, the sedimentation treated water to the mixed water treatment part 202, and the concentrated water 200D to a concentrated water storage tank (not shown).

Furthermore, the sea water desalinating apparatus 201 of the second embodiment is configured to recover fresh water 200C that is the aforesaid permeate.

The sea water 200A is water containing salt, and for example, has a salt concentration of about 1.0 to 8.0% by mass, and more specifically has a salt concentration of 2.5 to 6.0% by mass.

The sea water 200A is not herein necessarily limited to water in the sea, and is intended to include water in land area, such as water of lake (salt lake, brackish lake), water of swamps, and water of pond, as long as they are water having a salt concentration of 1.0% by mass or more.

The inorganic wastewater 200B is wastewater containing inorganic matter and having a low concentration of organic matter, and, for example, wastewater having a BOD (Biochemical Oxygen Demand) of 50 mg/L or lower, and preferably wastewater having a BOD of 10 mg/L or lower.

The inorganic wastewater 200B is water having a salt concentration lower than the sea water 200A. The inorganic wastewater 200B is, for example, wastewater having a salt concentration relative to the sea water 200A of 1: not more than 0.1, and more specifically 1: not more than 0.01.

Examples of the inorganic wastewater 200B include industrial wastewater (e.g., wastewater discharged from various factories, such as a steel factory, a chemical factory and a factory in electronics).

The mixed water treatment part 202 is configured such that sedimentation treated water produced by the sedimentation treatment part 203 is mixed, as diluent water, into the sea water 200A to produce mixed water.

The mixed water treatment part 202 includes a first clarifier 222 that has at least one of a microfiltration membrane (MF membrane) and a ultrafiltration membrane (UF membrane) and clarifies the mixed water by way of filtration to produce first permeate and first concentrated water, and a first reverse osmosis membrane device 223 that filters mixed water that is the first permeate to produce fresh water 200C that is second permeate and second concentrated water.

The mixed water treatment part 202 is configured such that sedimentation treated water produced at the sedimentation treatment part 203 is mixed, as diluent water, into the sea water 200A to produce mixed water, the mixed water produced by the mixing is transferred to the first clarifier 222 to be filtered by the first clarifier 222 to produce first permeate and first concentrated water, the first concentrated water is transferred to a concentrated water storage tank (not shown), mixed water that is the first permeate is transferred to the first reverse osmosis membrane device 223 to be treated by the first reverse osmosis membrane device 223 to produce the fresh water 200C that is second permeate and the second concentrated water.

By the clarifying is herein meant rougher filtration than reverse osmosis membrane filtration, that is, a treatment carried out prior to the filtration by the reverse osmosis membrane device and made to remove impurities (e.g., solid matter or the like) coarser than those filtered by a reverse osmosis membrane.

The sea water desalinating apparatus 201 of the second embodiment is configured to recover the fresh water 200C that is the second permeate.

The first reverse osmosis membrane device 223 is of the type that a reverse osmosis membrane (RO membrane) is contained in a pressure vessel.

The mixed water treatment part 202 includes a first pump 224 for pressurizing the first permeate and pressure-feeding the same to the first reverse osmosis membrane device 223, such that the second concentrated water is pressure-fed to the first reverse osmosis membrane device 223 by pressure-feeding the first permeate to the first reverse osmosis membrane device 223 via the first pump 224.

The mixed water treatment part 202 includes a first scale-prevention-solution feeding means (not shown) for feeding a scale prevention solution, which contains a scale prevention agent (agent capable of suppressing the formation of scale on the RO membrane), to the RO membrane of the first reverse osmosis membrane device 223.

Examples of the scale prevention agent include a carboxylic acid polymer, a carboxylic acid polymer blended product and a phosphonate.

The mixed water treatment part 202 also includes a first membrane-cleaning-solution feeding means for feeding a membrane cleaning solution, which contains a membrane solution agent (agent capable of dissolving original substances of crud capable of adhering to a membrane), to the RO membrane of the first reverse osmosis membrane device 223.

No limitation is intended to the material of the membrane cleaning agent, and examples of the membrane cleaning agent include an acid, an alkali, an oxidizing agent, a chelating agent and a surface active agent. Examples of the acid include an organic acid (e.g., citric acid, oxalic acid, etc.), an inorganic acid (e.g., hydrochloric acid, sulphuric acid, nitric acid, etc.). An example of the alkali includes sodium hydroxide. Examples of the oxidizing agent include hydrogen peroxide and sodium hypochlorite.

As the membrane cleaning solution, a mixed liquid with two or more kinds of membrane cleaning agents mixed together may be used (e.g., mixture of sodium hydroxide and a surface active agent).

The mixed water treatment part 202 includes a water turbine 225 that is powered by pressure of the second concentrated water that has been pressure-fed from the first reverse osmosis membrane device 223, and is configured to be capable of being powered upon the driving of the water turbine 225 by the pressure of the second concentrated water, which is effected by transferring the second concentrated water pressure-fed from the first reverse osmosis membrane device 223 to the water turbine 225.

The sea water desalinating apparatus 201 of the second embodiment is configured to transfer the second concentrated water, which has been used for driving the water turbine 225, to a concentrated water storage tank (not shown).

The first clarifier 222 is of the type to be installed outside of the tank.

The mixed water treatment part 202 includes a second membrane-cleaning-solution feeding means (not shown) for feeding the aforesaid membrane cleaning solution to the membrane of the first clarifier 222.

The sedimentation treatment part 203 includes a sedimentation separation tank 231 for subjecting the inorganic wastewater 200B to sedimentation and separation to produce sedimentation treated water that is supernatant water and concentrated water 200D, a second clarifier 232 that has at least one of a microfiltration membrane (MF membrane) and an ultrafiltration membrane (UF membrane) and is configured to filter the sedimentation treated water produced at the sedimentation separation tank 231 to produce third permeate and third concentrated water, and a second reverse osmosis membrane device 233 that filters sedimentation treated water that is the third permeate to produce purified water 200E that is fourth permeate and sedimentation treated water that is fourth concentrated water.

The sea water desalinating apparatus 201 of the second embodiment is configured to include an aggregation-agent adding means for adding an aggregation agent to the sedimentation separation tank 231 to subject the inorganic wastewater 200B to aggregation, sedimentation and separation by the aggregation agent, according to the needs and circumstances.

The second clarifier 232 is of the type to be installed outside of the sedimentation separation tank 231.

The sedimentation treatment part 203 includes a fourth membrane-cleaning-solution feeding means (not shown) for feeding the aforesaid membrane cleaning solution to the membrane of the second clarifier 232.

The sea water desalinating apparatus 201 of the second embodiment is configured to transfer the inorganic wastewater 200B to the sedimentation separation tank 231.

The sedimentation treatment part 203 is configured to subject the transferred inorganic wastewater 200B to sedimentation and separation by the sedimentation separation tank 231 to produce sedimentation treated water that is supernatant water and concentrated water 200D, transfer the sedimentation treated water to the second clarifier 232, transfer the concentrated water 200D to a concentrated water storage tank (not shown), filter the sedimentation treated water using the second clarifier 232 to produce third permeate and third concentrated water, transfer the third permeate to the second reverse osmosis membrane device 233, and filter the third permeate using the second reverse osmosis membrane device 233 to produce purified water 200E that is fourth permeate and sedimentation treated water that is fourth concentrated water.

The sea water desalinating apparatus 201 of the second embodiment is configured to transfer, as diluent water, sedimentation treated water that is the fourth concentrated water to the mixed water treatment part 202, and recover the fourth permeate as the purified water 200E.

The second reverse osmosis membrane device 233 is of the type that a reverse osmosis membrane is contained in a pressure vessel.

An RO membrane of the second reverse osmosis membrane device 233 of the second embodiment is intended to include a nano-filtration membrane (NF membrane), as well.

The sedimentation treatment part 203 is configured to feed the third permeate to the second reverse osmosis membrane device 233 after pressurizing the third permeate via a second pump 234.

The sedimentation treatment part 203 includes a second scale-prevention-solution means (not shown) for feeding the aforesaid scale prevention solution to the RO membrane of the second reverse osmosis membrane device 233.

The sedimentation treatment part 203 includes a third membrane-cleaning-solution feeding means (not shown) for feeding the aforesaid membrane cleaning solution to the RO membrane of the second reverse osmosis membrane device 233.

The sea water desalinating apparatus 201 of the second embodiment includes a concentration difference power production part 205 that generates power by utilizing the difference between the salt concentration of the second concentrated water and the salt concentration of the third permeate.

The concentration difference power production part 205 includes a tank 251, and a semi-permeable membrane 254 for dividing the inside of the tank 251 into two sections.

The concentration difference power production part 205 further includes a third permeate accommodation part 252 for accommodation of the third permeate and a second concentrated water accommodation part 253 for accommodation of the second concentrated water.

The third permeate accommodation part 252 and the second concentrated water accommodation part 253 are formed by dividing the inside of the tank 251 into the two sections with the semi-permeable membrane 254.

The sea water desalinating apparatus 201 of the second embodiment is configured to transfer a part of the third permeate to the third permeate accommodation part 252, and transfer the second concentrated water to the second concentrated water accommodation part 253 before transferring the second concentrated water to a concentrated water storage tank (not shown).

The concentration difference power production part 205 is configured to generate power by utilizing the height difference in liquid level caused by the increase in the liquid level of the third permeate accommodation part 252, which height difference is in turn caused by the transfer of only the water content of the second concentrated water via the semi-permeable membrane 254, which transfer is in turn caused by the difference in salt concentration between the second concentrated water and the third permeate.

The sea water desalinating apparatus 201 of the second embodiment is configured to transfer, as the concentrated water 200D, the second concentrated water used at the concentration difference power production part 205 and the water content of the third permeate transferred via the semi-permeable membrane 254, to a concentrated water storage tank (not shown), and recover, as industrial water 200F, the third permeate used at the concentration difference power production part 205 and remained in the third permeate accommodation part 252.

The concentration difference power production part 205 may be configured to generate power by using the purified water 200E or the fresh water 200C in place of the third permeate. That is, the concentration difference power production part 205 may include a fresh water accommodation part for accommodation of the purified water 200E or a fresh water accommodation part for accommodation of the fresh water 200C, in place of the third permeate accommodation part 252. In this case, the sea water desalinating apparatus 201 of the second embodiment is configured to transfer the purified water 200E or the fresh water 200C to the concentration difference power production part 205.

Now, the description will be made for a sea water desalinating method of a second embodiment.

The sea water desalinating method of the second embodiment includes carrying out a mixing step of mixing, as diluent water, sedimentation treated water that is supernatant water produced by subjecting inorganic wastewater to sedimentation and separation into sea water, and a mixed water treatment step of feeding the mixed water produced by the mixing step to a reverse osmosis membrane apparatus, at which the mixed water is filtered.

Specifically, the sea water desalinating method of the second embodiment is a method of desalinating sea water by carrying out a wastewater treatment step of subjecting the inorganic wastewater 200B to sedimentation and separation within the sedimentation separation tank 231 to produce sedimentation treated water that is supernatant water, further filtering the sedimentation treated water using the second clarifier 232 to produce third permeate and third concentrated water, and then filter sedimentation treated water that is the third permeate using the second reverse osmosis membrane device 233 to produce fourth permeate and sedimentation treated water that is fourth concentrated water, a mixing step of mixing, as the diluent water, sedimentation treated water that is the fourth concentrated water, into the sea water 200A to produce mixed water, and a mixed water treatment step of filtering the mixed water produced by the mixing step using the first clarifier 222 to produce first permeate and first concentrated water, and then filtering mixed water that is the first permeate using the first reverse osmosis membrane device 223 to produce second permeate and second concentrated water.

In the mixing step, the mixing volume ratio of the sea water 200A to the diluent water is preferably 1 to 0.1 or more, and more preferably 1 to 1 or more, in order to make the dilution effect significant.

The sea water desalinating method of the second embodiment is advantageous in the fact that by having the mixing volume ratio of the sea water 200A to the diluent water being 1 to 0.1 or more, the salt concentration can be lowered and the amount of energy required for desalinating the sea water 200A per unit quantity of the produced fresh water 200C can be securely saved, and corrosion of various devices or instruments used in the mixing step or the mixed water treatment step can be suppressed.

In the sea water desalinating method of the second embodiment, the salt concentration of the mixed water is preferably 3.0% by mass or lower, and more preferably 1.8% by mass or lower. Furthermore, in the sea water desalinating method of the second embodiment, the salt concentration of the diluent water is preferably one third or less of the salt concentration of the sea water 200A to be diluted with diluent water, and more preferably one tenth of the salt concentration of the sea water 200A to be diluted with diluent water. The sea water desalinating method of the second embodiment is also advantageous in that, by setting the salt concentration of diluent water to be one third or less of the salt concentration of the sea water 200A to be diluted with diluent water, the fresh water 200C with higher degree of purity can be produced.

The sea water desalinating apparatus of the second embodiment and the sea water desalinating method of the second embodiment configured as mentioned above produce the following advantageous effects.

According to the sea water desalinating method of the second embodiment, which carries out the mixing step of mixing, as diluent water, sedimentation treated water having a salt concentration lower than the sea water 200A into the sea water 200A, and the mixed water treatment step of feeding the mixed water produced by the mixing step to the first reverse osmosis membrane device 223, at which the mixed water is filtered, thereby desalinating the sea water 200A, it is possible to save an amount of energy required for pressure-feeding per unit quantity of produced fresh water 200C, since a pressure for pressure-feeding the mixed water to the first reverse osmosis membrane device 223 can be kept lower than the pressure for pressure-feeding sea water. Also, the permeate flux of a membrane of the first reverse osmosis membrane device 223 can be increased, and hence the filtration flow rate can be increased. Furthermore, the load to the membrane of the first reverse osmosis membrane device 223 (chemical load due to salt in sea water, and physical load due to pressure) can be lowered and hence the operation life of the membrane can be extended. Still furthermore, the sedimentation treated water can be effectively utilized.

According to the sea water desalinating method of the second embodiment, the filtration of the mixed water is made using the first clarifier 222 prior to the filtration using the first reverse osmosis membrane device 223 in the mixed water treatment step. Whereby, it is possible to suppress inorganic solid substance or salt from adhering onto the membrane surface of the first reverse osmosis membrane device 223, and hence produce an advantageous effect in that the fresh water 200C can be more efficiently produced. There is also an advantageous effect in that the fresh water 200C with higher degree of purity can be produced.

According to the sea water desalinating method of the second embodiment, purified water 200E can be recovered in a wastewater treatment step by carrying out the wastewater treatment step of subjecting inorganic wastewater 200B to sedimentation and separation within the sedimentation separation tank 231 to produce sedimentation treated water that is supernatant water, then filtering the sedimentation treated water using the second clarifier 232 to produce the third permeate and the third concentrated water, then filtering the third permeate using the second reverse osmosis membrane device 233 to produce the fourth permeate and the fourth concentrated water. Thus, there is an advantageous effect in that purified water can be more efficiently recovered.

By having the sea water desalinating apparatus 201 of the second embodiment configured to feed the first permeate to the first reverse osmosis membrane device 223 after pressurizing the first permeate via the first pump 224 to produce the second concentrated water, and to be powered by driving the water turbine 225 by the pressure of the second concentrated water, there is an advantageous effect in that an energy can be produced. Furthermore, when the produced energy is utilized in a step of producing purified water from the sea water 200A or the inorganic wastewater 200B, there is an advantageous effect in that purified water can be more efficiently recovered.

By having the sea water desalinating apparatus 201 of the second embodiment configured to include the concentration difference power production part 205 that produces power by utilizing the difference between the salt concentration of the second concentrated water, which has a salt concentration higher than mixed water, and the salt concentration of the third permeate, there is an advantageous effect in that an energy can be produced. When this produced energy is utilized in a step of producing purified water from the sea water 200A or the inorganic wastewater 200B, there is an advantage effect in that purified water can be more efficiently recovered.

Furthermore, by having the sea water desalinating apparatus 201 of the second embodiment configured to include the first scale-prevention-solution feeding means and the second scale-prevention-solution feeding means, there is an advantageous effect in that scale, which may be able to be generated on the reverse osmosis membrane of the first reverse osmosis membrane device 223 and the reverse osmosis membrane of the second reverse osmosis membrane device 233, can be suppressed, and therefore purified water can be more efficiently recovered.

While the sea water desalinating apparatus of the second embodiment and the sea water desalinating method of the second embodiment produce the above advantageous effects, the sea water desalinating method of the present invention and the sea water desalinating method of the present invention are not necessarily limited to the above embodiments, and may be modified according to the needs and circumstances.

For example, the sea water desalinating apparatus 201 of the second embodiment includes the first scale-prevention-solution feeding means and the second scale-prevention-solution feeding means. However, the sea water desalinating apparatus 201 may include only the second scale-prevention-solution feeding means while not including the first scale-prevention-solution feeding means, in which a scale prevention solution fed to the second reverse osmosis membrane device 233 by the second scale-prevention-solution feeding means is discharged, as the fourth concentrated water, from the second reverse osmosis membrane device 233, and the scale prevention solution is fed to the first reverse osmosis membrane device 223.

According to the thus configured sea water desalinating apparatus 201 of the second embodiment, the scale prevention solution is difficult to permeate through a reverse osmosis membrane, and thus a scale prevention solution used at the second reverse osmosis membrane device 233 can be utilized at the first reverse osmosis membrane device 223, as well, and power required for feeding the scale prevention solution can be saved, which produces an advantageous effect in that purified water can be more efficiently recovered.

In this case, the sea water desalinating apparatus 201 of the present invention may be configured such that a scale prevention solution discharged, as the fourth concentrated water, from the second reverse osmosis membrane device 233 is fed to the first reverse osmosis membrane device 223 via the first clarifier 222, or may be configured such that the scale prevention solution is fed directly to the first reverse osmosis membrane device 223 without intervention of the first clarifier 222. Especially, according to the sea water desalinating apparatus 201 of the present invention, in which the scale prevention solution is fed directly to the first reverse osmosis membrane device 223 without intervention of the first clarifier 222, there is an advantageous effect in that the scale prevention solution is suppressed from being diluted at the first clarifier 222, thereby the scale prevention solution is efficiently fed to the first reverse osmosis membrane device 223, and thus purified water can be more efficiently recovered.

In the sea water desalinating method of the second embodiment, in the mixed water treatment step, the filtration of the mixed water using the first clarifier 222 is carried out, prior to the filtration using the first reverse osmosis membrane device 223. However, the sea water desalinating method of the present invention may be configured such that the filtration of the mixed water by the first clarifier 222 is not carried out.

Figure 9:
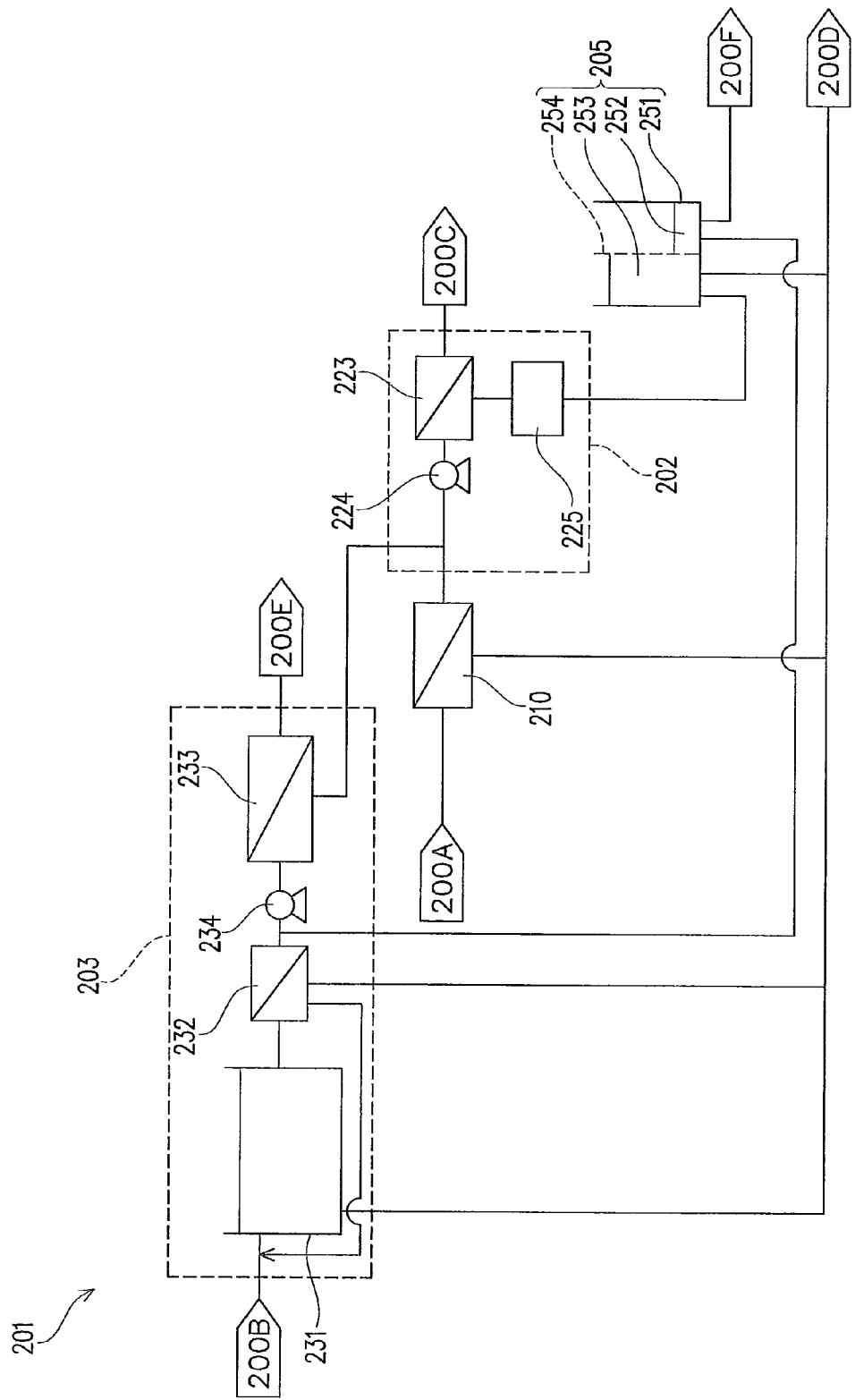
FIG. 9 is a schematic block diagram of a sea water desalinating apparatus according to another embodiment of the present invention.

In the above form of the sea water desalinating method of the present invention, as shown in FIG. 9, it is preferable to employ an arrangement, in which, prior to the mixing of sedimentation treated water that is the fourth concentrated water, as diluent water, into the sea water 200A, the sea water 200A is filtered using a third clarifier 210 that has at least one of a microfiltration membrane (MF membrane) and an ultrafiltration membrane (UF membrane) to produce fifth permeate and fifth concentrated water, and the sea water 200A that is the fifth permeate is mixed with the diluent water to produce mixed water, and the fifth permeate in the form of the sea water 200A is mixed with the diluent water to produce mixed water.

In the sea water desalinating method of the present invention, the fifth concentrated water can be treated as concentrated water similar to the first concentrated water.

In the sea water desalinating method of the second embodiment, the third permeate produced at the second clarifier 232 is filtered using the second reverse osmosis membrane device 233 in the wastewater treatment step. However, it is possible to employ an arrangement in which filtration of the third permeate by the second reverse osmosis membrane device 233 is not carried out.

Figure 10:
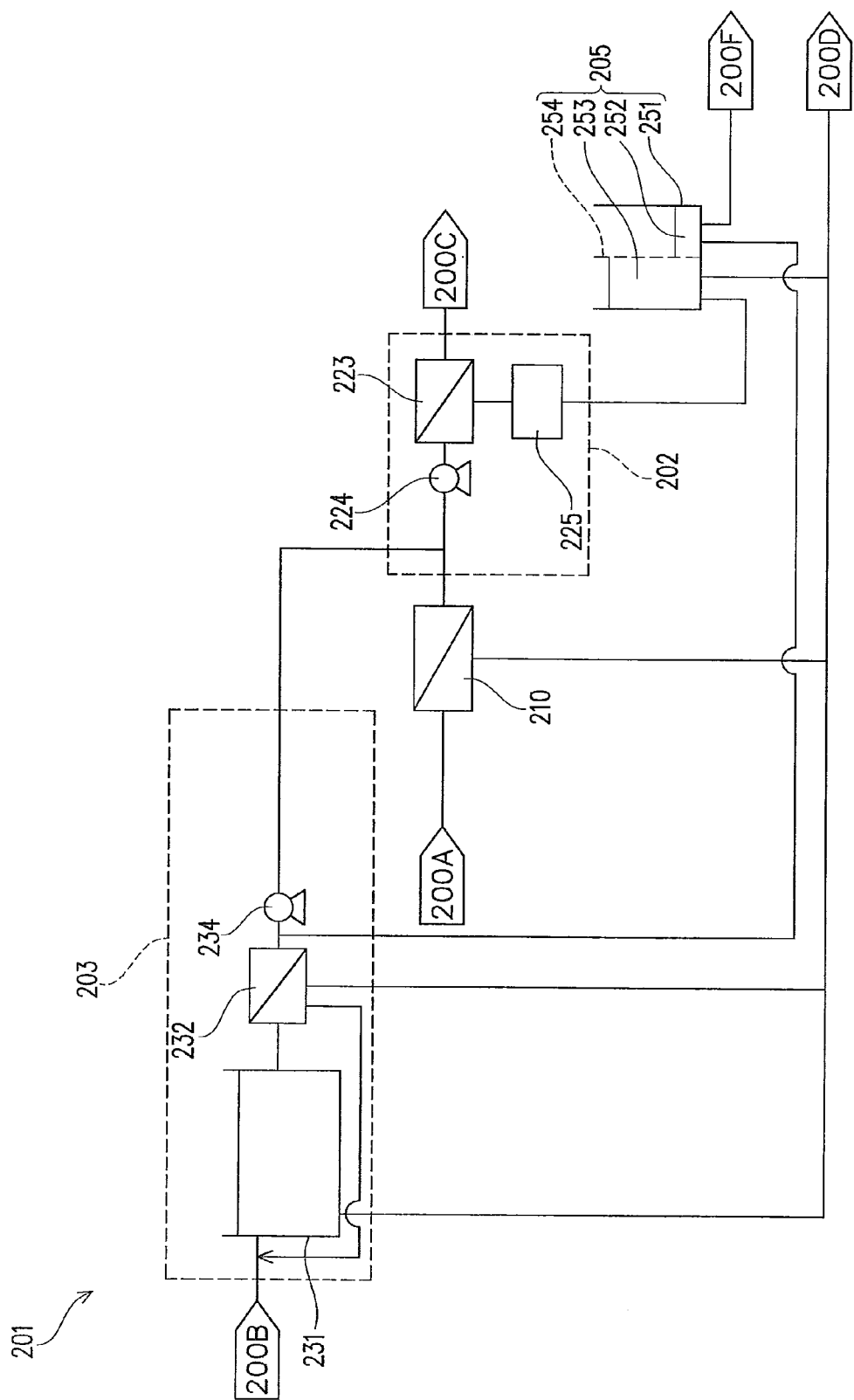
FIG. 10 is a schematic block diagram of a sea water desalinating apparatus according to still another embodiment of the present invention.
Figure 11:
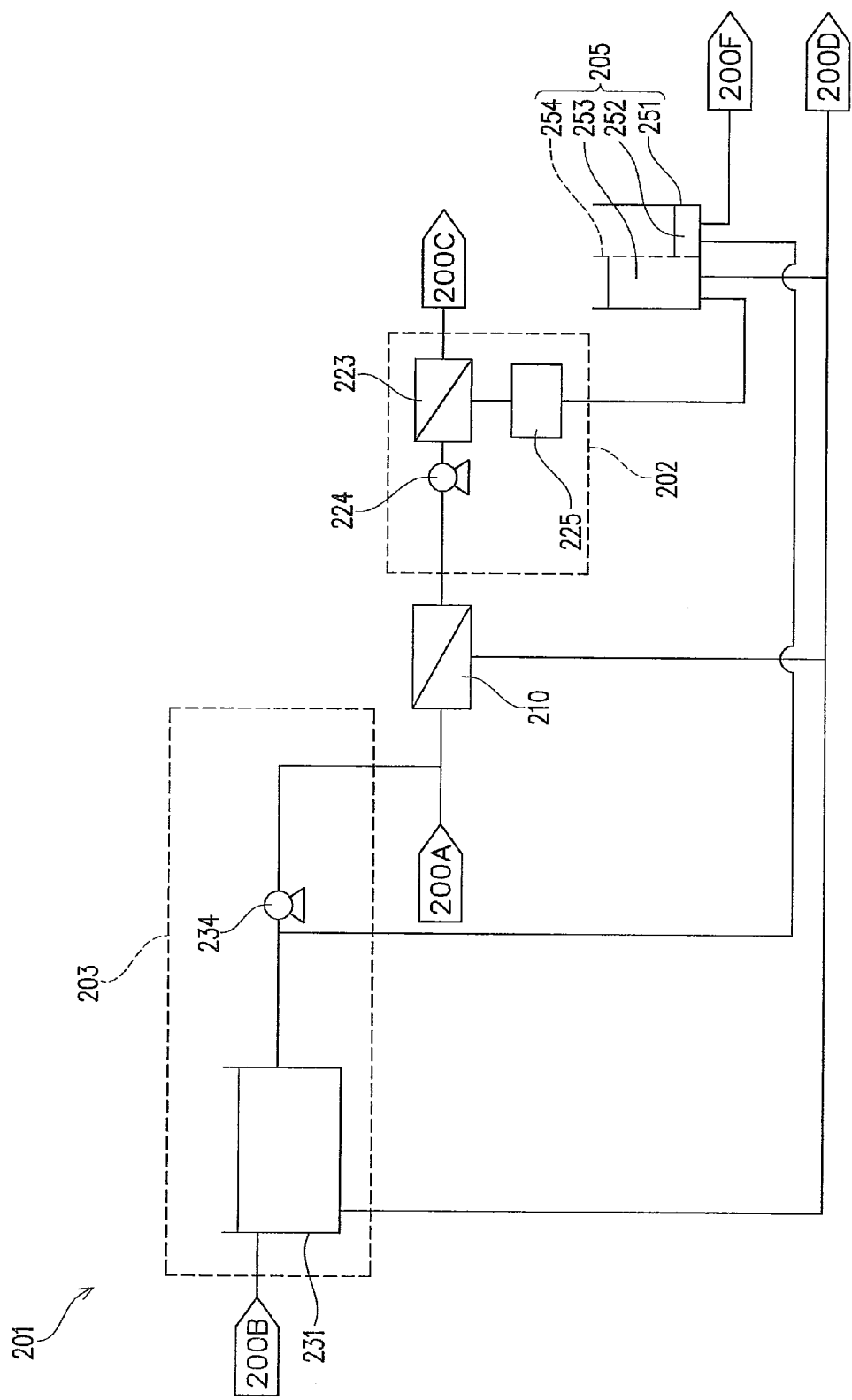
FIG. 11 is a schematic block diagram of a sea water desalinating apparatus according to yet another embodiment of the present invention.

In the above form of the sea water desalinating method of the present invention, as shown in FIG. 10, it is preferable to employ an arrangement in which, prior to the mixing of the sea water 200A with, as diluent water, sedimentation treated water that is the third permeate, the sea water 200A is filtered using the third clarifier 210 that has at least one of a microfiltration membrane (MF membrane) and an ultrafiltration membrane (UF membrane), and the sea water 200A filtered using the third clarifier 210 is mixed with, as diluent water, sedimentation treated water that is the third permeate to produce mixed water. As shown in FIG. 11, it is possible to employ an arrangement in which sedimentation treated water is not filtered at the second clarifier 232 to be designated as diluent water, the sea water 200A is mixed with, as diluent water, the sedimentation treated water to produce mixed water, and the mixed water is filtered using the third clarifier 210.

In the second embodiment, the first clarifier 222 is configured to filter mixed water transferred to the first clarifier 222 by at least one of a microfiltration membrane (MF membrane) and an ultrafiltration membrane (UF membrane), while it may be configured to filter the mixed water by a sand filtration means having a sand filter. The second embodiment is configured in this matter to produce an advantageous effect in that impurities of a large amount of water can be removed with low power.

In the arrangement in which sand filtration is carried out, the first clarifier 222 may be configured to carry out sand filtration by one stage, or by two or more stages.

By the stage of sand filtration is meant the number of sand filters connected in tandem.

In the arrangement in which sand filtration is carried out, the first clarifier 222 may be configured to further filter mixed water, which has been subjected to sand filtration, by at least one of a microfiltration membrane (MF membrane) and an ultrafiltration membrane (UF membrane).

In the arrangement in which the first clarifier 222 is to carry out sand filtration, the first clarifier 222 is provided with a cleaning means (not shown) for cleaning a sand filter layer.

In the second embodiment, the second clarifier 232 is configured to filter sedimentation treated water, which has been transferred to the second clarifier 232, by at least one of a microfiltration membrane (MF membrane) and an ultrafiltration membrane (UF membrane), while the second clarifier 232 may be configured such that sedimentation treated water is filtered by a sand filtration means.

In the arrangement of carrying out sand filtration, the second clarifier 232 may be configured to carry out the sand filtration by one stage, or by two or more stages.

In the arrangement of carrying out sand filtration, the second clarifier 232 may be configured such that sedimentation treated water, which has been filtered by sand filtration means, is further filtered by least one of a microfiltration membrane (MF membrane) and an ultrafiltration membrane (UF membrane).

In the arrangement in which the second clarifier 232 carries out sand filtration, it is provided with a cleaning means (not shown) for cleaning a sand filter layer.

When the second embodiment includes the third clarifier 210, the third clarifier 210 is configured such that the sea water transferred to the third clarifier 210 is filtered by at least one of a microfiltration membrane (MF membrane) and an ultrafiltration membrane (UF membrane) in the second embodiment, while the third clarifier 210 may be configured such that the sea water is filtered by a sand filtration means.

In the arrangement of carrying out sand filtration, the third clarifier 210 may be configured to carry out the sand filtration by one stage, or by two or more stages.

In the arrangement of carrying out sand filtration, the third clarifier 210 may be configured such that sea water, which has been subjected to sand filtration, is further filtered by least one of a microfiltration membrane (MF membrane) and an ultrafiltration membrane (UF membrane).

In the arrangement in which the third clarifier 210 carries out sand filtration, it is provided with a cleaning means (not shown) for cleaning a sand filter layer.

In the second embodiment, it is possible to employ an arrangement in which power generation is made by utilizing natural energies (e.g., wave power, tidal power, wind power, solar power and geothermal sources), and the thus produced power from natural energies is utilized as a driving power for a pump or the like of the sea water desalinating apparatus of the second embodiment. The second embodiment is advantageous in that it is possible to suppress generation of gasses, such as carbon dioxide, which may be able to cause influences on the environment, hold in running out of fossil fuels, or prevent risks, such as nuclear accidents, by utilizing power produced from natural energies.

The sea water desalinating apparatus 201 of the second embodiment is provided with the water turbine 225 in the mixed water treatment part 202, while a pressure converter (pressure recovery device) for converting the pressure of the second concentrated water, which has been pressure-fed from the first reverse osmosis membrane device 223, to the pressure for transferring mixed water directly (without intervention of electricity) to the first reverse osmosis membrane device 223, may be provided in place of the water turbine 225.

When the pressure converter is provided, the sea water desalinating apparatus 201 of the second embodiment is configured such that the second concentrated water, which has been pressure-fed from the first reverse osmosis membrane device 223, is transferred to the pressure converter, and the second concentrated water used at the pressure converter is transferred to a concentrated water storage tank. The sea water desalinating apparatus 201 of the second embodiment is configured such that mixed water is transferred to the pressure converter before it passes through the first pump 224, and mixed water pressurized at the pressure converter is transferred to the first reverse osmosis membrane device 223 via the first pump 224.

The sea water desalinating apparatus 201 of the second embodiment thus configured is advantageous in that the power of the first pump 224 can be saved.

Still furthermore, in the second embodiment, before transferring the inorganic wastewater 200B to the sedimentation separation tank 231, the inorganic wastewater 200B may be adjusted in pH to close to neutral (e.g., pH 4 to pH 10) by an alkali (e.g., sodium hydroxide, etc.) or an acid (e.g., nitric acid, sulphuric acid, hydrochloric acid, etc.). Before transferring the inorganic wastewater 200B to the sedimentation separation tank 231, the inorganic wastewater 200B may be subjected to oxidation or reduction by an oxidizing agent (e.g., hydrogen peroxide, sodium hypochlorite, etc.) or a reducing agent (e.g., sodium bisulfite, sodium thiosulfate, etc.).

In the second embodiment, sedimentation treated water is mixed, as diluent water, into the sea water 200A, but the inorganic wastewater 200B, which is not subjected to sedimentation, may be mixed, as diluent water, into the sea water 200A. In the second embodiment, when inorganic wastewater, which is not subjected to sedimentation, is used as diluent water, the inorganic wastewater 200B may be adjusted in pH to close to neutral (e.g., pH 4 to pH 10) before mixing the inorganic wastewater into the sea water 200A. The inorganic wastewater 200B may be subjected to oxidation or reduction before mixing the inorganic wastewater 200B into the sea water 200A.

According to the second embodiment, it is possible to efficiently produce purified water, such as fresh water 200C, while utilizing the inorganic wastewater 200B.

Third Embodiment

Now, the description will be made for a fresh water generating apparatus and a fresh water generating method, of the third embodiment.

Meanwhile, in a conventional sea water desalinating method, sea water must be pressurized by a pump or the like and pressure fed to a reverse osmosis membrane device in order to carry out filtration of sea water by the reverse osmosis membrane device, which poses a problem in that the higher the salt concentration of sea water, the larger the energy required.

On the other hand, in addition to the above issue regarding sea water, wastewater containing organic matter represented by, for example, sewage water (hereinafter referred also to as "organic wastewater"), biologically treated water produced by biologically treating organic wastewater, wastewater containing inorganic matter, such as heavy metal, represented by wastewater of a factory for manufacturing metal, such as steel (hereinafter referred also to as "inorganic wastewater"), or sedimentation treated wastewater produced by subjecting inorganic wastewater to sedimentation and separation is currently released to the oceans or rivers, which poses a problem in that most of wastewater is not efficiently utilized.

The wastewater, treated wastewater or the like is low salt concentration wastewater having a salt concentration lower than sea water, and therefore when they are efficiently utilized as fresh water resources, it is assumed that the wastewater may be able to be desalinated by way of reverse osmosis membrane filtration even with a relatively low pressure pump. However, these low salt concentration wastewaters do not exhaustlessly exist unlike sea water, and therefore there may be a case in which a stabilized amount of fresh water may not be produced as resources of fresh water, or a stabilized amount of fresh water may not be produced by way of filtration using a low pressure pump, since the salt concentration may be greatly fluctuated depending on the circumstances, which leads to a fear that a predetermined amount of fresh water may not be able to be stably produced.

In consideration of the above problems, an object of the third embodiment is to provide a fresh water generating apparatus and a fresh water generating method that are capable of efficiently producing fresh water.

First, the description will be made for a fresh water generating apparatus of the third embodiment.

Figure 12:
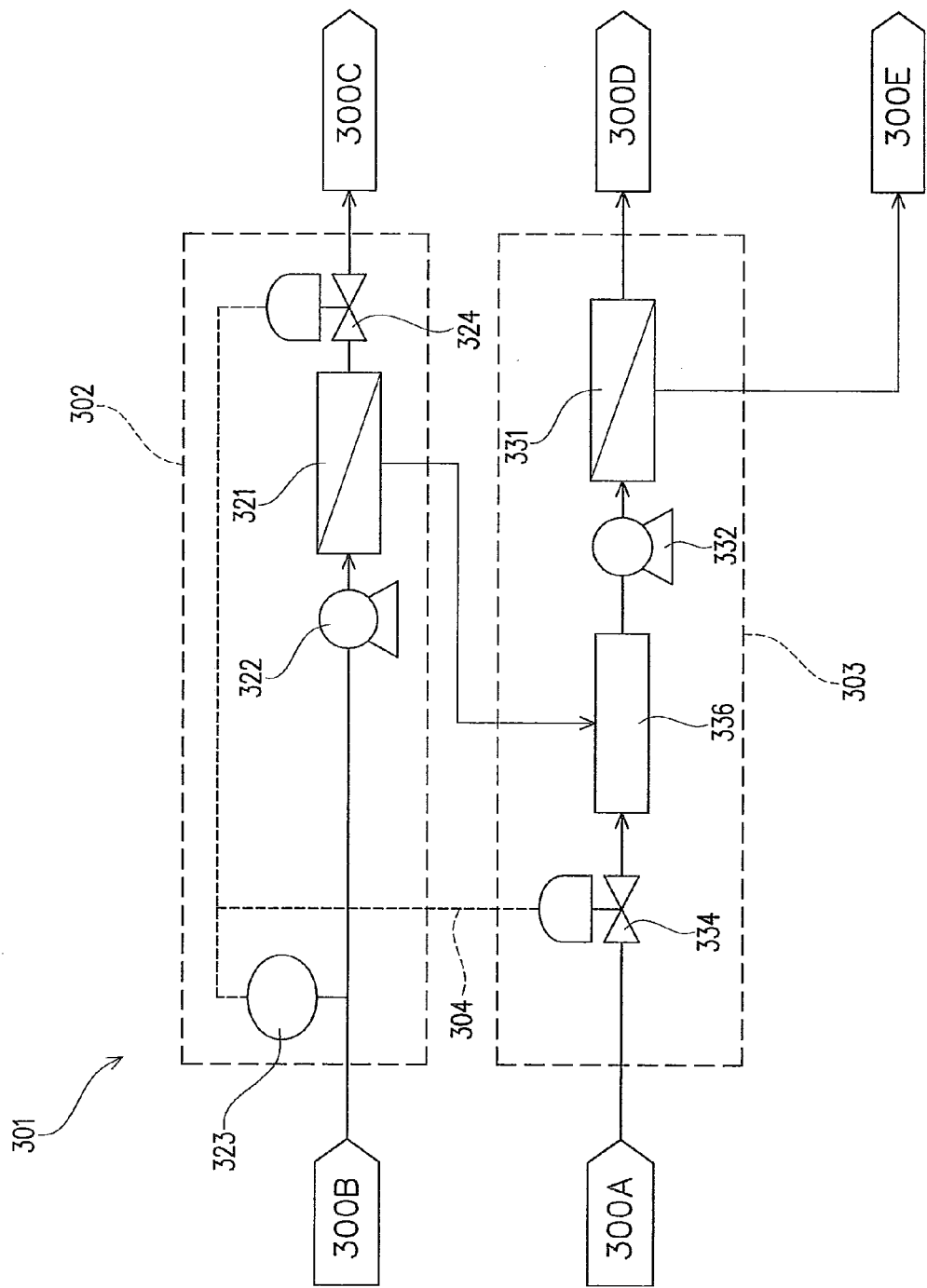
FIG. 12 is a schematic block diagram of a fresh water generating apparatus according to one embodiment of the present invention.

FIG. 12 is a schematic block diagram of the fresh water generating apparatus of the third embodiment.

As shown in FIG. 12, a fresh water generating apparatus 301 of the third embodiment includes a first treatment part 302 that separates low salt concentration wastewater 300B having a salt concentration lower than sea water 300A into first permeate and first concentrated water by way of reverse osmosis membrane filtration, and a second treatment part 303 that mixes, as diluent water, the first concentrated water produced at the first treatment part, into the sea water 300A to produce mixed water, and separates the mixed water into second permeate and second concentrated water by way of reverse osmosis membrane filtration.

The fresh water generating apparatus 301 of the third embodiment is configured such that the low salt concentration wastewater 300B is transferred to the first treatment part 302, and the second concentrated water is transferred, as concentrated water 300E, to a concentrated water storage tank (not shown).

The fresh water generating apparatus 301 of the third embodiment is configured such that the first permeate is produced as fresh water 300C and the second permeate is produced as fresh water 300D.

The sea water 300A is water containing salt, and for example, has a salt concentration of about 1.0 to 8.0% by mass, and more specifically has a salt concentration of 2.5 to 6.0% by mass.

The sea water 300A is not herein necessarily limited to water in the sea, and is intended to include water in land area, such as water of lake (salt lake, brackish lake), water of swamps, and water of pond, as long as they are water having a salt concentration of 1.0% by mass or more.

The low salt concentration wastewater 300B is water having a salt concentration lower than the sea water 300A. The low salt concentration wastewater 300B is, for example, wastewater having a salt concentration relative to the sea water 300A of 1: not more than 0.1, and more generally 1: not more than 0.01.

The low salt concentration wastewater 300B is wastewater containing organic matter (hereinafter referred also to as "organic wastewater"), wastewater containing inorganic matter (hereinafter referred also to as "inorganic wastewater"), or wastewater containing organic matter and inorganic matter.

The organic wastewater is wastewater having a BOD (Biochemical Oxygen Demand), as an index of organic matter concentration, of 2000 mg/L or lower, and more specifically wastewater having a BOD of about 200 mg/L. Examples of the organic wastewater include sewage water (e.g., domestic wastewater or rainwater flowing into sewage pipes), and industrial wastewater (wastewater discharged from, for example, a food factory, a chemical factory, a factory in electronics industry and a pulp plant).

The inorganic wastewater is wastewater containing inorganic matter and having a low concentration of organic matter, and, for example, wastewater having a BOD (Biochemical Oxygen Demand) of 50 mg/L or lower, and preferably wastewater having a BOD of 10 mg/L or lower. Examples of the inorganic wastewater include industrial wastewater (e.g., wastewater discharged from various factories, such as a steel factory, a chemical factory and a factory in electronics).

The low salt concentration wastewater 300B may be supernatant water produced by subjecting wastewater to sedimentation and separation in a sedimentation separation tank, or permeate produced by way of filtration and clarification by a microfiltration membrane (MF membrane), an ultrafiltration membrane (UF membrane) or a sand filtration tank. For organic wastewater, the low salt concentration wastewater 300B may be biologically treated water produced by purification of the organic wastewater with biological species.

By the clarifying is herein meant rougher filtration than reverse osmosis membrane filtration, that is, a treatment carried out prior to the filtration by the reverse osmosis membrane device and made to remove impurities (e.g., solid matter or the like) coarser than those filtered by a reverse osmosis membrane.

By the purification with biological species is herein meant decomposition of organic matter contained in water with biological species, such as bacteria, protozoa and metazoan. A specific example of such treatment includes aeration using activated sludge.

The reverse osmosis membrane as employed may be of a so-called hollow fiber membrane type that is formed into a hollow filament shape having a diameter of several millimeters and made of a material, such as cellulose acetate, aromatic polyamide and polyvinyl alcohol, a so-called tubular membrane type that has a diameter of about several centimeters, greater than the hollow fiber membrane type, a so-called spiral membrane type that has an envelope shape kept wound into roll with a substrate such as mesh disposed inside when in use, or of other conventional types.

The first treatment part 302 includes a first reverse osmosis membrane unit 321 that separates the low salt concentration wastewater 300B into first permeate and first concentrated water by way of reverse osmosis membrane filtration, and is configured to pressure-feed the low salt concentration wastewater 300B to the first reverse osmosis membrane unit 321 via a first pump 322.

The first treatment part 302 includes a first salt concentration measurement means 323 that measures the salt concentration of the low salt concentration wastewater 300B transferred to the first reverse osmosis membrane unit 321, and a first flow rate adjustment mechanism 324 that adjusts the flow rate of the first permeate.

An example of the first salt concentration measurement means 323 includes an instrument or device that is provided with an electrical conductivity meter or an ion counter for measuring the salt concentration.

The first salt concentration measurement means 323 preferably has a function of measuring the electric conductivity since the electric conductivity has a correlation relative to the salt concentration and is easy to be measured.

In addition, the electrical conductivity meter is not expensive and is easy to be maintained, such that the first salt concentration measurement means 323 provided with the electrical conductivity meter is effective in saving the costs of a fresh water generating apparatus and maintenance costs.

The second treatment part 303 includes a mixing tank 336 that mixes the first concentrated water as diluent water into the sea water 300A to produce mixed water, and a second reverse osmosis membrane unit 331 that separates the mixed water into second permeate and second concentrated water by way of reverse osmosis membrane filtration, and is configured to pressure-feed the mixed water to the second reverse osmosis membrane unit 331 via a second pump 332.

The fresh water generating apparatus 301 of the third embodiment is configured such that the sea water 300A is transferred into the mixing tank 336, and the first concentrated water as diluent water is transferred into the mixing tank 336.

The second treatment part 303 includes a second flow rate adjustment mechanism 334 for adjusting the flow rate of the sea water 300A.

The first flow rate adjustment mechanism 324 and the second flow rate adjustment mechanism 334 are respectively provided with opening regulation valves, such as butterfly valves whose opening degrees are capable of being adjusted based on signals transmitted from the first salt concentration measurement means 323 to change the flow rate of the first permeate and the flow rate of the sea water 300A, respectively.

The fresh water generating apparatus 301 of the third embodiment includes a signal transmission mechanism 304 that transmits signals, which have been emitted from the first salt concentration measurement means 323, for example, as control signals for changing the opening degrees of the opening regulation valves, to the first flow rate adjustment mechanism 324 and the second flow rate adjustment mechanism 334, respectively.

The fresh water generating apparatus 301 of the third embodiment is configured such that the amount of the first permeate produced at the first treatment part 302, and the amount of the second permeate produced at the second treatment part 303 are controlled based on the measured values obtained by the first salt concentration measurement means 323. Specifically, the fresh water generating apparatus 301 of the third embodiment is configured such that the amount of the first permeate produced at the first treatment part 302 and the amount of the second permeate produced at the second treatment part 303 are controlled respectively by the adjustment of the flow rate of the first permeate by the first flow rate adjustment mechanism 324 and the adjustment of the amount of the sea water 300A by the second flow rate adjustment mechanism 334, based on the measured values obtained by the first salt concentration measurement means 323 and transmitted by the signal transmission mechanism 304.

The fresh water generating apparatus 301 of the third embodiment is configured such that, when the measured value obtained by the first salt concentration measurement means 323 is equal to or less than a predetermined reference value, control is made to increase the amount of the first permeate produced at the first treatment part 302, and decrease the amount of the second permeate produced at the second treatment part 303.

Whilst the fresh water generating apparatus 301 of the third embodiment is configured in the manner described above, the description will be hereinafter made for the fresh water generating method of the third embodiment.

The fresh water generating method of the third embodiment includes carrying out a first treatment step of separating the low salt concentration wastewater 300B into the first permeate and the first concentrated water by the first reverse osmosis membrane unit 321, and a second treatment step of mixing, as diluent water, the first concentrated water produced by the first treatment step into the sea water 300A within the mixing tank 336 to produce mixed water and separating the mixed water into the second permeate and the second concentrated water by the second reverse osmosis membrane unit 331 to produce permeate of each step as fresh water.

According to the fresh water generating method of the third embodiment, the salt concentration of the low salt concentration wastewater 300B is measured by the first salt concentration measurement means 323, and the amount of the permeate produced by the first treatment step and the amount of the permeate produced by the second treatment step are controlled, based on the measured value obtained by this measurement.

Specifically, according to the fresh water generating method of the third embodiment, the amount of the first permeate produced at the first treatment part 302 and the amount of the second permeate produced at the second treatment part 303 are controlled respectively by the adjustment of the flow rate of the first permeate by the first flow rate adjustment mechanism 324 and the adjustment of the flow rate of the sea water 300A by the second flow rate adjustment mechanism 334, based on the measured values obtained by the first salt concentration measurement means 323 and transmitted by the signal transmission mechanism 304.

According to the fresh water generating method of the third embodiment, control is made to increase the amount of the first permeate produced at the first treatment part 302 and decrease the amount of the second permeate produced at the second treatment part 303, when the measured value obtained by the first salt concentration measurement means 323 is equal to or less than a predetermined reference value.

Although no detailed description will be made herein, it is possible to apply various devices or instruments used in a conventional fresh water generating apparatus to the fresh water generating apparatus of the present invention to such an extent not to deteriorate the advantageous effects of the present invention. Also, it is possible to employ various control or operating method of facilities of a conventional fresh water generating method in the fresh water generating method of the present invention.

Figure 13:
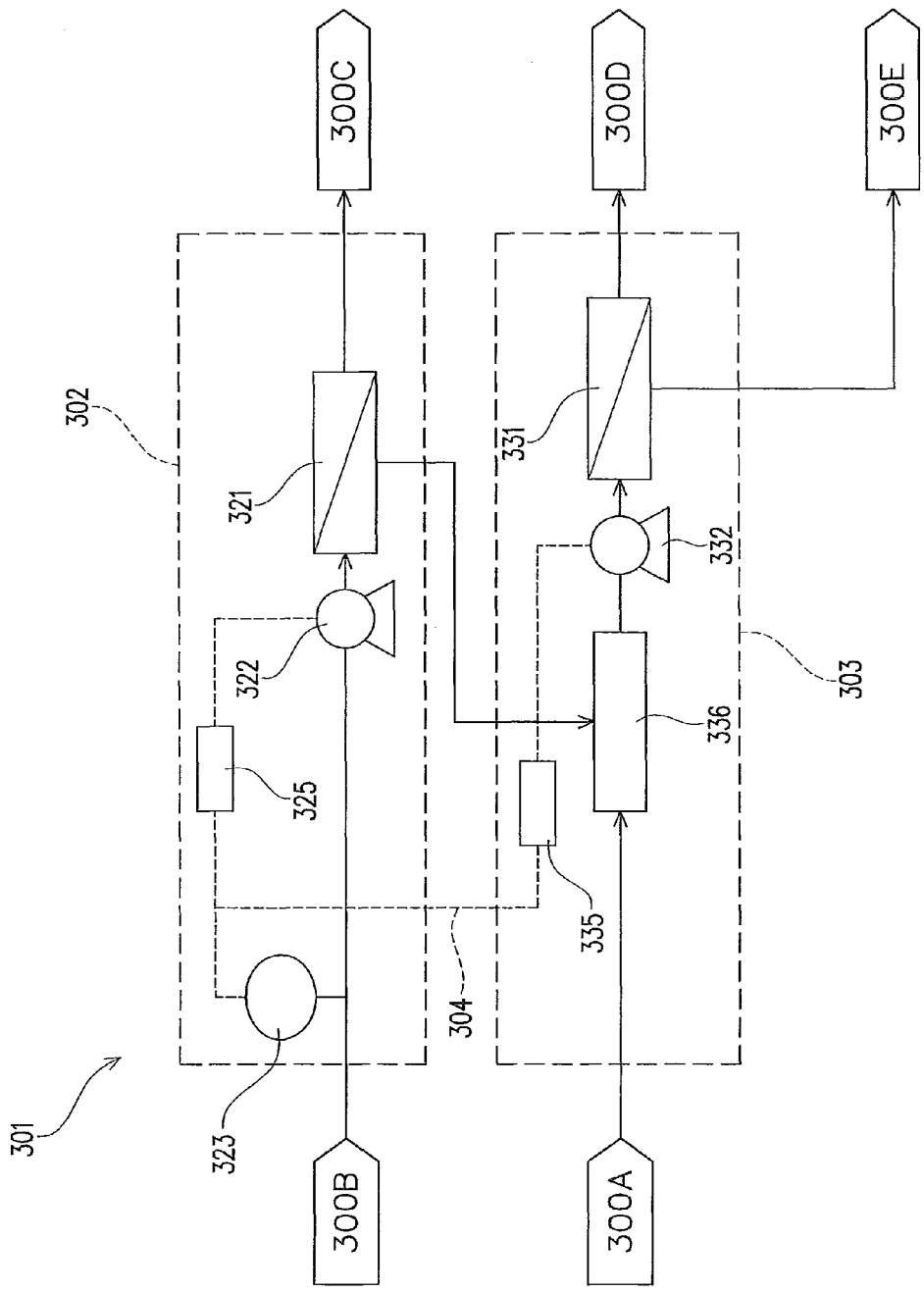
FIG. 13 is a schematic block diagram of a fresh water generating apparatus according to another embodiment of the present invention.

For example, although the fresh water generating apparatus 301 of the third embodiment includes the first flow rate adjustment mechanism 324, the fresh water generating apparatus of the present invention may be provided with a first inverter 325 that changes the rotational rate of the first pump 322 based on the measured result of the first salt concentration measurement means 323, and may have the signal transmission mechanism 304 connected to the first inverter 325, as shown in FIG. 13.

Although the fresh water generating apparatus 301 of the third embodiment includes the second flow rate adjustment mechanism 334, the fresh water generating apparatus of the present invention may be provided with a second inverter 335 that changes the rotational rate of the second pump 332 based on the measured result of the first salt concentration measurement means 323, and may have the signal transmission mechanism 304 connected to the second inverter 335, as shown in FIG. 13.

Figure 14:
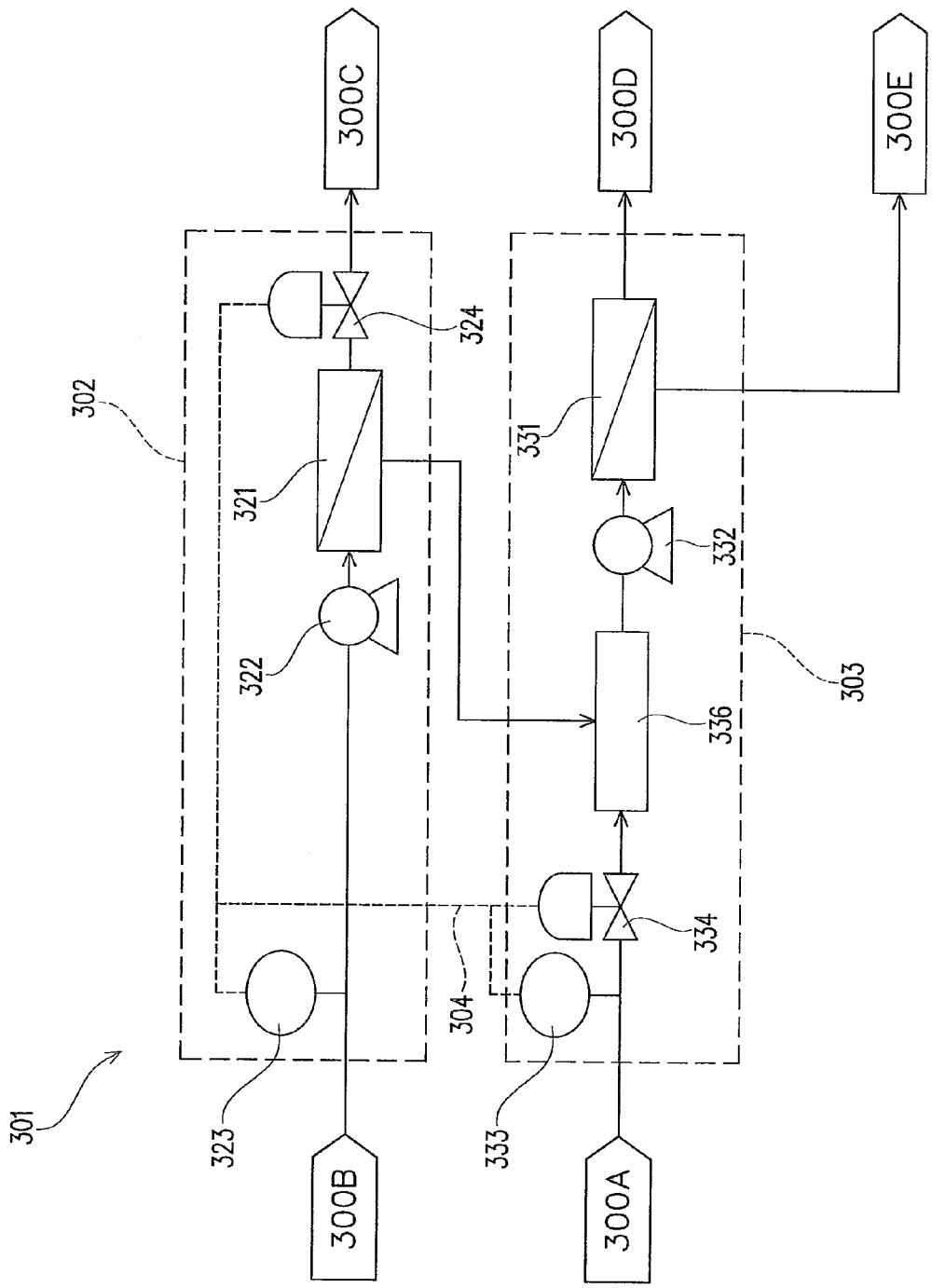
FIG. 14 is a schematic block diagram of a fresh water generating apparatus according to still another embodiment of the present invention.

According to the fresh water generating apparatus 301 of the third embodiment, the second treatment part 303 may be provided with a second salt concentration measurement means 333 that measures the salt concentration of the sea water 300A transferred to the mixing tank 336, as shown in FIG. 14.

Herein, when the salt concentration of the sea water 300A has been fluctuated, the generation efficiency of the second permeate at the second reverse osmosis membrane unit 331 is also fluctuated. Specifically, when the salt concentration of the sea water 300A has been lowered, the generation efficiency of the second permeate is increased, and when the salt concentration of the sea water 300A has been increased, the generation efficiency of the second permeate is lowered.

In order to deal with this, according to the fresh water generating apparatus 301 of the third embodiment, control is made such that the flow rate of the first permeate is adjusted by the first flow rate adjustment mechanism 324 and the flow rate of the sea water 300A is adjusted by the second flow rate adjustment mechanism 334, based on the measured value obtained by the first salt concentration measurement means 323 and transmitted by the signal transmission mechanism 304, in which the flow rate of the sea water 300A is corrected based on the generation efficiency of the second permeate determined according to the salt concentration of the sea water 300A produced by the second salt concentration measurement means 333.

Thus, according to the third embodiment, fresh water can be efficiently and securely produced.

Forth Embodiment

Now, the description will be made for a fresh water generating apparatus and a fresh water generating method, of the fourth embodiment.

Meanwhile, in a conventional sea water desalinating technique, sea water must be pressurized and pressure fed to a reverse osmosis membrane unit by a pump or the like in order to carry out filtration of sea water by the reverse osmosis membrane unit, which poses a problem in that the higher the salt concentration of sea water, the larger the energy required.

On the other hand, in addition to the above issue regarding sea water, wastewater containing organic matter represented by, for example, sewage water, biologically treated wastewater produced by biologically treating organic wastewater, inorganic wastewater containing inorganic matter, such as metal, represented by, for example, wastewater from a factory for manufacturing metal, such as steel, or sedimentation treated wastewater produced by subjecting inorganic wastewater to pretreatment, such as pH adjustment to solidify the same, and subjecting an intermediate to sedimentation treatment, is currently released to the oceans or rivers, which poses a problem in that most of them are not effectively utilized.

These wastewater or treated wastewater are low salt concentration wastewater having a salt concentration lower than sea water, and therefore when they are efficiently utilized as fresh water resources, it is assumed that the wastewater may be able to be desalinated by way of reverse osmosis membrane filtration even with a relatively low pressure pump.

Meanwhile, the amount of intake of these low salt concentration wastewaters is greatly fluctuated depending on the circumstances. For example, for sewage water, the amount of intake is fluctuated depending on the time or season, and for industrial wastewater, the amount of intake is fluctuated depending on the amount of production, or production process.

That is, these low salt concentration wastewaters do not exhaustlessly exist unlike sea water, and therefore there may be a case in which a required amount may not be stably produced as fresh water resources, or a case in which they must be appropriately disposed of when the amount of intake is large even in an arrangement with a storage tank.

Accordingly, there may cause problems in that a predetermined amount of fresh water cannot be stably produced, or fresh water resources capable of producing fresh water at low cost cannot be sufficiently utilized, thus causing deterioration in efficiency.

In order to deal with these problems, it is assumed to take a measure which uses a device provided with an excessively large storage tank, but it requires a huge space for installation.

In consideration of the above problems, an object of the fourth embodiment is to provide a fresh water generating apparatus and a fresh water generating method that are capable of efficiently producing a predetermined amount of fresh water in a stabilized manner, while omitting the necessity to provide a huge space for an excessively large storage tank.

First, the description will be made for a fresh water generating apparatus of the fourth embodiment.

Figure 15:
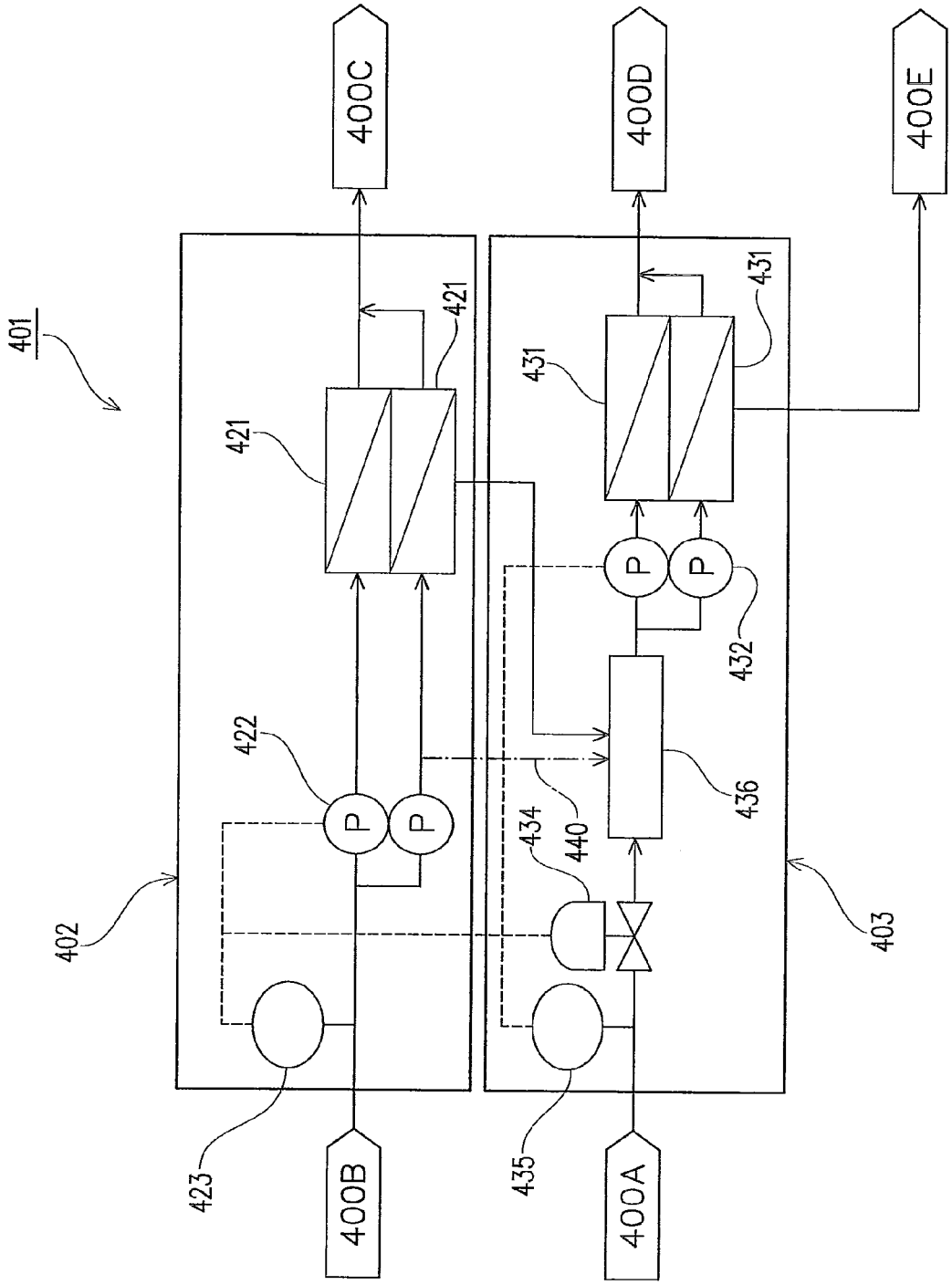
FIG. 15 is a schematic block diagram of a fresh water generating apparatus according to yet another embodiment of the present invention.

FIG. 15 is a schematic block diagram of the fresh water generating apparatus of the fourth embodiment.

As shown in FIG. 15, a fresh water generating apparatus 401 of the fourth embodiment includes a first treatment part 402 that separates low salt concentration wastewater 400B having a salt concentration lower than sea water 400A into first permeate and first concentrated water by way of reverse osmosis membrane filtration, and a second treatment part 403 that mixes, as diluent water, the first concentrated water produced at the first treatment part into the sea water 400A to produce mixed water, and separates the mixed water into second permeate and second concentrated water by way of reverse osmosis membrane filtration.

The fresh water generating apparatus 401 of the fourth embodiment is configured such that the low salt concentration wastewater 400B is fed to the first treatment part 402, and the second concentrated water is transferred, as concentrated water 400E, to a concentrated water storage tank (not shown).

The fresh water generating apparatus 401 of the fourth embodiment is configured such that the first permeate is produced as fresh water 400C and the second permeate is produced as fresh water 400D.

The sea water 400A is water containing salt, and for example, has a salt concentration of about 1.0 to 8.0% by mass, and generally has a salt concentration of 2.5 to 6.0% by mass.

The sea water 400A is not herein necessarily limited to water in the sea, and is intended to include water in land area, such as water of lake (salt lake, brackish lake), water of swamps, and water of pond, as long as they are water having a salt concentration of 1.0% by mass or more.

The low salt concentration wastewater 400B is water having a salt concentration lower than the sea water 400A. The low salt concentration wastewater 400B is, for example, wastewater having a salt concentration relative to the sea water 400A of 1: not more than 0.1, and more generally 1: not more than 0.01.

Examples of the low salt concentration wastewater 400B include organic wastewater containing organic matter and inorganic wastewater containing inorganic matter.

The organic wastewater is, for example, wastewater having a BOD (Biochemical Oxygen Demand), as an index of organic matter concentration, of 2000 mg/L or lower, and more generally wastewater having a BOD of about 200 mg/L. Examples of the organic wastewater include sewage water (e.g., domestic wastewater or rainwater flowing into sewage pipes), and industrial wastewater (wastewater discharged from, for example, a food factory, a chemical factory, a factory in electronics industry and a pulp plant).

The inorganic wastewater is, for example, wastewater having a low concentration of organic matter, and wastewater having a BOD (Biochemical Oxygen Demand) of 50 mg/L or lower, and preferably wastewater having a BOD of 10 mg/L or lower. Examples of the inorganic wastewater include industrial wastewater (e.g., wastewater discharged from various factories, such as a steel factory, a chemical factory and a factory in electronics).

The low salt concentration wastewater 400B may be supernatant water produced by subjecting wastewater (organic wastewater or inorganic wastewater) to sedimentation and separation in a sedimentation separation tank, or permeate produced by way of filtration and clarification by a microfiltration membrane (MF membrane), an ultrafiltration membrane (UF membrane), or a sand filtration tank. For organic wastewater, the low salt concentration wastewater 400B may be biologically treated water produced by purification of the organic wastewater with biological species.

By the clarifying is herein meant rougher filtration than reverse osmosis membrane filtration, that is, a treatment carried out prior to the filtration by the reverse osmosis membrane device and made to remove impurities (e.g., solid matter or the like) coarser than those filtered by a reverse osmosis membrane.

By the purification with biological species is herein meant decomposition of organic matter contained in water with biological species, such as bacteria, protozoa and metazoan. A specific example of such treatment includes aeration using activated sludge.

The reverse osmosis membrane as employed may be of a so-called hollow fiber membrane type, a so-called tubular membrane type, a so-called spiral membrane type, or of other conventional types.

The first treatment part 402 includes a plurality of first reverse osmosis membrane units 421 that separate the low salt concentration wastewater 400B into first permeate and first concentrated water by way of reverse osmosis membrane filtration, a plurality of first pumps 422 that pressure-feed the low concentration wastewater 400B respectively to the first reverse osmosis membrane units 421, and a first flow rate measurement device 423 as a flow rate measurement means that measures the flow rate of the low salt concentration wastewater 400B to be fed to the first treatment part 402.

The second treatment part 403 includes a mixing tank 436 that mixes the first concentrated water as diluent water into the sea water 400A to produce mixed water, a plurality of second reverse osmosis membrane units 431 that separate the mixed water into second permeate and second concentrated water by way of reverse osmosis membrane filtration, and a plurality of second pumps 432 that pressure-feed the mixed water respectively to the second reverse osmosis membrane units 431, and is configured to pressure-feed the mixed water to the second reverse osmosis membrane units 431 via the second pumps 432.

The fresh water generating apparatus 401 of the fourth embodiment is configured such that the sea water 400A is fed into the mixing tank 436 with a pump (not shown), and the first concentrated water as diluent water is transferred into the mixing tank 436.

The second treatment part 403 includes a second flow rate measurement device 435 for measuring the flow rate of the sea water 400A, and a control valve as a flow rate adjustment mechanism 434 for adjusting the flow rate of the sea water 400A to be fed to the mixing tank 436.

The fresh water generating apparatus 401 of the fourth embodiment is configured such that the amount to be filtered by each of the first treatment part 402 and the second treatment part 403 is controlled based on the measured value of the flow rate measured by the first flow rate measurement device 423.

Specifically, control is made such that, on the basis of the increase in measured value, the number of the first reverse osmosis membrane units 421 to be operated at the first treatment part 402 is increased, while the number of the second reverse osmosis membrane units 431 to be operated at the second treatment part 403 is decreased.

Giving further description on this point, the first flow rate measurement device 423 is electrically connected to each of the first pumps 422, and control is made such that the required number of the first pumps 422 is operated based on the measured value by the first flow rate measurement device 423. Thus, as the measured value is increased, the number of the first pumps 422 to be operated is increased, while, correspondingly thereto, the number of the first reverse osmosis membrane units 421 to perform reverse osmosis membrane filtration is increased such that the amount to be treated at the first treatment part 402 is increased.

The first flow rate measurement device 423 is electrically connected to the flow rate adjustment mechanism 434, while the second flow rate measurement device 435 is electrically connected to each of the second pumps 432, such that the flow rate of the sea water 400A to be flown into the mixing tank 436 of the second treatment part 403 is controlled based on the measured value by the first flow rate measurement device 423. Thus, as the measured value is increased, the flow rate of the sea water 400A at the second treatment part 403 is, on the contrary, decreased. Corresponding thereto, the measured value by the second flow rate measurement device 435 is lowered, such that the number of the second pumps 432 to be operated (that is, the number of the second reverse osmosis membrane units 431 to be operated) based on this measured value (specifically, in consideration of the measured value and the flow rate of the first concentrated water) is decreased.

It is a matter of course that, when the measured value has been lowered, control is made such that the number of the first reverse osmosis membrane units 421 to be operated at the first treatment part 402 is decreased, while the number of the second reverse osmosis membrane units 431 to be operated at the second treatment part 403 is increased.

Furthermore, in the fourth embodiment, there is provided a bypass line 440 that allows a part of the low salt concentration wastewater 400B at the first treatment part 402 to be bypassed to the mixing tank 436, such that the bypass-fed amount can be controlled based on the measured value by the first flow rate measurement device 423.

For example, when the flow rate, which exceeds beyond the reverse osmosis membrane filtration capacity at the first treatment part 402, has been measured, control is made to feed an amount of the wastewater equivalent to the exceeding amount to the mixing tank 436 via the bypass line 440.

In the fourth embodiment, the thus provided bypass line 440 enables the low salt concentration wastewater 400B to be utilized as fresh water resources without disposing it, even when an unexpected amount of the low salt concentration wastewater 400B has been measured.

In the fourth embodiment, when the flow rate which exceeds beyond the filtration capacity at the first treatment part 402 has been measured, control is made to feed such exceeded amount of the wastewater to the mixing tank 436 via the bypass line 440, but the present invention is not necessarily limited thereto. For example, control may be made such that, when the measured value by the first flow rate measurement device 423 has exceeded a predetermined value, a part of the low salt concentration wastewater 400B at the first treatment part 402 is bypassed to the mixing tank 436.

Whilst the fresh water generating apparatus 401 of the fourth embodiment is configured in the manner described above, the description will be hereinafter made for the fresh water generating method of the fourth embodiment.

The fresh water generating method of the fourth embodiment includes carrying out a first treatment step of separating the low salt concentration wastewater 400B having a salt concentration lower than the sea water 400A into first permeate and first concentrated water by way of filtration at the first reverse osmosis membrane units 421, and a second treatment step of feeding the first concentrated water produced by the first treatment step, as diluent water, to the mixing tank 436 to be mixed into the sea water 400A at the mixing tank 436 to produce mixed water, and separating the mixed water into second permeate and second concentrated water by way of filtration at the second reverse osmosis membrane units 431 to produce, as fresh water, the first permeate and the second permeate separated at the respective steps.

In the fourth embodiment, the flow rate of the low salt concentration wastewater 400B at the first flow rate measurement device 423 is measured, and the amount of wastewater to be filtered at each of the first treatment part 402 and the second treatment part 403 is controlled based on the measured value.

Specifically, the number of the first pumps 422 (the number of the first reverse osmosis membrane units 421) to be operated at the first treatment part 402 and the flow rate adjustment mechanism 434 at the second treatment part 403 are controlled to resultingly control the number of the second pumps 432 (the number of the second reverse osmosis membrane units 431), thereby producing fresh water.

In the fresh water generating method of the fourth embodiment, it is possible to employ an arrangement, in which the flow rate of the low salt concentration wastewater 400B is measured by the first flow rate measurement device, and the flow rate of the low salt concentration wastewater 400B to be fed to the mixing tank 436 via the bypass line 440 is controlled based on the measured value. In this arrangement, when the flow rate exceeding the reverse osmosis membrane filtration capacity at the first treatment part 402 has been measured, control is preferably made such that the exceeding amount of the low salt concentration wastewater 400B is fed to the mixing tank 436 via the bypass line 440. However, the present invention is not necessarily limited to this, and control may be made such that, when a flow rate exceeding a predetermined flow rate value has been measured at the first flow rate measuring device 423, the excessive amount of the wastewater is fed to the mixing tank 436 via the bypass line 440.

The fresh water generating apparatus 401 and the fresh water generating method, of the present invention are not necessarily limited to those of the fourth embodiment described above, and they may be appropriately modified within an intended scope of the present invention.

For example, although no illustration is made, it is possible to employ an arrangement, in which the bypass line 440 is provided at a flow rate regulating valve, by which the feeding amount to the mixing tank 436 via the bypass line 440 is controlled.

The present invention is not necessarily limited to the arrangement, in which the number of the first pumps 422 to be operated, the number of the second pumps 432 to be operated, or the like are controlled based on only the measured value by the first flow rate measurement device 423, and it is possible to employ an arrangement, in which the number of the first pumps 422 to be operated, the number of the second pumps 432 to be operated, etc., are controlled, also taking into account the measured value by a flow rate measurement device disposed at a different place.

For example, it is possible to employ an arrangement, in which a flow rate measurement device for measuring the flow rate of first concentrated water is disposed at a downstream side of the first reverse osmosis membrane units 421, and the number of the second pumps 432 to be operated and the amount of the low salt concentration wastewater 400B to be fed to the mixing tank 436 via the bypass line 440 are adjusted and controlled based on both the measured value by this flow rate measurement device and the measured value by the first flow rate measurement device 423.

In the fourth embodiment, the number of the second pumps 432 to be operated is controlled based on the measured value by the second flow rate measurement device 435 (specifically, taking into account the measured value and the flow rate of the first concentrated water). However, taking into account that the low salt concentration wastewater 400B is sometimes fed to the mixing tank 436 via the bypass line 440, it is possible to employ an arrangement, in which a flow rate measurement device for measuring the flow rate of the first concentrated water and the feeding amount by the bypass line is provided, such that the number of the second pumps 432 to be operated is controlled based on the total value of the measure value of the second flow rate measurement device 435, the measured value of the flow rate of the first concentrated water and the measured value of the bypass-fed amount. It is also possible to employ an arrangement, in which a flow rate measurement device for measuring the flow rate of the first concentrated water is not provided such that a value determined by calculation according to the amount fed to the first reverse osmosis membrane units 421 is utilized.

Thus, according to the fourth embodiment, it is possible to efficiently and stably produce a predetermined amount of fresh water, while omitting the necessity to provide a huge space for an excessively large storage tank.

EXAMPLES

Now, a more specific description will be made for the present invention by citing examples and comparative examples.

First, a specific description will be made for the first embodiment.

Test Example 1

Figure 16:
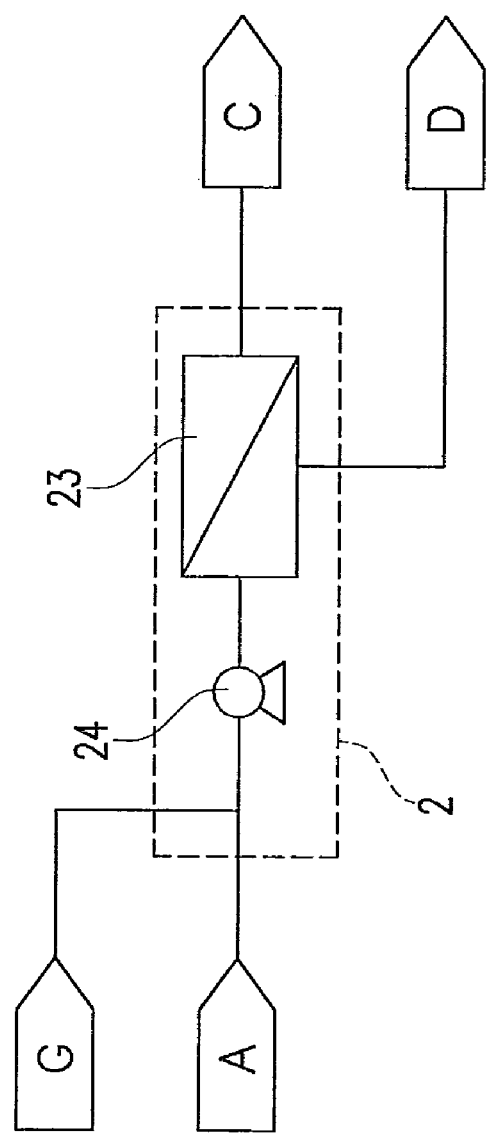
FIG. 16 is a schematic block diagram of a sea water desalinating apparatus of Test Example 1.

As shown in FIG. 16, biologically treated water, that is, diluent water G produced by biologically treating sewage water as organic wastewater B, and sea water A are mixed together in the amounts indicated in Table 1 to produce mixed water, and the mixed water produced by the mixing is fed to the first reverse osmosis membrane unit 23 via the first pump 24 to be filtered. Thus, fresh water C that is permeate, and concentrated water D are produced. The feed pressure (ata) of the mixed water from the first pump 24 to the first reverse osmosis membrane unit 23, the power consumption of the first pump 24 (W), and the amount (L) of the fresh water C that is the permeate and the concentrated water D, during filtration, are determined by calculation. The results of the calculation are shown in Table 1 and FIG. 17.

By the unit power ratio in Table 1 is meant a ratio of power consumed for filtration per unit amount of each mixed water flow through, when the power consumed for filtration per unit amount of sea water A not diluted with biologically treated water flow through is 100. By the symbol "%" as a unit of the salt concentration of mixed water is meant "% by mass".

TABLE 1

| Amount of sea water (L) | Amount of biologically treated water (L) | Amount of mixed water (L) | Salt concentration of mixed water (% by mass) | Pressure (ata) | Amount of permeate (L) | Amount of concentrated water (L) | Recovery rate of permeate (%) | Power consumption (W) | Power consumption per unit amount of permeate (W/L) | Unit Power Ratio (%) |
|---|---|---|---|---|---|---|---|---|---|---|
| 100 | 0 | 100 | 3.50 | 50.0 | 40 | 60 | 40.0 | 100 | 2.50 | 100.0 |
| 100 | 10 | 110 | 3.18 | 47.3 | 48 | 62 | 43.6 | 104 | 2.17 | 86.7 |
| 100 | 20 | 120 | 2.92 | 45.0 | 56 | 64 | 46.7 | 108 | 1.93 | 77.1 |
| 100 | 30 | 130 | 2.69 | 43.1 | 64 | 66 | 49.2 | 112 | 1.75 | 70.0 |
| 100 | 40 | 140 | 2.50 | 41.4 | 72 | 68 | 51.4 | 116 | 1.61 | 64.4 |
| 100 | 50 | 150 | 2.33 | 40.0 | 80 | 70 | 53.3 | 120 | 1.50 | 60.0 |
| 100 | 60 | 160 | 2.19 | 38.8 | 88 | 72 | 55.0 | 124 | 1.41 | 56.4 |
| 100 | 70 | 170 | 2.06 | 37.6 | 96 | 74 | 56.5 | 128 | 1.33 | 53.3 |
| 100 | 80 | 180 | 1.94 | 36.7 | 104 | 76 | 57.8 | 132 | 1.27 | 50.8 |
| 100 | 90 | 190 | 1.84 | 35.8 | 112 | 78 | 58.9 | 136 | 1.21 | 48.6 |
| 100 | 100 | 200 | 1.75 | 35.0 | 120 | 80 | 60.0 | 140 | 1.17 | 46.7 |

Figure 17:
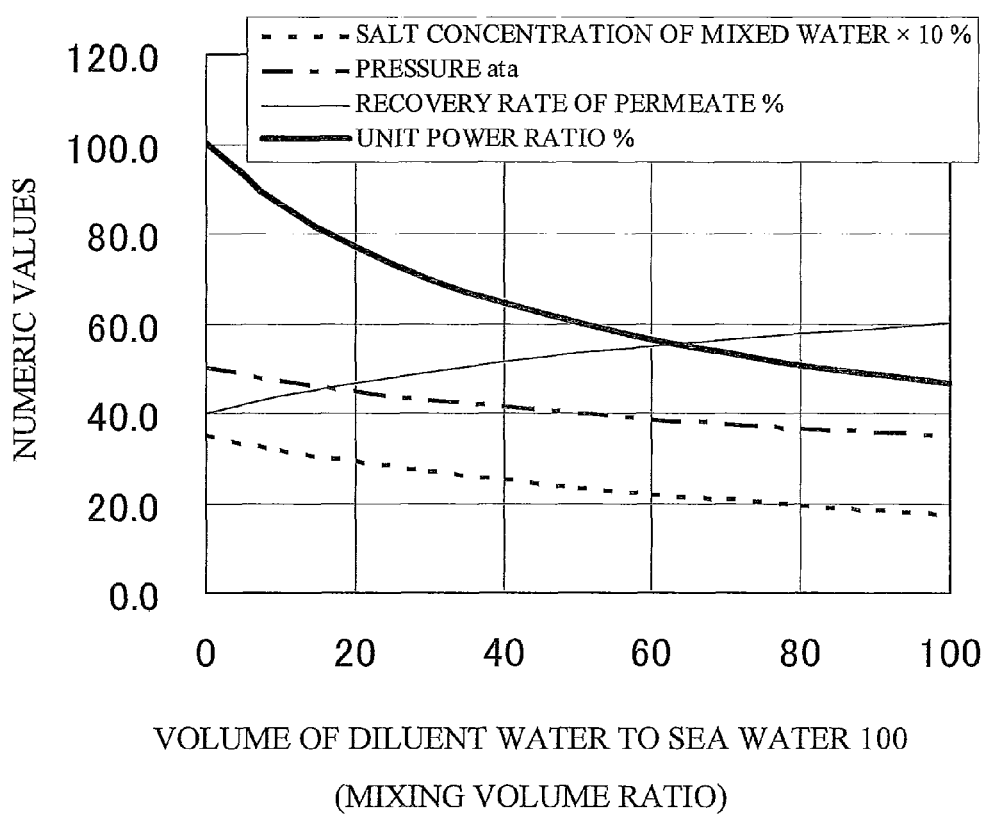
FIG. 17 shows the result of Test Example 1.

As shown in Table 1 or FIG. 17, as the sea water is further diluted with the biologically treated water, the unit power ratio can be lowered. Also, with sea water of 1:diluent water of not less than 0.1, it is found that the effect of reducing the power consumption can be produced.

Test Example 2

Example 1

Figure 18:
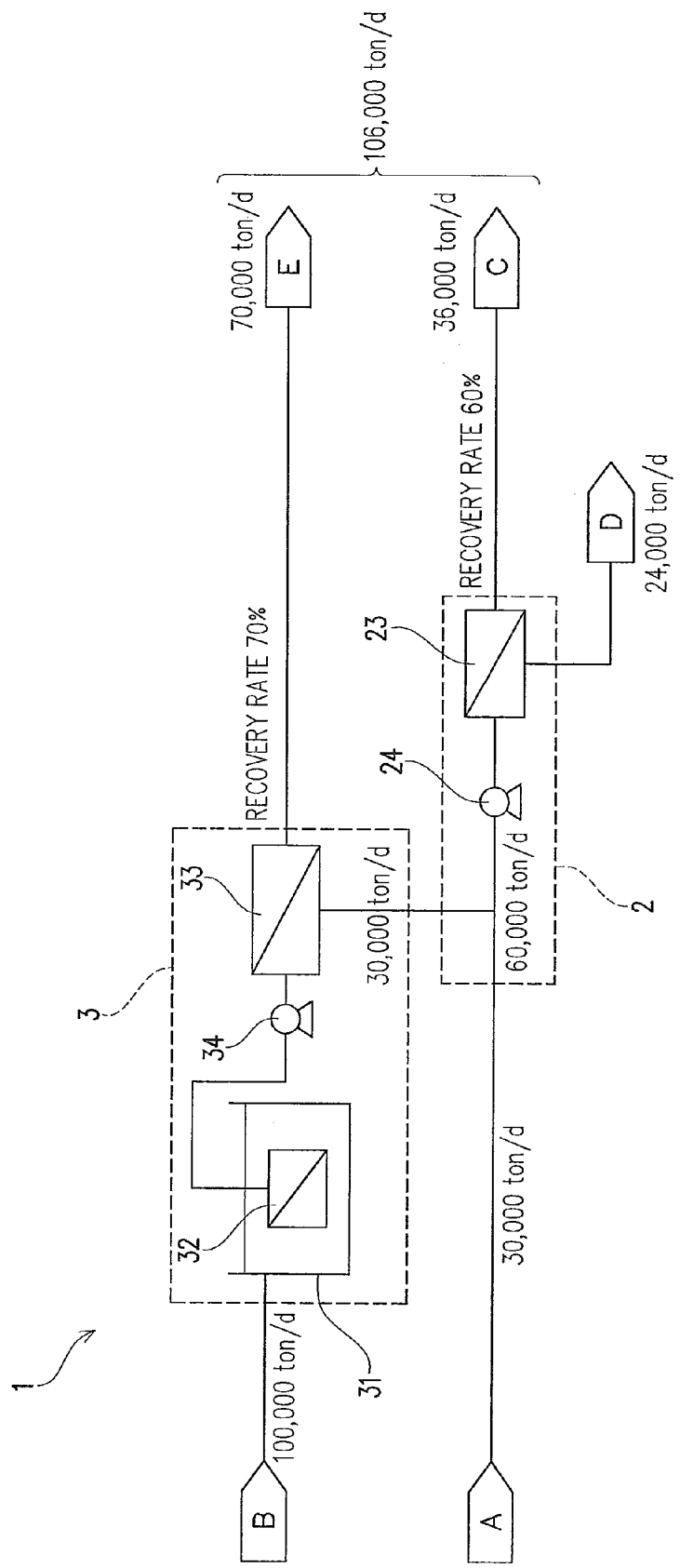
FIG. 18 is a schematic block diagram of a sea water desalinating apparatus of Example 1.

In Example 1, the sea water A (salt concentration: 3.5% by mass) is desalinated by using biologically treated water produced by biologically treating the sewage water in the manner mentioned below, by using a sea water desalinating device shown in FIG. 18.

First, sewage water as organic wastewater B is transferred to the biological treatment part 3 at a flow rate of 100,000 ton/day, then the sewage water is biologically treated within the second biological treatment tank 31 of the biological treatment part 3 to produce biologically treated water, then the biologically treated water is filtered by using the second clarifier 32 that has a microfiltration membrane and is a submerged membrane to produce permeate, and then the permeate is transferred via the second pump 34 to the second reverse osmosis membrane device 33, at which purified water E that is permeate and biologically treated water that is concentrated water are produced by using the second reverse osmosis membrane device 33. The purified water E was produced at a flow rate of 70,000 ton/day, and the biologically treated water that is the concentrated water was produced at a flow rate of 30,000 ton/day.

Then, the purified water E is recovered, and the biologically treated water that is the concentrated water is transferred, as diluent water, to the mixed water treatment part 2.

Then, the sea water A is transferred to the mixed water treatment part 2 at a flow rate of 30,000 ton/day, then the biologically treated water that is the concentrated water is mixed, as diluent water, into the sea water A to produce mixed water (salt concentration: 1.8% by mass), then the mixed water is transferred via the first pump 24 to the first reverse osmosis membrane device 23, by which fresh water C that is permeate and concentrated water D are produced. Purified water that is the fresh water C was produced at a flow rate of 36,000 ton/day, and the concentrated water D was produced at a flow rate of 24,000 ton/day.

Accordingly, purified water (including the fresh water C) was produced at a flow rate of 106,000 ton/day.

Comparative Example 1

Figure 19:
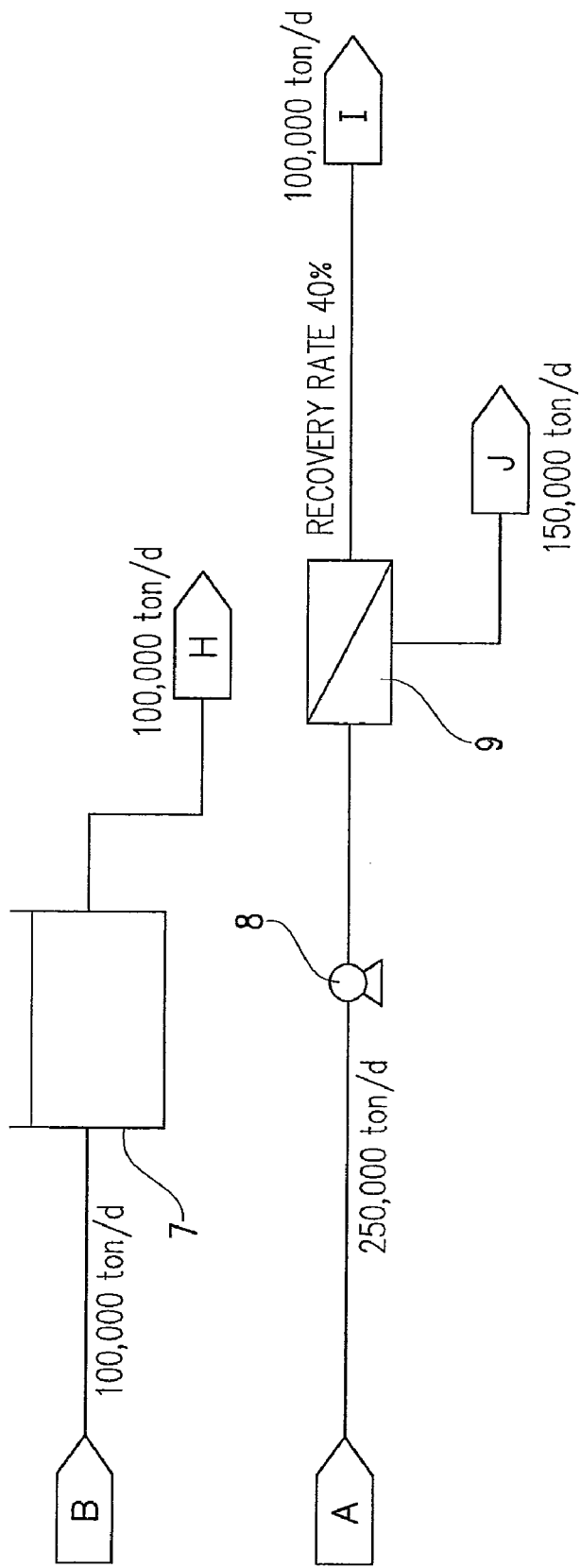
FIG. 19 is a schematic block diagram of a sea water desalinating apparatus of Comparative Example 1.

In Comparative Example 1, sea water A (salt concentration: 3.5% by mass) is desalinated by using a sea water desalinating apparatus shown in FIG. 19 in the manner mentioned below.

First, sewage water as organic wastewater B is transferred to a biological treatment tank 7 at a flow rate of 100,000 ton/day, and the sewage water is biologically treated within the biological treatment tank 7 to produce biologically treated water H. This biologically treated water is released to the outside.

Then, sea water A is transferred at a flow rate of 250,000 ton/day via a first pump 8 to a reverse osmosis membrane device 9, by which fresh water I that is permeate and concentrated water J are produced. Purified water that is the fresh water I was produced at a flow rate of 100,000 ton/day, and the concentrated water was produced at a flow rate of 150,000 ton/day.

The results of power consumed by the sea water desalinating methods of Example 1 and Comparative Example 1, the amounts of purified water produced by the respective methods, and the like are shown in Table 2.

The amount of purified water produced is an amount including the amount of fresh water. Power consumed for driving the first pump and the second pump is designated as the total power consumption (since the second pump is not used in Comparative Example 1, power consumed for driving the first pump only is designated as the total power consumption). Annual power consumption is calculated with the operating time per year being 330×24 hours. Annual $CO_2$ emission is calculated with the $CO_2$ emission per unit output being 0.41 kg-$CO_2$/kWh.

TABLE 2

|  | Unit | Example 1 | Comparative Example 1 |
|---|---|---|---|
| Amount of purified water produced | Ton/day | 106,000 | 100,000 |

TABLE 2-continued

|  | Unit | Example 1 | Comparative Example 1 |
|---|---|---|---|
| Power consumption of 1st pump | kW | 4,723 | 39,356 |
| Power consumption of 2nd pump | kW | 2,249 | — |
| Total power consumption | kW | 6.972 | 39,356 |
| Annual power consumption | kWh/year | 55,218,240 | 311,699,520 |
| Annual $CO_2$ emission | Ton/year | 22,639 | 127,797 |

The amount of purified water produced by the sea water desalinating method of Example 1, which is within the range of the present invention, is substantially equal to the amount of purified water produced by the sea water desalinating method of Comparative Example 1, in which the sea water is desalinated without performing dilution. Regardless of this fact, the total power consumption of Example 1 is significantly low as compared with that of Comparative Example 1. Also, the annual $CO_2$ emission of Example 1 is significantly low as compared with that of Comparative Example 1.

Now, a specific description will be made for the second embodiment.

Test Example 3

Figure 20:
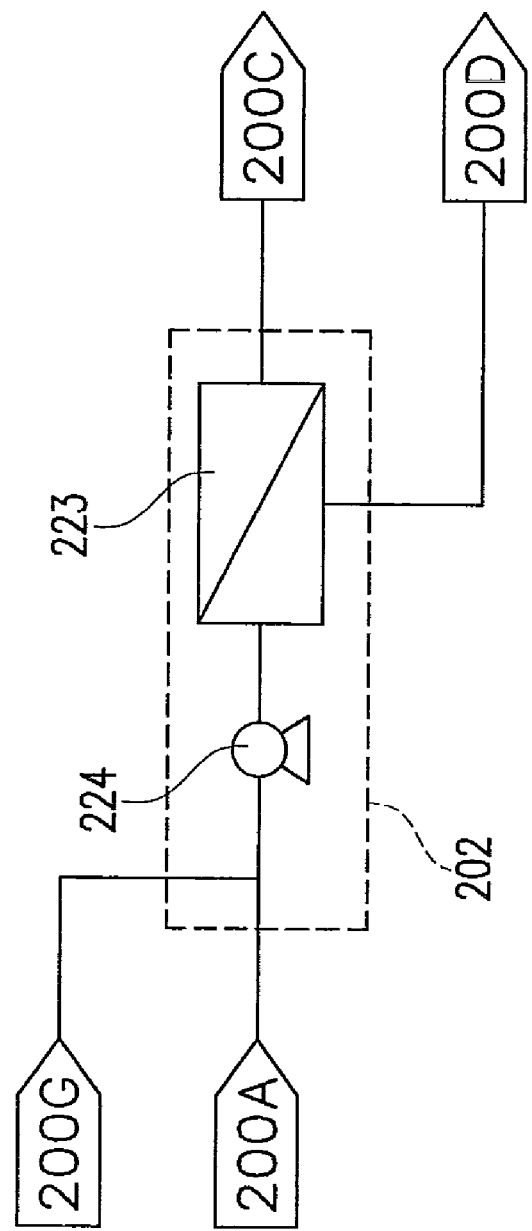
FIG. 20 is a schematic block diagram of a sea water desalinating apparatus of Test Example 3.

As shown in FIG. 20, diluent water 200G that is steel wastewater as inorganic wastewater, and sea water 200A are mixed together in the amounts shown in Table 3 to produce mixed water, then the mixed water produced by the mixing is fed to the first reverse osmosis membrane device 223 via the first pump 24, by which the mixed water is filtered to produce fresh water 200C that is permeate and concentrated water 200D. The feed pressure (MPa) of the mixed water from the first pump 224 to the first reverse osmosis membrane device 223, the power consumption (W) of the first pump 224, and the amount (L) of the fresh water 200C that is permeate and the concentrated water 200D in filtration process are determined by calculation. The results of the calculation are shown in Table 3 and FIG. 21.

By the unit power ratio in Table 3 is meant a ratio of power consumed for filtration per unit amount of each mixed water flow through, when the power consumed for filtration per unit amount of sea water A not diluted with inorganic wastewater flow through is 100. By the symbol "%" as a unit of the salt concentration of mixed water is meant "% by mass".

TABLE 3

| Amount of sea water (L) | Amount of inorganic wastewater (L) | Amount of mixed water (L) | Salt concentration of mixed water (% by mass) | Pressure (MPa) | Amount of permeate (L) | Amount of concentrated water (L) | Recovery rate of permeate (%) | Power consumption (W) | Power consumption per unit amount of permeate (W/L) | Unit Power Ratio (%) |
|---|---|---|---|---|---|---|---|---|---|---|
| 100 | 0 | 100 | 3.50 | 5.00 | 40 | 60 | 40.0 | 100 | 2.50 | 100.0 |
| 100 | 10 | 110 | 3.21 | 4.75 | 48 | 62 | 43.3 | 105 | 2.20 | 87.9 |
| 100 | 20 | 120 | 2.98 | 4.55 | 55 | 65 | 46.0 | 109 | 1.98 | 79.1 |
| 100 | 30 | 130 | 2.77 | 4.38 | 63 | 67 | 48.3 | 114 | 1.81 | 72.5 |
| 100 | 40 | 140 | 2.60 | 4.23 | 70 | 70 | 50.3 | 118 | 1.68 | 67.3 |
| 100 | 50 | 150 | 2.45 | 4.10 | 78 | 72 | 52.0 | 123 | 1.58 | 63.1 |
| 100 | 60 | 160 | 2.32 | 3.99 | 86 | 74 | 53.5 | 128 | 1.49 | 59.6 |
| 100 | 70 | 170 | 2.20 | 3.89 | 93 | 77 | 54.8 | 132 | 1.42 | 56.7 |
| 100 | 80 | 180 | 2.10 | 3.80 | 101 | 79 | 56.0 | 137 | 1.36 | 54.3 |
| 100 | 90 | 190 | 2.01 | 3.72 | 108 | 82 | 57.1 | 141 | 1.30 | 52.2 |
| 100 | 100 | 200 | 1.93 | 3.65 | 116 | 84 | 58.0 | 146 | 1.26 | 50.3 |
| 100 | 110 | 210 | 1.85 | 3.59 | 124 | 86 | 58.9 | 151 | 1.22 | 48.7 |

TABLE 3-continued

| Amount of sea water (L) | Amount of inorganic wastewater (L) | Amount of mixed water (L) | Salt concentration of mixed water (% by mass) | Pressure (MPa) | Amount of permeate (L) | Amount of concentrated water (L) | Recovery rate of permeate (%) | Power consumption (W) | Power consumption per unit amount of permeate (W/L) | Unit Power Ratio (%) |
|---|---|---|---|---|---|---|---|---|---|---|
| 100 | 120 | 220 | 1.78 | 3.53 | 131 | 89 | 59.6 | 155 | 1.18 | 47.3 |
| 100 | 125 | 225 | 1.75 | 3.50 | 135 | 90 | 60.0 | 158 | 1.17 | 46.7 |

Figure 21:
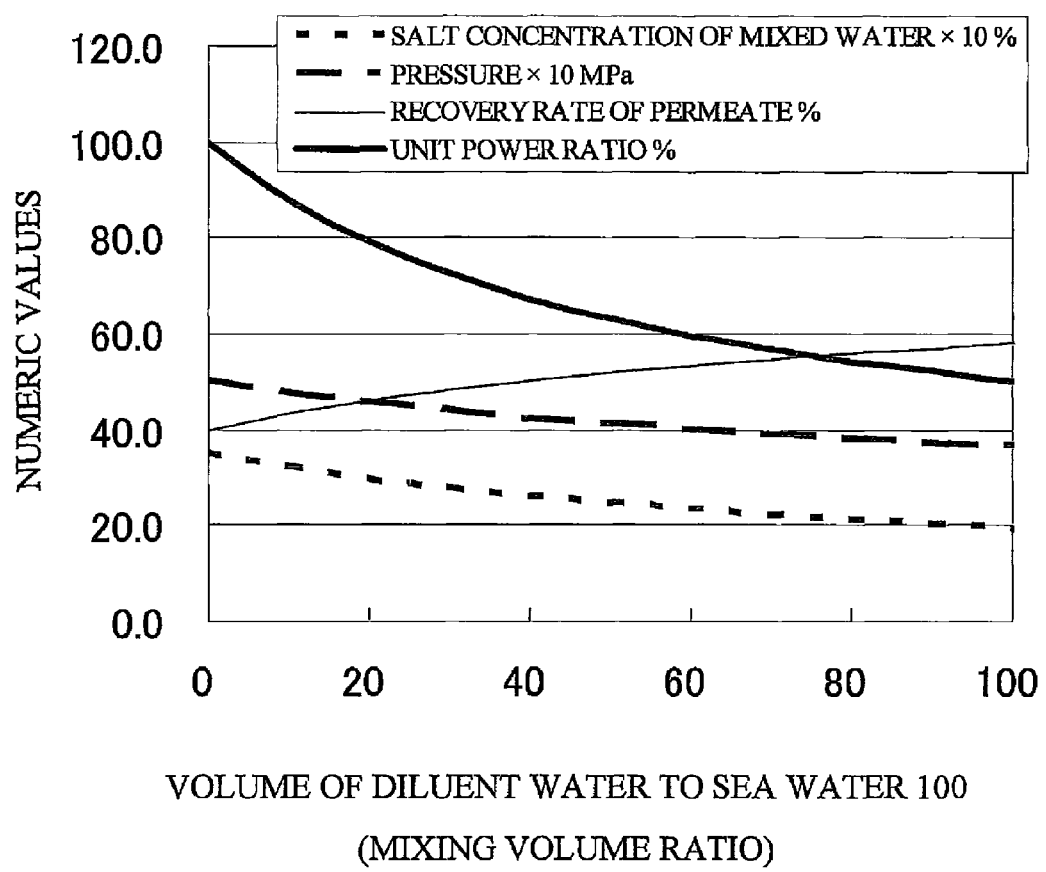
FIG. 21 shows the result of Test Example 3.

As shown in Table 3 and FIG. 21, as the sea water is further diluted with diluent water, the unit power ratio can be lowered. Also, with sea water of 1:diluent water of not less than 0.1, it is found that the effect of reducing the power consumption can be produced.

Test Example 4

Example 2

Figure 22:
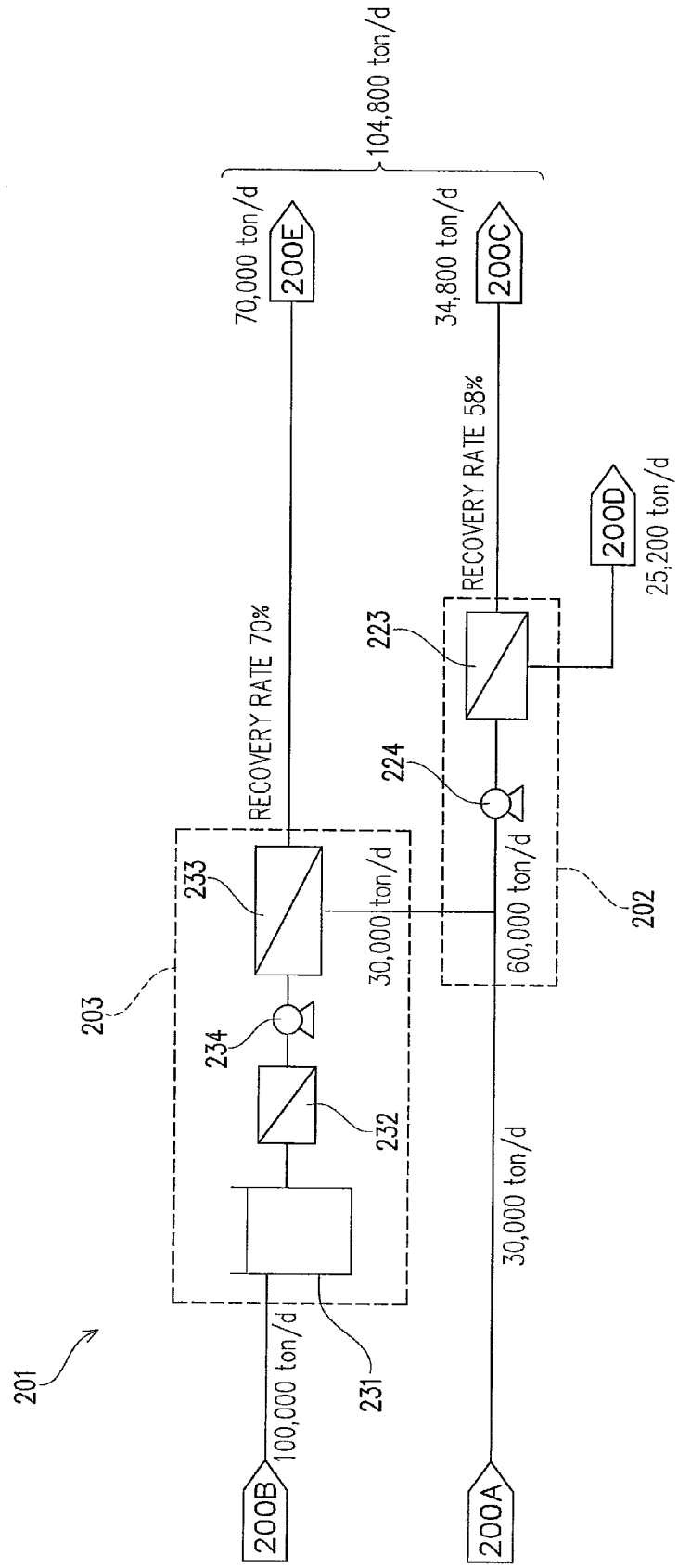
FIG. 22 is a schematic block diagram of a sea water desalinating apparatus of Example 2.

In Example 2, the sea water 200A (salt concentration: 3.5% by mass) is desalinated by using sedimentation treated water that is supernatant water produced by subjecting steel wastewater to aggregation and sedimentation in a sea water desalinating apparatus shown in FIG. 22 in the manner mentioned below.

First, steel wastewater as inorganic wastewater 200B is transferred to the sedimentation treatment part 203 at a flow rate of 100,000 ton/day, then the steel wastewater is subjected to sedimentation and separation within the sedimentation separation tank 231 of the sedimentation treatment part 203 to produce sedimentation treated water that is supernatant water, then the sedimentation treated water is transferred to the second clarifier 232 that has a microfiltration membrane to be filtered to produce permeate, and then the permeate is transferred via the second pump 234 to the second reverse osmosis membrane device 233, by which purified water 200E that is permeate and sedimentation treated water that is concentrated water are produced. The purified water 200E was produced at a flow rate of 70,000 ton/day, and the sedimentation treated water that is the concentrated water was produced at a flow rate of 30,000 ton/day.

Then, the purified water 200E is recovered, and the sedimentation treated water that is the concentrated water is transferred, as diluent water, to the mixed water treatment part 202.

Then, the sea water 200A is transferred to the mixed water treatment part 202 at a flow rate of 30,000 ton/day, then the sedimentation treated water that is the concentrated water is mixed, as diluent water, into the sea water 200A to produce mixed water (salt concentration: 1.93% by mass), then the mixed water is transferred via the first pump 224 to the first reverse osmosis membrane device 223, by which fresh water 200C that is permeate and concentrated water D are produced. Purified water that is the fresh water 200C was produced at a flow rate of 34,800 ton/day, and the concentrated water 200D was produced at a flow rate of 25,200 ton/day.

Accordingly, purified water (including the fresh water 200C) was produced at a flow rate of 104,800 ton/day.

Comparative Example 2

Figure 23:
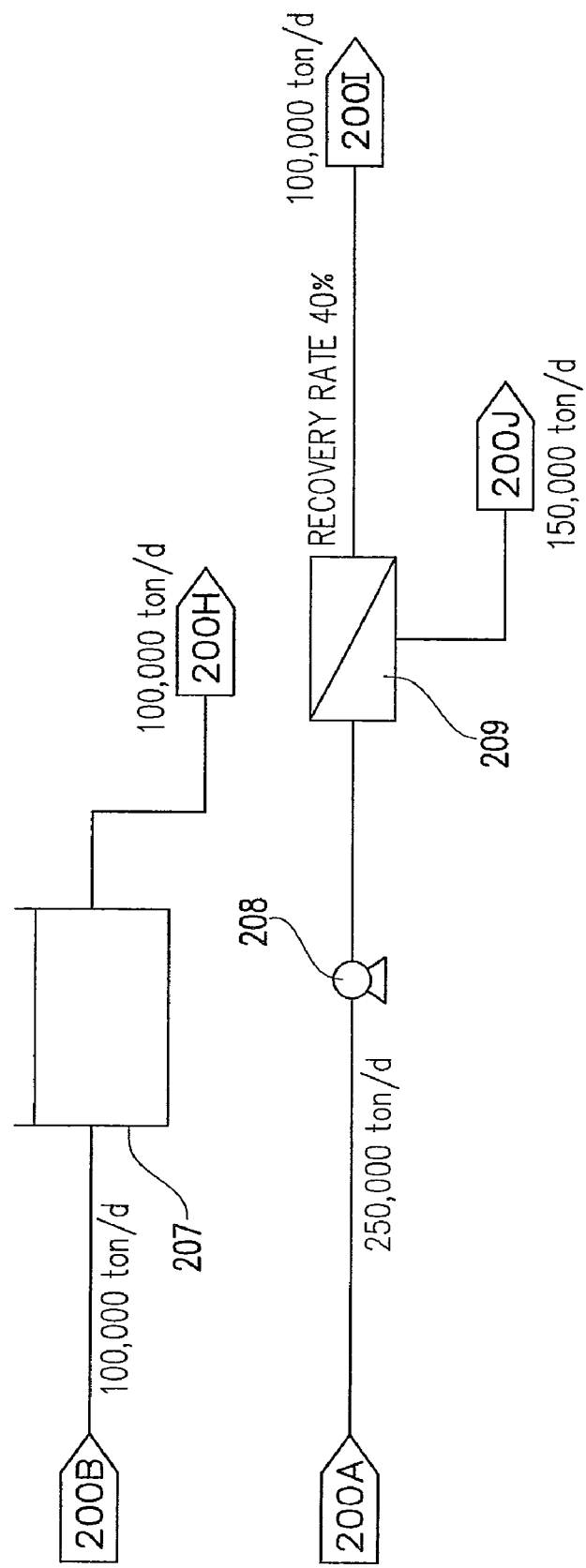
FIG. 23 is a schematic block diagram of a sea water desalinating apparatus of Comparative Example 2.

In Comparative Example 2, the sea water 200A (salt concentration: 3.5% by mass) is desalinated by using a sea water desalinating apparatus shown in FIG. 23 in the manner mentioned below.

First, steel wastewater as inorganic wastewater 200B is transferred to the sedimentation treatment part 207 at a flow rate of 100,000 ton/day, then the steel wastewater is subjected to sedimentation and separation within the sedimentation separation tank 207 to produce sedimentation treated water 200H that is supernatant water. This sedimentation treated water 200H is released to the outside.

The sea water 200A is transferred at a flow rate of 250,000 ton/day via the first pump 208 to the reverse osmosis membrane device 209, by which fresh water 200I that is permeate and concentrated water 200J are produced. Purified water that is the fresh water 200I was produced at a flow rate of 100,000 ton/day, and the concentrated water was produced at a flow rate of 150,000 ton/day.

The results of power consumed by the sea water desalinating methods of Example 2 and Comparative Example 2, the amounts of purified water produced by the respective methods, and the like are shown in Table 4.

The amount of purified water produced is an amount including the amount of fresh water. Power consumed for driving the first pump and the second pump is designated as the total power consumption (since the second pump is not used in Comparative Example 2, power consumed for driving the first pump only is designated as the total power consumption). Annual power consumption is calculated with the operating time per year being 330×24 hours. Annual $CO_2$ emission is calculated with the $CO_2$ emission per unit output being 0.41 kg-$CO_2$/kWh.

TABLE 4

|  | Unit | Example 2 | Comparative Example 2 |
|---|---|---|---|
| Amount of purified water produced | Ton/day | 104,800 | 100,000 |
| Power consumption of 1st pump | kW | 4,925 | 39,356 |
| Power consumption of 2nd pump | kW | 2,249 | — |
| Total power consumption | kW | 7,174 | 39,356 |
| Annual power consumption | kWh/year | 56,817,728 | 311,696,000 |
| Annual $CO_2$ emission | Ton/year | 23,295 | 127,795 |

The amount of purified water produced by the sea water desalinating method of Example 2, which is within the range of the present invention, is substantially equal to the amount of purified water produced by the sea water desalinating method of Comparative Example 2. Regardless of this fact, the total power consumption of Example 2 is significantly low as compared with that of Comparative Example 2, in which the sea water is desalinated without performing dilution. Also, the annual $CO_2$ emission of Example 2 is significantly low as compared with that of Comparative Example 2.

DESCRIPTION OF THE REFERENCE NUMERALS

1: sea water desalinating apparatus, 2: mixed water treatment part, 3: biological treatment part, 4: methane fermentation part, 5: concentration difference power production part, 7: biological treatment tank, 8: first pump, 9: reverse osmosis membrane device, 10: third clarifier, 21: first biological treatment tank, 22: first clarifier, 23: first reverse osmosis membrane device, 24: first pump, 25: water turbine, 31: second biological treatment tank, 32: second clarifier, 33: second reverse osmosis membrane device, 34: second pump, 35: carrier, 35*a*: trapping member, 35*b*: supporting member, 36: aeration means, A: sea water, B: organic wastewater, C: fresh water, D: concentrated water, E: purified water, F: industrial water, G: diluent water, H: biologically treated water, I: fresh water, J: concentrated water, 201: sea water desalinating apparatus, 202: mixed water treatment part, 203: sedimentation treatment part, 205: concentration difference power production part, 207: sedimentation treatment part, 208: first pump, 209: reverse osmosis membrane device, 210: third clarifier, 222: first clarifier, 223: first reverse osmosis membrane device, 224: first pump, 225: water turbine, 231: sedimentation separation tank, 232: second clarifier, 233: second reverse osmosis membrane device, 234: second pump, 200A: sea water, 200B: inorganic wastewater, 200C: fresh water, 200D: concentrated water, 200E: purified water, 200F: industrial water, 200G: diluent water, 200H: sedimentation treated water, 200I: fresh water, 200J: concentrated water, 301: fresh water generating apparatus, 302: first treatment part, 303: second treatment part, 304: signal transmission mechanism, 321: first reverse osmosis membrane unit, 322: first pump, 323: first salt concentration measurement means, 324: first flow rate adjustment mechanism, 325: first inverter, 331: second reverse osmosis membrane unit, 332: second pump, 333: second salt concentration measurement means, 334: second flow rate adjustment mechanism, 335: second inverter, 336: mixing tank, 300A: sea water, 300B: low salt concentration wastewater, 300C: fresh water, 300D: fresh water, 300E: concentrated water, 401: fresh water generating apparatus, 402: first treatment part, 403: second treatment part, 421: first reverse osmosis membrane unit, 422: first pump, 423: first flow rate measurement device, 431: second reverse osmosis membrane unit, 432: second pump, 434: flow rate adjustment mechanism, 435: second flow rate measurement device, 436: mixing tank, 440: bypass line, 400A: sea water, 400B: low salt concentration wastewater, 400C: fresh water, 400D: fresh water, 400E: concentrated water

The invention claimed is:

1. A sea water desalinating method for desalinating sea water by way of filtration using a reverse osmosis membrane device, comprising carrying out a mixing step of mixing, as diluent water, biologically treated water produced by biologically treating organic wastewater into sea water to produce mixed water,
 - a mixed water processing step of feeding the mixed water produced by the mixing step to the reverse osmosis membrane device, at which the mixed water is filtered, thereby desalinating the sea water, and
 - a wastewater treatment step of producing biologically treated water by biologically treating organic wastewater, producing permeate by filtering the biologically treated water by using a clarifier that has at least one of a microfiltration membrane, an ultrafiltration membrane and a sand filtration means, and producing permeate that is purified water and concentrated water by filtering the permeate using a reverse osmosis membrane device, wherein the biologically treated water used as the diluent water in the mixing step is the concentrated water.

2. The sea water desalinating method according to claim 1, wherein filtration with the clarifier installed as a submerged membrane below the liquid level of a biological treatment tank for the biological treatment is carried out in the wastewater treatment step.

3. The sea water desalinating method according to claim 1, wherein sea water is filtered by using a clarifier and the sea water subjected to filtration is mixed with diluent water in the mixing step.

4. The sea water desalinating method according to claim 2, wherein sea water is filtered by using a clarifier and the sea water subjected to filtration is mixed with diluent water in the mixing step.

* * * * *